July 4, 1950 S. J. BEGUN 2,513,616

MAGNETIC RECORDING AND REPRODUCING

Filed May 25, 1944 10 Sheets-Sheet 1

INVENTOR

S. J. Begun

BY Pinkes & Greene

ATTORNEYS

July 4, 1950 S. J. BEGUN 2,513,616

MAGNETIC RECORDING AND REPRODUCING

Filed May 25, 1944 10 Sheets-Sheet 2

INVENTOR.
S. J. BEGUN
BY
[signature]
ATTORNEY

MAGNETIC RECORDING AND REPRODUCING

Filed May 25, 1944 10 Sheets-Sheet 3

INVENTOR
Semi Joseph Begun.
BY Michael Pineles
ATTORNEY

MAGNETIC RECORDING AND REPRODUCING

Filed May 25, 1944

INVENTOR
Semi Joseph Begun.
S. Michael Pincles
ATTORNEY

MAGNETIC RECORDING AND REPRODUCING

Filed May 25, 1944

INVENTOR
S. J. BEGUN

BY [signature]
ATTORNEY

INVENTOR.
S. J. BEGUN
BY [signature]
ATTORNEY

July 4, 1950 S. J. BEGUN 2,513,616

MAGNETIC RECORDING AND REPRODUCING

Filed May 25, 1944 10 Sheets-Sheet 7

INVENTOR
S. J. Begun
BY Pindles & Greene
ATTORNEYS

MAGNETIC RECORDING AND REPRODUCING

Filed May 25, 1944

INVENTOR.
S. J. BEGUN
BY [signature]
ATTORNEY

July 4, 1950 S. J. BEGUN 2,513,616

MAGNETIC RECORDING AND REPRODUCING

Filed May 25, 1944 10 Sheets-Sheet 9

INVENTOR.
S. J. BEGUN
BY [signature]
ATTORNEY

INVENTOR.
S. J. BEGUN
BY [signature]
ATTORNEY

Patented July 4, 1950 2,513,616

UNITED STATES PATENT OFFICE 2,513,616

MAGNETIC RECORDING AND REPRODUCING

Semi Joseph Begun, Cleveland Heights, Ohio, assignor to Magnatone, Inc., Cleveland, Ohio, a corporation of Ohio Application May 25, 1944, Serial No. 537,288

34 Claims. (Cl. 179—100.2)

This application is a continuation in part of my application Serial No. 340,030, filed June 12, 1940, now U. S. Pat. No. 2,356,145, granted August 22, 1944, Re. 22,970, February 10, 1948.

This invention relates to magnetic recording and reproducing and various applications thereof.

Among the objects of the invention are novel magnetic recording and reproducing arrangements, novel control arrangements for magnetic recording and reproducing systems and various other novel features important in practical applications of magnetic recording and reproducing systems.

The foregoing and other objects of the invention will be best understood from the following description of exemplifications thereof, reference being had to the accompanying drawings wherein Fig. 1 is a diagrammatic view illustrating the cooperative relationship of one form of magnetic record transducing system exemplifying the invention;

Fig. 1A diagrammatically indicates in detail one form of amplifying arrangement of the invention;

Figure 1:
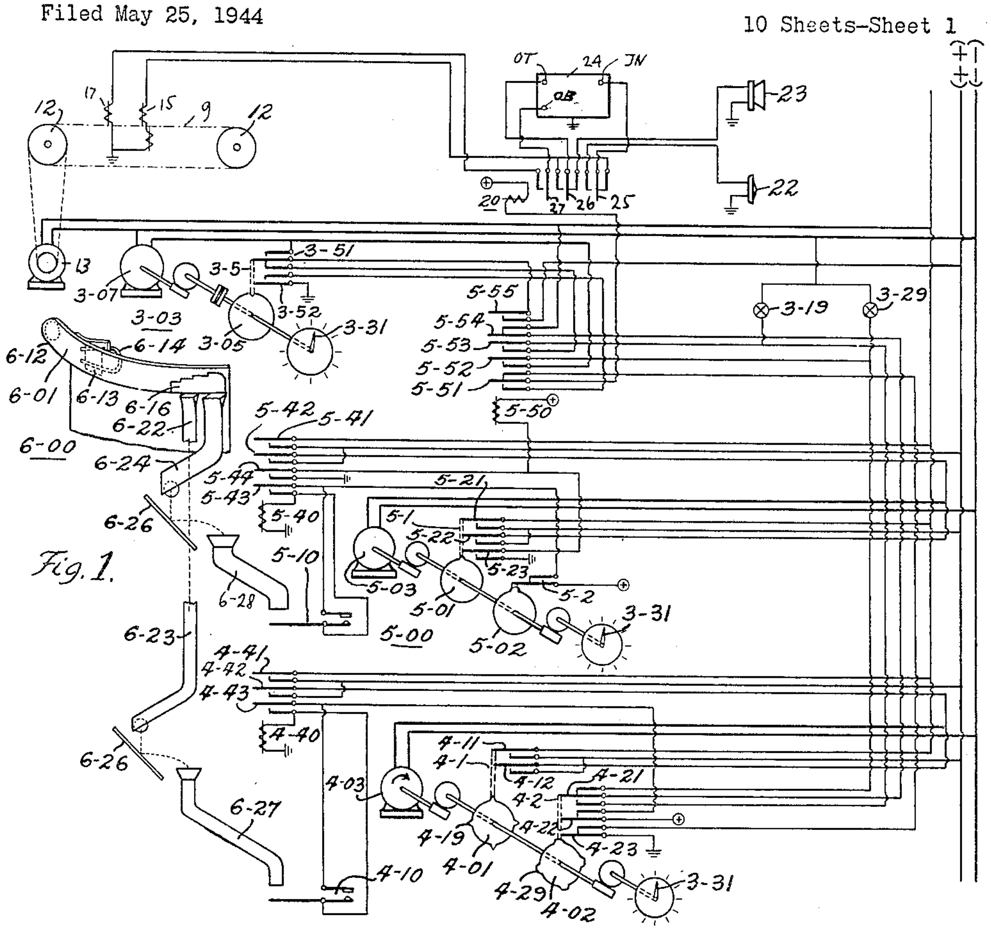
Figure 14:
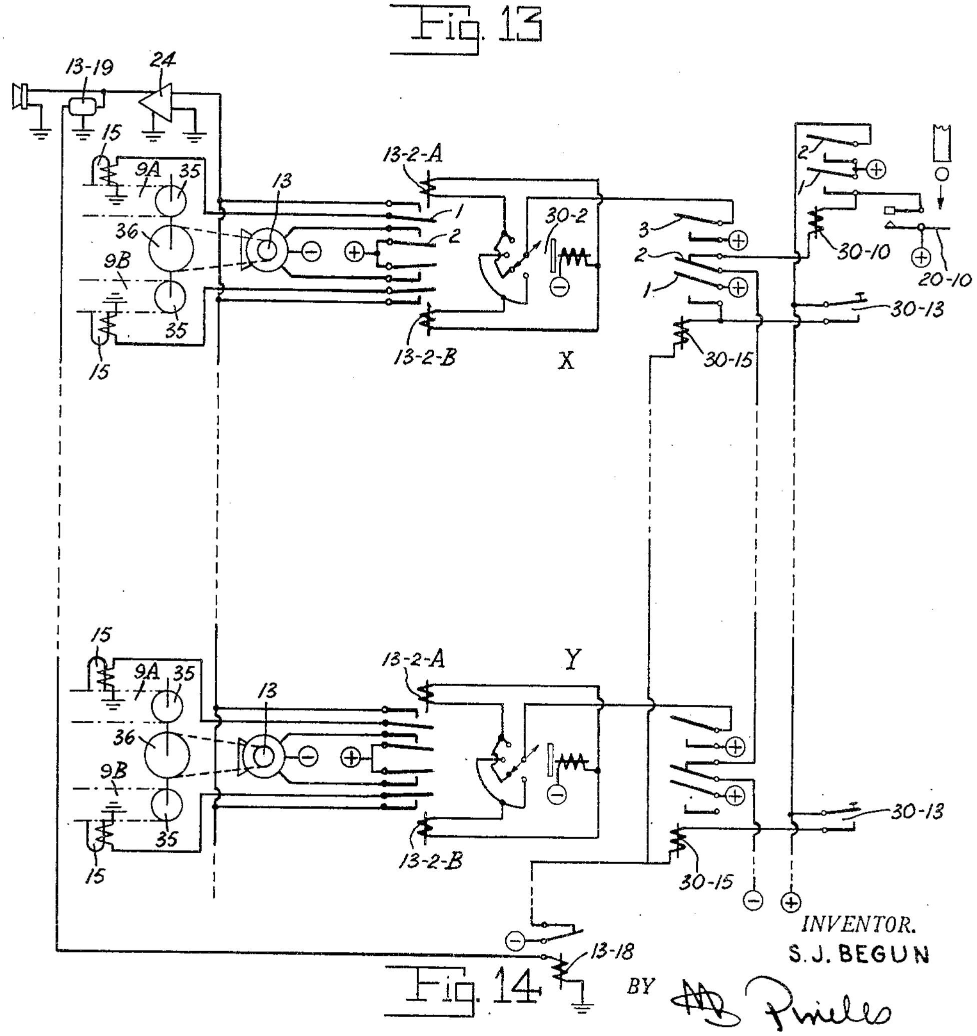
Figure 15:
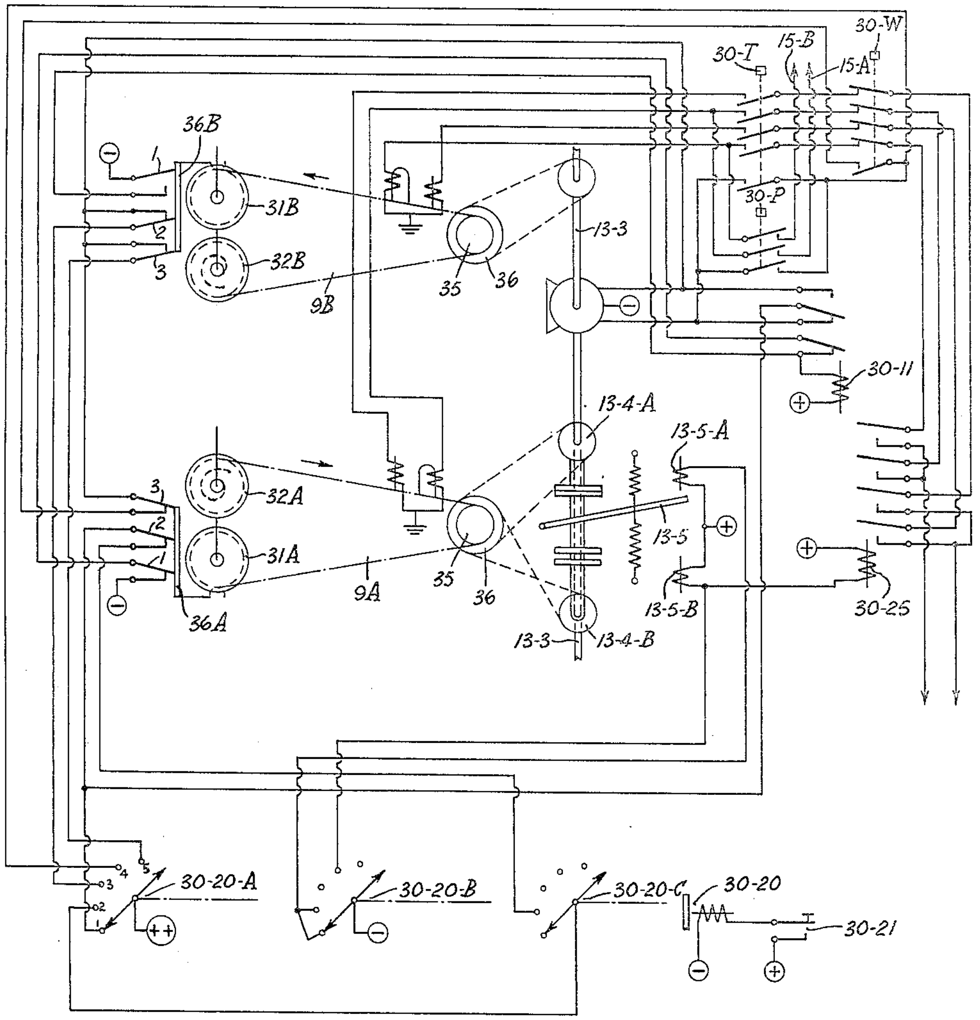
Figure 16:
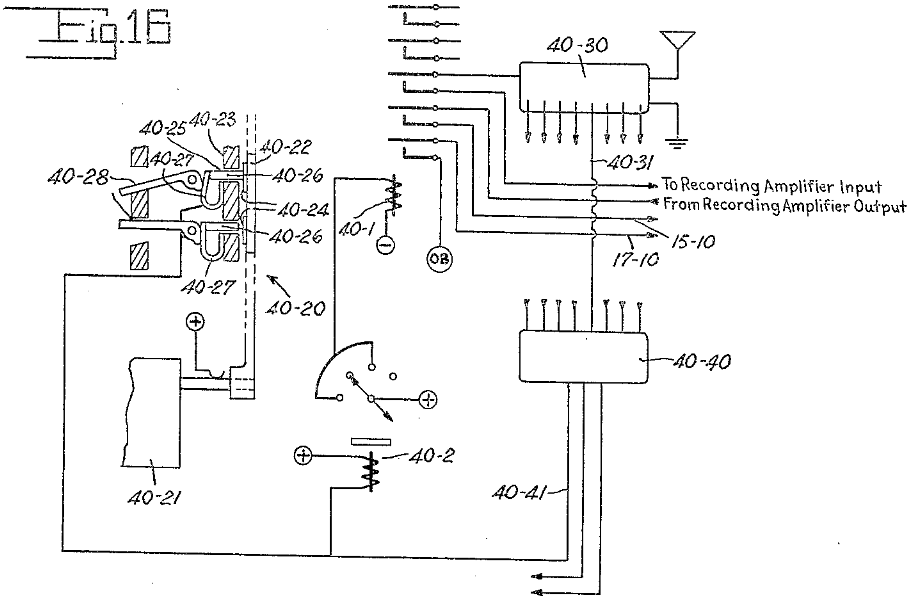
Figure 17:
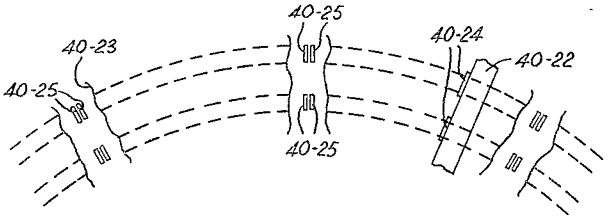

Figs. 11 to 16, inclusive, are diagrammatic views similar to Fig. 1 illustrating other forms of magnetic record transducing systems exemplifying the invention; and Fig. 17 is an elevational view of segmental portions of the contact dial plate shown diagrammatically in Fig. 16.

In Fig. 1 is shown one form of a control arrangement of the invention for automatically limiting the time as well as the manner in which a magnetic recording apparatus may be used. For the sake of simplicity, a magnetic recording mechanism is shown as having an endless magnetic record track 9, such as a magnetic tape or wire, guided over two rollers 12 and driven through a belt by a motor 13 past a transducing head having signal transducer elements 15 formed of a magnetic core structure and windings, and signal obliterating elements 17 arranged and located so that when the endless signal carrier 11 is driven in clockwise direction, for instance, each element of the record track 9 passes first through the obliterating elements 17 and then through the signal transducing elements 15 of the transducer head. The motor 13 which may be of the alternating type is shown supplied from the power supply leads of opposite polarity, indicated symbolically by (++) and (——).

There are also shown a relay-type recording switch 2—07, a microphone 22, a sound reproducing loudspeaker 23 and an amplifier 2—00. The recording relay switch 2—07 may be of the conventional telephone type and for the sake of simplicity, it is shown provided with a single set of contact spring blades 25, 26, 27 which are normally biased to the reproducing position shown in which blade 25 connects the windings of the signal transducer elements 15 to an input terminal IN of the amplifier 2—00, while blade 26 connects the output terminal OT of the amplifier to the reproducer 23, the circuit connections being completed through the grounded sides of the circuits.

For recording, the recording relay switch 2—07 is operated to flex its blades to the opposite recording position in which blade 27 connects the windings of the obliterating elements 17 to an obliterating terminal OB of the amplifier, while blade 25 connects the microphone 22 to the input terminal IN of the amplifier and blade 26 connects the output terminal OT of the amplifier to the windings of the signal transducer unit 15 of the transducer head for making a new record on the moving record track 9.

There is also shown a recording control arrangement 3—03 of the type disclosed in my application Serial No. 340,030, filed June 12, 1940, now Patent No. 2,356,145. It comprises a synchronizing cam disc 3—05, which is shown connected through a clutch and a speed reduction gearing to a synchronizing drive in the form of a motor 3—07, so correlated to the drive of the record track 9 that one rotation of the synchronizing cam disc 3—05 corresponds to one full cycle or length of a recording on the record track 9. The synchronizing cam 3—05 serves to operate a recording control switch 3—5 having two sets of blades 3—51, 3—52 for controlling the energization of the synchronizing motor 3—07 and of the coil of the recording switch relay 2—07.

The contact springs of the switches 3—51, 3—52 are biased so as to remain in the unflexed position shown when they are released into a notch shown formed on the periphery of the cam disc 3—05 and to be actuated to the flexed position when the cam disc is rotated either through its friction coupling by the synchronizing motor 3—07 or by the knob pointer 3—31.

To start a new recording, a slight turn is given to the synchronizing cam disc 3—05, for instance, by actuating the pointer knob 3—31, thereby actuating the two switches 3—51, 3—52 to the upward flexed position for energizing the motor 3—07 and for actuating the recording relay switch 2—07 to the recording position. The synchronizing switch arrangement 3—03 is so arranged and correlated that one complete rotation of the synchronizing cam 3—05 corresponds to one complete record track cycle, that is, one complete length of travel of the endless record track 9 past the transducing head 15 during a complete recording or reproducing operation.

As soon as the cam 3—05 has completed one rotation, its cam switch 3—5 is released into the cam depression, thereby stopping the rotation of the disc 3—05 and releasing the elements of the switch 3—5, whereupon the reproducing circuits are re-established and the synchronizing motor 3—07 is stopped. By manually turning the synchronizing cam 3—05 to a selected position of the dial 3—32, for instance, to a point 180° from its normal position, only half of the signal carrier will have a new record made thereon, while leaving on half of the endless signal carrier the previous recording.

In accordance with the invention, magnetic recording arrangements of the foregoing or analogous types may be combined with novel control arrangements for automatically limiting the time as well as the manner in which such magnetic recording apparatus may be used. Fig. 1 shows how to combine such recording apparatus with a fixed sequence control mechanism 4—00 and a selective sequence control mechanism 5—00 in accordance with the principles of the invention.

The fixed sequence control mechanism 4—00 is designed to enable a person to make a single recording on a predetermined length of the carrier and to have the recording repeated a predetermined number of times, each time a starting impulse is imparted to a control element, such as the starting switch 4—10. The selective sequence control mechanism 5—00 is so designed that upon giving a momentary starting impulse to a control element, such as a switch 5—10, the recording mechanism with its associated control unit 3—03 are rendered operative for a predetermined period of time during which the user may selectively make recordings and have the recordings reproduced in the same way as described above.

In the form shown, fixed sequence control mechanism 4—00 comprises a starting cam member 4—01 and a recording control cam member 4—02, which are arranged to be driven in predetermined synchronous relation with the motion of the magnetic record track 9, for instance, by a suitably synchronized motor 4—03.

The starting cam 4—01 operates a cam switch 4—1 which is normally held in its flexed position by one of a plurality of cam projections 4—19 against the biasing action of its contact springs 4—11, 4—12, which tend to return it into a cam depression. The recording cam 4—02 operates a cam switch 4—2 which is normally held in flexed position by a cam projection 4—29 against the biasing action of its contact springs 4—21, 4—22, 4—23, tending to return it to a cam depression. There is in addition provided a locking relay having an actuating coil 4—40 and a set of spring contact blades 4—41, 4—42, 4—43, which are actuated from the normally biased position shown to a flexed position when the locking relay coil 4—40 is energized.

The selective sequence control mechanism 5—00 is similarly provided with cams 5—01, 5—02, arranged to be similarly driven by a synchronizing motor 5—03 for operating cam switches 5—1, 5—2, and a locking relay having an actuating coil 5—40 and a set of contact blades 5—41, 5—42, 5—43, 5—44, arranged similar to the corresponding elements of the fixed sequence control mechanism 4—00. In addition, there is provided a shift relay having an actuating coil 5—50 and a set of contact spring blades 5—51, 5—52, 5—53, 5—54, 5—55. Signal lamps 3—19 and 3—29 serve to illuminate, respectively, for instance, a signal mark "listen" during reproducing and a signal mark "speak" during recording.

In the form of control arrangement shown, the main switches for energizing the amplifier and power circuits are assumed to be normally closed, and the recording switch 2—07 is arranged to be normally held in the flexed recording position by the following energizing circuit: From the positive relay supply lead (+), through the recording relay coil of switch 2—07, the normally closed shift relay contacts 5—51, to the closed cam switch contact 4—23 and therethrough to ground. Accordingly, the recording switch 2—07 will normally remain in the recording condition. However, the apparatus will not operate because the track driving motor 13 is normally held de-energized by the cam switch contacts 4—11 which are normally held open by a cam projection of cam 4—01.

Upon giving a starting impulse to the starting switch element 4—10, of the fixed sequence control mechanism 4—00, the recording apparatus is actuated to the recording condition for making a record on the carrier 9 and to thereafter repeat the recording a predetermined number of times. In the arrangement shown, such actuation of the recording apparatus involves the following sequence of operations: The momentary closure of the starting switch contacts 4—10 energizes the locking relay coil 4—40 through a circuit from the positive relay supply lead (+) by way of the closed cam switch contacts 4—22, the momentarily closed starting switch contacts 4—10 to the locking relay coil, 4—40 and therethrough to ground. The energization of the locking relay coil 4—40 actuates its contacts to the flexed positions completing at its closed contacts 4—43, a locking circuit, parallel to the starting switch contacts 4—10, which keeps the relay coil 4—40 energized after the starting switch 4—10 returns to its normal open position.

In addition, the flexed closed locking relay contacts 4—41 complete an energizing circuit for the tape driving motor 13 from the power supply lead (++), the other motor terminal being connected to the other power supply lead (——); and the flexed closed relay contacts 4—42 complete an energizing circuit for the synchronizing motor 4—03 from the power supply lead (++), the other motor terminal being connected to the power supply lead (− −) of opposite polarity.

The locking relay 4—40 is designed to instantaneously operate its contacts to their flexed positions, so that, upon actuation of the starting relay 4—10 the track driving motor 13 and the synchronizing motor 4—03 of the fixed sequence control mechanism 4—00 are instantaneously set into operation.

As soon as the energized synchronizing motor 4—03 starts to rotate, in clockwise direction, for instance, the cam disc 4—01 releases its switch 4—1 to its normally biased position in which its closed sets of contacts 4—11, 4—12 complete locking circuits which are parallel to the circuits completed by the flexed locking relay contacts 4—41, 4—42, respectively, so as to maintain the tape driving motor 13 and the synchronizing motor 4—03 energized even if the starting relay 4—10 is de-energized. Since the recording relay switch 2—07 is in the recording position, the apparatus will now operate in its recording condition and continue therein as long as the raised cam portion 4—29 keeps its switch 4—2 in the flexed position, which completes at its closed contacts 4—22 the energizing circuit for locking relay coil 4—40, and at its closed contacts 4—23 the energizing circuit for the recording relay coil 2—07.

The peripheral length of the raised cam portion 4—29 of the cam 4—02 corresponds to the length of a complete recording which is to be made on the traveling magnetic carrier 9, and the initial element of cam portion 4—29 establishes its engagement with the switch 4—2 at the end of each operating sequence of the apparatus. Accordingly, the moment the cam disc 4—02 has turned by an angle corresponding to cam portion 4—29, its cam switch 4—2 is released into the flexed cam depression position in which its contacts 4—23 open the energizing circuit through the recording relay coil 2—07, thereby establishing reproducing conditions, while contacts 4—22 open the energizing circuit through locking relay coil 4—40, which releases its contacts to their normal positions shown.

The tape driving motor 13 and the synchronizing motor 4—03 remain energized at the closed cam contacts 4—11, 4—12 which remain in the released condition during the period of time corresponding to the segmental angle of the cam depression of cam 4—01. Accordingly, the apparatus remains operative and since the recording switch is now in the reproducing position, the just completed new recording will be reproduced.

The peripheral length of the cam depression extending between two cam projections of cam 4—01 corresponds to a full operating cycle required to make a recording on the predetermined length of the tape of the magnetic carrier and to repeatedly reproduce the recording as soon as it is completed. In the present case, the arcuate length between the cam projections 4—19 of cam 4—01 is three times the arcuate length of the cam projection 4—29 of cam 4—02 so that each recording is repeated twice immediately after completion of the recording.

After completion of such full operating cycle, the next cam projection of cam 4—01 lifts its cam switch 4—1 to the raised position, opening at its contacts 4—11, 4—12 the energizing circuits to the tape driving motor 13 and the synchronizing motor 4—03, respectively, thereby restoring all the operating circuits to the original conditions.

By a control arrangement based on the principles just described, the user may, by a momentary impulse, given the starting switch 4—10, for instance, set the recording apparatus in operation so as to enable him to make a recording on a predetermined length of a magnetic carrier and to have his recording repeated a predetermined number of times so as to enable him to study and observe his speech.

The signaling lamps 3—19, 3—29, are arranged to selectively indicate to the user the operating condition of the apparatus while he is using it, lamp 3—19 indicating a play-back cycle, and lamp 3—29 a recording cycle. In the form shown, the two lamps 3—19, 3—29, each having one terminal connected to one power supply lead (− −), have their other terminals selectively connected to the other power lead (++) through the double-throw contacts 4—21 of cam switch 4—2. In the recording position in which the cam switch blade 4—21 is shown, it completes an energizing circuit for the signal lamp 3—29 from one lamp terminal, by way of the closed shift relay contacts 5—54 to the lead through which the tape driving motor is energized during the full recording and reproducing cycle.

After the recording is completed, corresponding to the turning away of the cam projection 4—29 of cam 4—02, its cam switch blade 4—21, is released to the other position, de-energizing the recording signal lamp 3—29, and energizing the reproducing signal lamp 3—19 through the same circuit. Both signaling lamps 3—19, 3—29 are automatically extinguished and the signaling means are thus rendered inoperative upon completion of the full recording and reproducing cycles when the next projection of cam 4—01 lifts its cam switch 4—1 to the flexed position shown in which its contacts 4—11 open the energizing circuit through which the tape driving motor 13 and the signaling lamps 3—19, 3—29 are energized.

The selective sequence control mechanism 5—00 is designed and arranged to render the recording apparatus available during a predetermined length of time for selective recording or reproducing in accordance with the desire of the user.

In order to render the apparatus available for such selective recording and reproducing, the user has merely to give a starting impulse to a starting element, such as the starting switch 5—10. Momentary actuation of the starting switch 5—10 completes an energizing circuit for the locking relay coil 5—40 from the positive relay supply lead (+), the closed switch cam contacts 5—2, and momentarily closed starting switch contacts 5—10 to the locking relay coil 5—40 and ground. The energization of the locking relay coil 5—40 actuates its contacts to the flexed positions completing at its closed contacts 5—43, which are connected in parallel to the starting switch 5—10, a locking circuit for the relay 5—40. In addition, its flexed closed contacts 5—41, 5—42 complete energizing circuits for the tape driving motor 13 and for the synchronizing motor 50—03 of the control mechanism 5—00. Furthermore, the flexed closed locking relay contacts 5—44 establish an energizing circuit for the shifting relay coil 5—50, which, upon actuation, shifts the selective control of the recording and reproducing operation from the control mechanism 4—00 to the recording control mechanism 3—03, which enables the user to selectively make new recordings and have them reproduced as often as desired.

In its operated position the shift relay 5—50 establishes the following operating circuits: The flexed shift relay contacts 5—55 connect the cam contact 3—51 of recording control mechanism 3—03 to motor supply lead (++) so that selective operation of cam switch 3—5 enables selective energization of its cam drive motor 3—07, while flexed shift relay contact 5—54 opens the control circuit through which the fixed sequence control mechanism 4—00 controls the operation of the indicating lamps 3—19, 3—29; flexed shift relay contact 5—53 connects the circuit of the indicating lamp 3—19 to the lower contact of control cam contacts 3—51 for indicating the playback cycle when the cam switch 3—5 is in the lower position shown, while flexed shift relay contact 5—52 prepares the circuit for indicating lamp 3—29 which is completed to indicate a recording cycle, when cam switch 3—5 is actuated to the raised recording position; and flexed shift relay contact 5—51 disconnects the recording relay of switch 2—07 from the contacts of fixed sequence control means 4—00, and connects the recording relay to the cam control contacts 3—52.

The initiation of the rotary motion of the cam discs 5—01, 5—02 of the selective sequence control mechanism 5—00 releases cam switch 5—1 to its biased depressed position, establishing at the closed released contact sets 5—11, 5—12, 5—23 circuit parallel to those established by lock relay contacts 5—41, 5—42, 5—44 in a manner analogous to the operation of the similar cam switch contacts 4—11, 4—12 of the control mechanism 4—00. In the course of its further rotary motion, cam 5—02 releases its cam switch 5—2 to open the locking circuit of its locking relay 5—40, restoring it to its normal position.

The user will then have available the recording apparatus for selectively recording and reproducing speech thereon by the operation of the control mechcanism 3—03 for the duration of one revolution of the cam disc 5—01, which after at the end of a complete revolution, opens all the energizing circuits at the outwardly flexed contacts of its cam switch 5—1, while cam disc 5—02 actuates its cam switch 5—2 to the flexed position to prepare the locking circuit for the locking relay coil 5—40.

Instead of using the shift relay 5—50 to establish the operating circuits through which the recording control arrangement 3—03 controls the operation of the recording mechanism, it may be re-arranged to normally prepare the circuits required for utilizing the control arrangement 3—03 for controlling the operation of the recording mechanism.

Figure 1A:
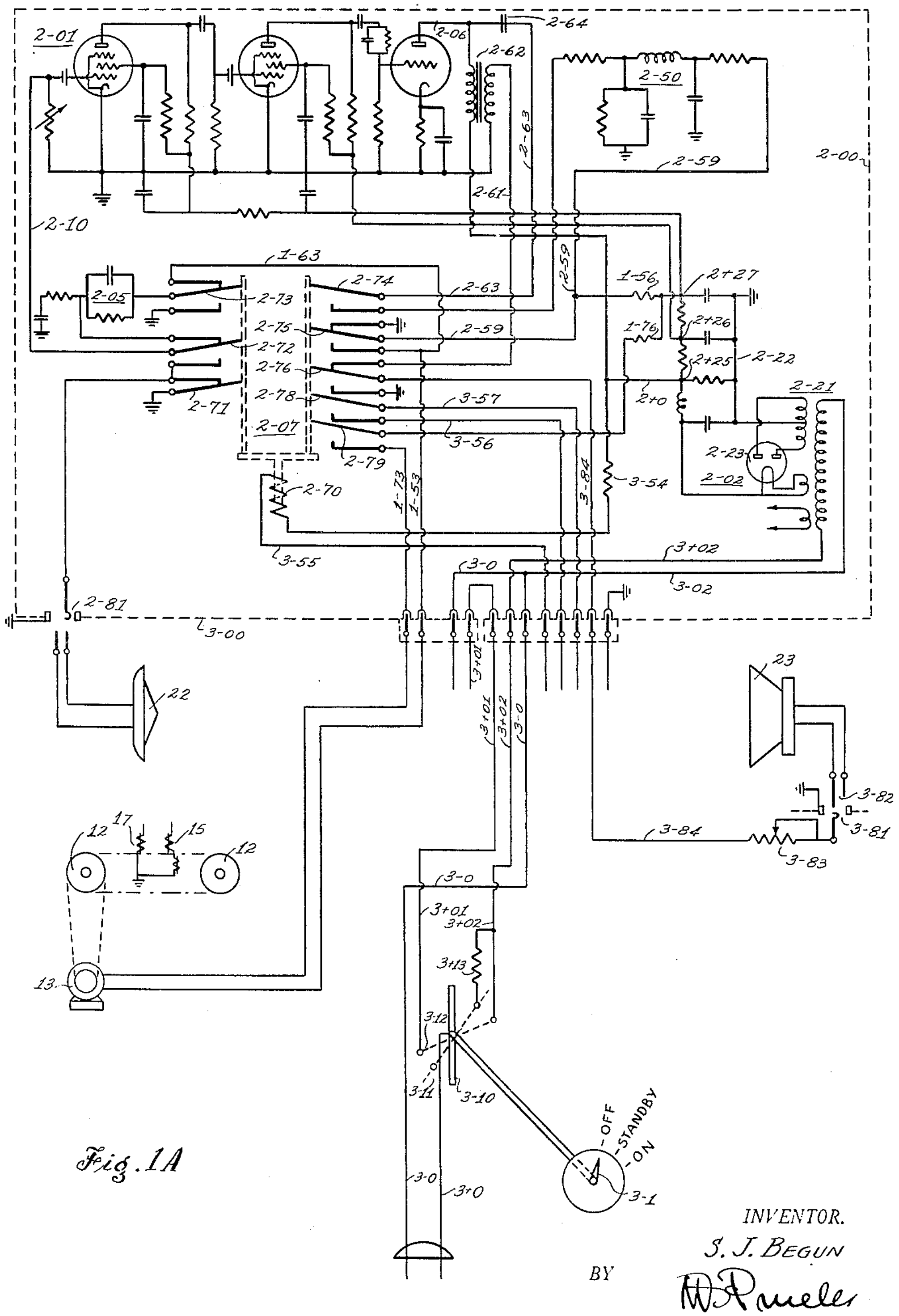

Fig. 1A illustrates diagrammatically the electric circuit connections of the various elements of one form of a magnetic recording amplifier.

The amplifier arrangement 2—00 comprises an amplifier 2—01, a power supply system 2—02 and a recording relay 2—01. The power supply system 2—02 comprises a transformer 2—21 having a primary winding and secondary windings to which are connected a rectifier tube 2—23 and a filter network, formed of a choke coil, condensers and resistors connected through a lead 2—22 to ground and arranged to deliver at its terminals 2+25, 2+26, 2+27, filtered positive D. C. voltage required for operating the amplifier and other elements of the apparatus.

The amplifier 2—01, has, as shown conventionally, a grounded side, and an input lead 2—10, through which the input, that is to be amplified, is impressed upon the amplifier. The amplified output is delivered by the amplifier through an output lead 2—06 either to a low impedance output lead 2—61 by way of a transformer 2—62, or by way of coupling condenser 2—64 to a high impedance output lead 2—63.

The amplifier 2—01 may be of the conventional type and is designed to have a gain which is sufficient to deliver with an input voltage induced by a magnetic recording in the transducing coil windings 1—61, an output sufficient to operate a conventional loudspeaker. An equalizing network 2—05 is connected in the input circuit of the amplifier during the reproducing process and an equalizing network 2—50 is connected in the high impedance output circuit of the amplifier during the recording process, so as to give an overall amplification which secures high quality recording and reproduction of speech and music.

The recording relay 2—07 is of the conventional telephone relay type. In the form shown it has an actuating coil 2—70 and two sets of contact spring blades 2—71 to 2—73 and 2—74 to 2—79 which are normally biased to establish, in conjunction with their associated contact springs, the circuits required for reproducing a recording previously made on the magnetic carrier. Upon energization of the recording relay coil 2—70, its contact spring blades are flexed to their opposite contact positions in which they establish the circuits to make a new recording on the magnetic carrier.

There is also shown a jack 2—81, having a grounded contact for connecting a cord plug from a phonograph pickup or a microphone to the input side of the amplifier.

The apparatus is shown designed for energization from a domestic alternating current (A. C.) power supply circuit through two supply leads 3+0, 3—0 of opposite polarity. An energizing switch having a contact blade 3—10 which may be actuated, for instance, by a pointer knob 3—1, serves to energize or deenergize the operating circuits of the apparatus. The energizing switch blade 3—10 is movable from the open position, shown in the drawings, to the position 3—11, in which it connects the power supply lead 3+0 by way of a current limiting resistance 3+13 and a lead 3+02 to one end of the primary winding of transformer 2—21, the other end of which is connected to a cord extension of the other power supply lead 3—0 of opposite polarity.

The current limiting resistor 3—13 through which the amplifier transformer 2—21 is energized in the standby position 3—11, is so proportioned as to apply a reduced voltage to the amplifier tube cathodes sufficient to heat them to a sub-normal temperature and to enable rendering the amplifier fully operative the instant the energizing switch blade 3—10 is moved from position 3—11 to position 3—12, in which the transformer 2—21 is fully energized from the power supply lead 3+0.

When the energizing switch blade 3—10 is moved to the position 3—12, it also completes an energizing circuit from the power supply lead 3+0, by way of lead 3+01 and its cord extensions to the tape driving motor, the other terminal of which is connected to an extension of the power supply lead 3—0 of opposite polarity, thereby actuating the tape driving motor to drive the tape at its normal uniform speed.

The unit may have also mounted a jack 3—81, one side of which is grounded, for receiving the cord plug 3—82 leading to a reproducer such as a loudspeaker 23. A volume control potentiometer 3—83 mounted on the control unit enables adjustment of the volume of the sound delivered by the reproducer 23.

When the energizing switch 3—10 is in its "on" position 3—12, in which the amplifier and the tape driving motor are fully energized, a record previously made on the magnetic carrier is set for reproduction, the recording relay 2—07 remaining biased in the normal position shown in the drawings in which its contact springs establish the following record reproducing circuits:

An amplifier input circuit from the transducer, in which the moving magnetic wave of the tape induces a signal voltage, through leads 1—53, 1—63, by way of the cord, the closed recording relay contacts 2—73, the equalizing network 2—05, and the recording relay contacts 2—72 to the input lead 2—10 of the amplifier so as to impress thereon the signal voltage which is to be amplified, the circuits being completed through the grounded sides of the transducer and the amplifier.

An amplifier output circuit from the secondary winding of the output transformer through the low impedance output lead 2—61, the closed contacts 2—76 of the recording switch, by way of the cord lead extension of the reproducer lead 3—84 to volume control potentiometer 3—83 and jack 3—81 to the reproducer 23, the various circuits being completed through the conventionally indicated grounded sides of the output transformer winding and the jack.

In order to make a recording, the recording relay 2—07 is energized to establish in the flexed position of its contact blades the following circuits:

A recording amplifier input circuit from the microphone 22, for instance, through jack 2—81, the closed flexed recording relay contact 2—72, to the amplifier input lead 2—10, for impressing the microphone output on the input side of the amplifier. The microphone 22 shown in the drawings is of a high impedance type, such as a crystal microphone, and requires no step-up transformer for coupling it to the input side of the amplifier.

A recording amplifier output circuit from the high-impedance amplifier output lead 2—63, through the closed flexed recording relay contact 2—74, the recording equalizing network 2—50, junction lead 2—59, the closed flexed recording relay contacts 2—75, the cord lead extension 1—53 through the transducer to ground, the circuit being completed by the grounded side of the amplifier. The same circuit supplies to the transducer a superimposed biasing current through the connection to its lead 2—59 by way of a current adjusting resistor 1—56, to the positive terminal 2+27 of the filter rectifier circuit 2—02.

At the same time, there is also supplied a direct current to the obliterating coil of the obliterating pole piece from the positive filter terminal 2+27, through the current adjusting resistor 1—76, closed flexed recording relay contacts 2—79, cord-lead extension 1—73 and the obliterating coil to ground, the circuit being completed through the grounded side of the filter circuit.

The filter-rectifier circuit which is shown in detail in Fig. 1A at 2—02 includes the conventional arrangement of power transformer 2—21, rectifier tube 2—23 and filter condensers, chokes and resistors. The rectifier tube is shown as of the full-wave vacuum type including a cathode connected for heating by the output of a secondary winding of the power transformer 2—21, two anodes being also provided and connected to another output winding of the power transformer. The rectified pulsating output of the rectifier tube 2—23 is taken from between the cathode of the tube and the center tap of the anode winding of the transformer and smoothed by passing through the condenser-choke-resistor network to filter out the pulsations, leaving essentially a pure direct current for feeding to the desired locations. The filtration is shown as taking place in stages providing a first output terminal 2+25 of relative crudely filtered D. C. which can be used to operate the final or power amplifier stage of the amplifier and for other applications including the operation of the control circuits, a second output terminal 2+26 of fairly well-filtered D. C. for operating lower level stages of the amplifier and a third output 2+27 of substantially pure D. C. for the initial amplifier stage.

The principles underlying the control arrangements described in connection with the exemplifications of the invention shown in Fig. 1 will suggest various modifications, applications, and forms thereof.

Arrangements of the type shown in Fig. 1 may be utilized for selectively controlling the operation of a magnetic recording apparatus in accordance with the size of a coin deposited in a coin slot mechanism.

One form of such coin slot mechanism is shown at 6—00. It comprises a downwardly inclined flat coil sorting duct 6—01 which is curved in the plane of its least dimension so that a coin deposited in a coin opening 6—11 will roll downwardly along the bottom of the duct while bearing centrifugally against its outer wall 6—12. The inner wall of the duct 6—01 has a slot opening 6—13 in the front of which is located a magnet 6—14 supported on an interposed shielding plate 6—15, so as to deflect from the sorting duct 6—01, magnetic slugs, of iron, for instance.

The lower portion of the outwardly curved duct wall 6—12 is provided with a notched opening 6—16 below which are located two hoppers 6—21, 6—22. The notched opening is arranged in a conventional manner and has an opening section of a height slightly less than the diameter of the smallest coin, a dime, for instance, adapted to be handled by the mechanism, an opening section having a height through which a dime, for instance, will be centrifugally thrown into the hopper 6—21, an opening section, which is sufficiently large to permit coins, such as a penny or a nickel, to be thrown out by centrifugal force, and an opening section through which a quarter is centrifugally deflected into the hopper 6—22. The lower end of the duct 6—01 has an opening through which all other coins or slugs which should be rejected drop out.

An assorted coin, dropped either in hopper 6—21 or 6—22, respectively, is guided by the hopper into a flat delivery duct 6—23, 6—24, respectively, along the bottom of which the coin rolls toward the downwardly facing opening 6—25 provided in each of the ducts. Below each downwardly facing opening 6—25 of the two delivery ducts 6—23, 6—24 is located an anvil 6—26 which is designed and arranged so that a coin discharged from the duct opening having the proper weight and characteristics should rebound into a hopper of one of the discharge ducts 6—27, 6—28, respectively. This arrangement assures that only a sorted coin, of proper value, will reach either the discharge duct 6—27 or the discharge duct 6—28, and roll on the bottom thereof dropping down through the open end thereof either on the projecting lever portion of the starting switch 4—10 or the starting switch 5—10 for setting into operation either one or the other of the control mechanisms 4—00, 5—00, in accordance with the denomination of the deposited coin.

With such arrangement, the deposit of a dime into the slot opening 6—11 will enable the user to make a recording of a predetermined length of time and have his recording repeated a predetermined number of times; and the deposit of a quarter, for instance, will enable the user to selectively make new recordings and have them repeated any desired number of times during a predetermined time, for instance, a quarter of an hour. At the end of the period, determined by the deposited coin, the recording and reproducing operations are automatically stopped, and the apparatus is restored to the normal nonoperating condition.

Figure 2:
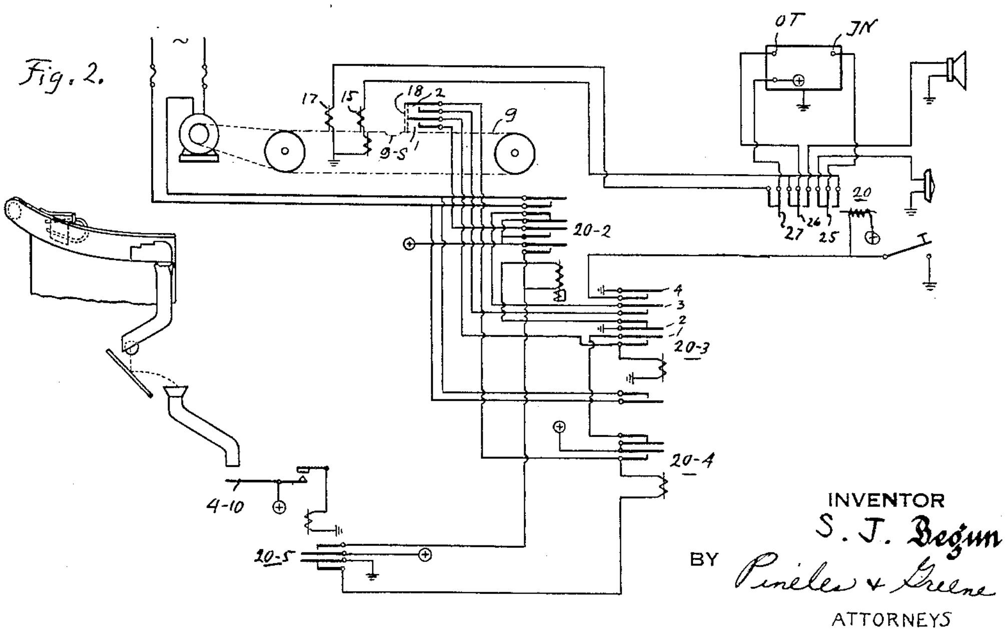
Figs. 2, 3 and 4 are views similar to Fig. 1 of modified forms of record transducing arrangements of the invention.

In Fig. 2 is shown another form of a fixed sequence control mechanism for a magnetic recording apparatus. It has a recording mechanism and a recording relay arrangement 2—07A with associated elements similar to those of Fig. 1, except that the spring blades of the recording relay switch 2—07A are shown normally biased to the recording position and the coil of the relay 2—07A has to be energized to the operative position for playback.

The recording-reproducing operation is synchronized with the operating cycle of the signal carrier by providing the signal carrier with a synchronizing signal element indicated by a depression 9—S which is utilized to operate a synchronizing switch 20—1 when the synchronizing element 9—S of the signal carrier moves past the rod element 18 of the synchronizing switch 20—1. In the arrangement shown, the synchronizing switch has spring blade contacts which are biased to press the rod element of the switch against the signal carrier so that the switch blades are momentarily released to the opposite position when the synchronizing element 9—S moves past the switch.

There are further provided a multi-blade relay 20—2, which is indicated as being of the time delay type, a multi-blade contact relay 20—3 and two additional relays 20—4, 20—5. As in the arrangement of Fig. 1, the operation of the system may be controlled by a coin chute having a coin operated starting switch 4—10, an additional selector switch 20—6 permitting selective control of the manner in which the recording apparatus is used. The switch 20—1 may be of the type known commercially as a Micro switch which operates abruptly from one position to the other in response to a small motion imparted to its operating rod.

Further details of the arrangement shown in Fig. 2 will be clear from the further description of its operation. It is assumed that the mechanism was in operation and that in a previous operation the motion of the signal carrier has been stopped when the synchronizing element 9—S has left its operative engagement with the synchronizing switch 20—1 so that it is back in the flexed position shown. If now the starting switch 4—10 is momentarily actuated, as by a dropped coin, it will momentarily operate the contacts of the relay 20—5 to their operative position. Alternatively, the starting switch 4—10 may be directly equipped with two contacts of the relay 20—5 so that the dropping of a coin flexes its two contacts to the operative position.

Momentary actuation of the contacts of relay 20—5 to the operative position will actuate relay 20—2 through the following circuit: From the positive relay supply (+), through the flexed upper contacts of relay 20—5, to the coil of relay 20—2, and therefrom to the closed contact 2 of relay 20—3 to ground. Relay 20—2 will be operated and will be held in the operative position through a holding circuit established by its contacts 1 which are parallel to the contacts 1 of relay 20—5. The flexed operative contact 4 of relay 20—2 energizes the motor 13 and the record track 9 starts to move in clockwise direction. After completing one cycle, the synchronizing switch is momentarily released by the synchronizing signal 9—S of the signal carrier, thereby closing the two switch contacts of the synchronizing switch.

In the operative position, the lower closed contact of the synchronizing switch 20—1 will close the following circuit: From the positive relay supply (+), through closed contact 2 of relay 20—2, through the lower closed contact of synchronizing switch 20—1, to the coil of relay 20—3, the other end of which is grounded, and causing it to operate. On being operated, relay 20—3 will establish a holding circuit at its contacts 1, the holding circuit leading through the non-operated closed contacts 2 of relay 20—4. The operated relay 20—3 will also close at its contacts 4 an energizing circuit for the relay of switch 2—07—A so that the apparatus is set for playback by the flexing of the switch 2—07—A.

Furthermore, the operated relay 20—3 operates at its flexed open contacts 2 the holding circuit of relay 20—2 which is not immediately returned to its open position because of the time delay while the operated contact 3 of the relay 20—3 prepares an actuating circuit for relay 20—4 so that it may be closed by the next operation of the synchronizing switch when the endless magnetic signal carrier 9 has completed a second cycle of its operation. As a result, the motor will remain energized and the record track 9 will be in a recording or reproducing position regardless of whether relays 20—2 or 20—3 are operated.

The synchronizing element 9—S is so arranged on the record track 9 that, due to the inertia of the system, the synchronizing signal will, after reaching its position opposite switch 20—1, move past it, even if the motor is de-energized by the operation of the synchronizing switch, so that when the motor is stopped, following momentary flexing of the switch, the further short motion of the signal carrier will restore the synchronizing switch 20—1 to its biased open position shown in which the motor is de-energized. As a result, at the end of the second operating cycle of the signal carrier, brought about by the operation of relay 20—3, the synchronizing switch 20—1 will again be momentarily operated by the synchronizing element 9—S, thereby closing at its upper contacts an energizing circuit for relay 20—4 and causing it to operate.

The energizing circuit for relay 20—4, so established by the closure of the upper contacts of the synchronizing relay 20—1, is as follows: From positive relay supply (+), through the closed contacts 3 of relay 20—2, through the closed contacts 3 of relay 20—3, to the upper closed contacts of the synchronizing relay 20—1, to the coil of relay 20—4, and therefrom through the closed lower contacts of relay 20—5 to ground. The operated relay 20—4 closes for itself a holding circuit at its contacts 1 while its contacts 2 open the holding circuit for relay 20—3 so that relay 20—4 remains energized, while relays 20—2, 20—3 are both de-energized, this being the normal condition of the system. As soon as the starting switch 4—10 is again closed, the sequence of operating cycles described above will repeat itself.

The recording switch is shown normally in the recording position so that as soon as the first cycle of the signal carrier starts, a new recording may immediately be started. When the second cycle is started by the closure of the relay 20—3, its operated contacts 4 will energize the relay 2—07A to re-establish the reproducing condition so that the record made during the first cycle of operation shall be automatically reproduced during the second cycle of operation. Once a recording has been made, the recording may be reproduced more than once by subsequently actuating the starting switch 4—10 to start another two cycles of operation and closing the switch 20—6 so as to bring the recording relay 20—A to the reproducing position during the first cycle of the record track 9.

In other words, during the first cycle of the signal carrier under the control of the relay 20—2, the reproducing conditions may be at any time established by actuating the switch 20—6 to the closed position for energizing the recording relay 2—07A to flex its blades to the reproducing position. Relay 20—2 is time delayed so as to keep its contacts 3 open and prevent operation of relay 20—4 during the interval between the first operating cycle of the record track 9 and its second operating cycle while the synchronizing switch 20—1 is momentarily operated to actuate relay 20—3 to the operated position and release relay 20—2 to the non-operated position.

Magnetic recording arrangements of the type described above are not only ideally suited for objective study of speech and similar educational uses, but are also of great value in many other fields.

In many applications it is desirable to combine an educational, or advertising talk with reproductions of music from a radio broadcast, or a phonograph, or some other form of entertainment.

In some applications, such as in the advertising or exhibition fields, picture devices are frequently used for periodically exhibiting a series of pictorial illustrations with a view to attracting the attention of on-lookers. Such advertising devices use either a series of still pictures which are automatically changed in a given sequence, or still or moving pictures which are periodically exhibited to the passing public. In most cases, such devices are designed to permit ready substitution of one picture sequence for another.

The value of such activities would be greatly enhanced if each pictorial illustration would be accompanied by a reproduction of a recorded talk explaining its significance and callinng the attention to its special features.

In order to be satisfactory, arrangements for synchronizing recorded talks with entertainment or pictorial sequences must be foolproof in operation so that a layman may readily start and stop, or otherwise control their operation, without interfering with the synchronization. In addition, they must be of a construction that would render it possible for a person having no technical skill to change the recordings without disturbing the synchronization.

Magnetic recording arrangements of the invention are ideally suited for such activities and make it possible to readily change the synchronized recordings and to adapt them to new picture sequences.

Figures 3, 4:
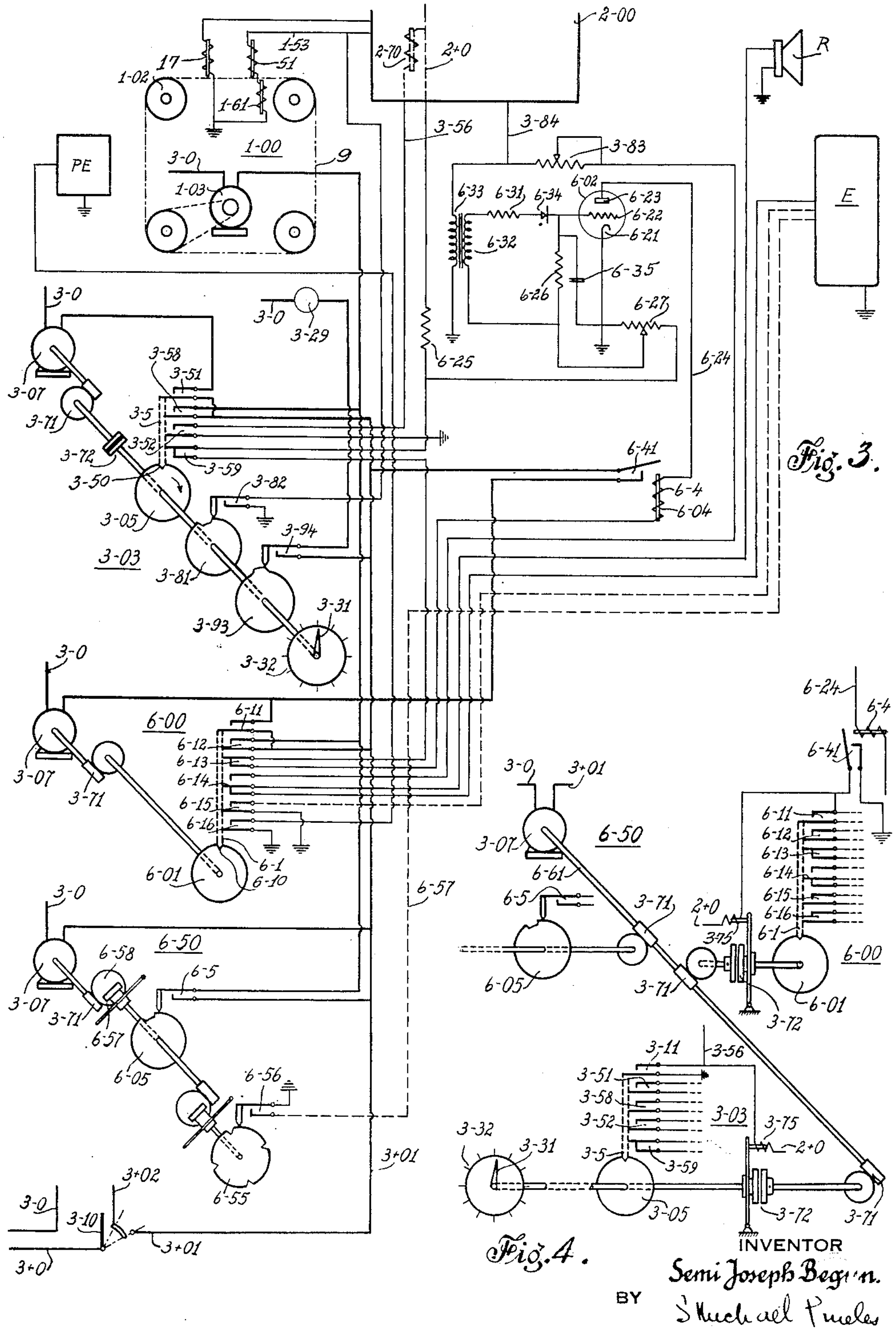

Fig. 3 illustrates diagrammatically one simple form of an arrangement for synchronizing the operation of a magnetic recording apparatus with an entertainment device. For the sake of simplicity, it is shown in connection with an endless magnetic recording apparatus 1—00 of the type shown in Fig. 1, and an entertainment device E, such as a radio-phonograph with an automatic record changer. Power supply leads 3—0, 3+01 deliver electric energy to a track driving motor 1—03 and to its amplifier power supply, and a lead 2+0 from its rectifier-filter supplies a positive D. C. operating voltage for the relay and control circuits.

As in Fig. 1, a recording relay switch shown here as having an actuating coil 2—70 and as part of the amplifier 2—00 is used to selectively establish the recording and reproducing circuits between the magnetic transducing coils of the recording apparatus 1—00 and the amplifier so that in its normal reproducing position, the recording switch completes the circuit from the low impedance lead of the amplifier through lead 3—84 and the volume control potentiometer 3—83 to the reproducer R, for reproducing a recording when the apparatus is in operation.

The apparatus is provided with a recording control unit 3—03, for instance, of the type shown in Fig. 1, which is modified by providing in addition a recording synchronizing cam surface 3—81 for operating a switch 3—82 by means of which a synchronizing signal is magnetically impressed on a portion of the endless magnetic record track 9 each time a new recording is made.

The synchronizing signal is magnetically impressed only on an extremely small length of the carrier cycle. Thus, in the practical construction of a recording arrangement of the type shown in Fig. 3, it was found that a magnetically impressed synchronizing signal of the order of five to ten seconds is sufficient for synchronizing the operation of such arrangement.

In the form of the invention shown in Fig. 3, the synchronizing signal is magnetically impressed on the magnetic record track 9 by leaving a synchronizing portion of the magnetic track in a uniformly magnetized condition, so that in moving past the magnetic head winding it will not induce therein any signal voltage. In other words, the synchronizing signal is a silent pause signal magnetically impressed on a portion of the tape each time a new recording is made, so that in reproducing the recording, the period of the tape or carrier reproducing cycle will be shorter than the period of the carrier cycle by the period or length of the silent-pause synchronizing signal.

In the form shown, the synchronizing signal switch 3—82 is provided with spring contacts which are biased to the closed cam depression position to complete a circuit which short-circuits the output lead connection 1—53 through which the output side of the amplifier impresses the amplified signal voltage on the transducer head 15 during the recording operation, so as to assure that no signal is recorded as long as the synchronizing signal contacts 3—82 are closed.

The synchronizing signal cam surface 3—81 is shown provided with a depression which is so aligned with the cam depression 3—50 of the main recording control cam surface 3—05 as to assure that each time a recording is made, an initial portion of the carrier cycle length will have impressed thereon a silence signal, that is, a signal which during the reproducing process will not induce any signal voltage in the transducer head 15; and to assure that the recording operation, and the motion of the record track 9 are stopped at a moment when the silent synchronizing signal impressed on the moving carrier has reached a position of alignment with the pole pieces of the transducing head 15.

Practical experience has shown that a silence signal of the order of five to ten seconds at one point of the magnetic track cycle is sufficient for synchronizing the reproduction of the tape record in the way described hereinafter. In the form shown, the cam depression of the synchronizing cam surface 3—81 is of sufficient length, and so placed in relation to the cam depression of the recording synchronizing cam surface 3—05, that during the initial portion of each recording cycle the silence signal is impressed on the initial part of the recording cycle so that the carrier length available for reproducing, that is, the reproducing cycle is equal to the recording cycle of the recording synchronizing cam 3—05 less the period of silence-pause synchronizing signal. The recording control mechanism 3—03 may also be provided with an additional cam surface 3—93 for actuating a switch 3—94 to maintain energized a recording signal lamp from the end of the silent signal to the end of the recording operation.

In accordance with the invention, automatic means are provided to assure that under normal operating conditions, each time the apparatus is actuated to reproduce, the reproducing cycle shall start at the end of the silence signal impressed on the record track 9 and shall automatically stop at the end of the reproducing cycle, when the silence signal on the carrier has been reached after reproducing the complete length of the endless tape on which the signal has been recorded. To this end, the recording, as well as the reproducing operations, are automatically controlled to assure that at the end of each recording or reproducing cycle the motion of the magnetic record track 9 is stopped at the moment when the silent synchronizing signal portion of the carrier reaches a position of alignment with the transducing pole pieces of the magnetic head.

In the form shown, there is provided for this purpose, a reproduction or pick-up synchronizing mechanism 6—00, which is set in operation each time a reproducing cycle is to be started by the synchronizing signal impressed on the magnetic record track 9. The pick-up synchronizing mechanism 6—00 is shown formed of a pick-up synchronizing or control cam surface 6—01 having a cam depression for operating a play-back control switch 6—1. The play-back control cam 6—01 is driven through a suitable reduction gearing in predetermined synchronized relation to the travel of the tape, for instance, by a synchronizing motor 3—07. The play-back control switch 6—1 has spring contacts which are normally biased to the unflexed cam depression position and are actuated to the flexed position when the cam 6—01 starts to rotate, being released into the cam depression at the end of one revolution.

In the arrangement shown, the motor 3—07 of the reproduction synchronizing mechanism 6—00 is arranged to be automatically started at the beginning of each reproducing cycle by the synchronizing signal impressed on the magnetic carrier. Any arrangement which utilizes the magnetically impressed synchronizing signal of the moving tape for setting in operation the synchronizing cam 6—01 may be used for this purpose.

In the form shown, the reproducing synchronizing mechanism 6—00 is set in operation by the signal voltage induced in the transducing pole pieces by the initial part of the signal recorded on the tape immediately following the end of the synchronizing silence signal that is magnetically impressed on the record track 9. To this end, the amplifier output lead 3—84, through which the amplified signal output voltage induced in the transducer coils 1—51, 1—61 is impressed on the reproducer R, has connected thereto a control circuit including a control tube 6—02 which is actuated in response to an induced signal voltage to operate a starting relay 6—04, the actuation of which sets in operation the reproducing synchronizing mechanism 6—00.

The control tube 6—02 may be of the gaseous glow tube type having a cathode 6—21, a control grid 6—22 and an anode 6—23. The cathode 6—21 is shown grounded and the anode 6—23 is connected through an anode lead 6—24 to a source of positive potential, such as lead 2+0 from a terminal of a rectifier filter supply, the anode lead 6—24 serially including the starting relay coil 6—4, the normally closed play-back control switch contacts 6—13, the normally closed recording synchronizing switch contacts 3—59 and a current adjusting resistor 6—25. The grid 6—22 is maintained at a suitable positive potential lower than the anode potential through a grid resistor 6—26 which is connected to a tap of a potentiometer resistor 6—27 by means of which the voltage of the grid is so adjusted relatively to the anode voltage that under normal conditions, the grid 6—22 does not start or ignite a discharge between the anode and the cathode of the tube and that only upon impressing on the grid 6—22 a predetermined higher positive voltage will the gas in the tube be sufficiently ionized and ignited to start a current discharge between the anode and the cathode which actuates the starting or control relay 6—04 and its contacts 6—41.

The igniting potential is shown impressed upon the control grid 6—22 through an input circuit connected across the grid resistor 6—26, the input circuit including a resistor 6—31 and a secondary winding 6—32 of a transformer, the primary winding 6—33 of which is connected between ground and the lead 3—84 through which the amplified signal reproducing voltage is impressed upon the loudspeaker R. The input circuit also includes a rectifier 6—34 so as to assure that only the positive voltage impulses are impressed on the control grid 6—22. In addition a condenser 6—35 is connected parallel to the resistor grid 6—26 so as to assure that a predetermined minimum length of time elapses before the grid 6—22 is raised by positive reproducing signal voltage impulses impressed thereon to a potential at which it ignites the discharge tube and brings about actuation of the starting relay 6—04, while preventing ignition of the tube and actuation of the control relay 6—4 by a short reproducing signal voltage impulse produced, for instance, when a solder junction between adjacent portions of the endless tape forming part of a silent-pause synchronizing signal moves past the magnetic head.

In other words, the gaseous control tube 6—02 and the control circuit associated therewith are so designed that a short pick-up signal voltage impulse impressed on the output lead will not be sufficient to ignite the gaseous discharge tube; but that it should be ignited by a short sequence of pick-up signal voltage impulses impressed on the output lead when the initial portion of the signal recorded on the magnetic record track 9 immediately following the silent-synchronizing signal moves past the magnetic head 15. The gaseous control tube 6—02 with its circuit are designed so that when it is ignited it will pass a gaseous discharge current which actuates the control relay coil 6—4 to close its contacts 6—41 for energizing the pick-up control motor 3—07 and starting the rotation of the play-back control cam 6—01.

The moment the pick-up control cam 6—01 starts to rotate, it actuates its control switch 6—1 to the flexed position in which its contacts effect the following control actions: Its contacts 6—11 which are parallel to starting relay contacts 6—41 complete an energizing circuit for the play-back control motor 3—07, and its contacts 6—12 complete an energizing circuit for the tape driving motor 1—03 so as to maintain the driving motor 3—07 of the play-back control mechanism 6—00 and the tape driving motor 1—03 energized during one complete revolution of the reproducing control cam 6—01. Its contacts 6—13 open the circuit through the starting relay coil 6—4 thereby stopping the discharge in the gaseous discharge tube 6—02 and restoring it to its non-conducting condition.

Furthermore, the make and break contacts 6—14 of the reproducing control switch 6—1 break the connection of the lead from the entertainment device E to the loudspeaker R and connect the latter to the amplifier output lead 3—84 for reproducing the signal recorded on the record track 9.

In addition, the reproducing control switch may be provided with a set of contacts 6—15 which may be used to perform in the entertainment unit a desired control operation, for instance, the switching over from one entertainment program to another.

In order to secure effective synchronization of the reproducing action and the synchronizing signal magnetically impressed on the tape, it is important that the operating cycle of the play-back control mechanism 6—00, corresponding to the duration of one revolution of its control cam 6—01, shall be slightly longer than the tape reproducing cycle, but shorter than the tape cycle. In other words, the time during which the play-back control cam 6—01 completes one revolution should be longer than the entire tape length recording less the period of the signal pause thereon, but shorter than the time required for making a recording on the entire length of the tape.

This is important because for proper synchronization, it is essential that each time a recording is reproduced from the record track 9, the silence signal portion of the track shall stop opposite the pole pieces of the magnetic head 15 at the end of the tape reproducing cycle. Otherwise, if the period of the play-back control mechanism 6—00 were shorter than the tape reproducing cycle, only a portion of the signal recording on the tape would be reproduced, and at the end of the reproducing period, the pole pieces of the magnetic head would be interlinked not by the silence synchronizing signal portion of the tape, but by a tape portion having thereon a recorded signal which is to be reproduced.

Again, if the cycle of the play-back control mechanism 6—00 were longer than the total of the tape operating cycle, that is, the length of the tape reproducing cycle on the tape plus the length of the silence synchronizing signal, synchronization would be impossible because at the end of the reproducing period the silence signal of the tape would not be aligned with the magnetic head pole pieces.

There is further provided a reproducing starting element formed, for instance, of a spring contact switch 6—5. In the form shown, the starting switch 6—5 has normally open spring contacts which are used to control the energization of the tape driving motor 1—03 of the recording mechanism; and the starting switch 6—5 is arranged to be closed for a short period once during each revolution of a rotary cam 6—05 which forms part of a sequence control mechanism 6—50 by means of which the reproducing sequences of the magnetic recording apparatus 1—00 are interrelated with the entertainment sequences supplied by the entertainment device E.

The sequence control or timing cam 6—05 is shown arranged to be continuously rotated, for instance, by a clock-type motor 3—07 which is continuously energized by the power supply leads 3—0, 3+01. In the form shown, the timing cam 6—05 is arranged to start the reproducing control mechanism, or a carrier reproducing cycle at the end of each revolution, and to actuate the entertainment device E to supply entertainment during the periods between successive reproductions of the magnetic recording from the magnectic carrier tape 1—01.

The sequence control mechanism 6—50 may be also provided with an additional entertainment control cam 6—55 driven at a slower rate for operating a cam switch 6—56 connected in series with a control lead 6—57 which is utilized to perform a control operation by means of which the entertainment device E may be controlled, for instance, to automatically change the entertainments from broadcast to phonograph operation or vice versa, at desired predetermined times. In addition, the worm gear drives 3—71 through which the sequence control cam 6—05 and entertainment control cam 6—55 are driven may be combined with a variable speed mechanism formed, for instance, by a transverse friction pulley 6—57 movable radially along the face of a driving disc 6—58 for adjustably varying the length of each entertainment cycle and the times at which the magnetic carrier reproducing cycle is interposed between successive entertainment cycles.

With the various elements arranged in the way shown in Fig. 3, the sequence controlling switch 6—5 will be released in the depression of the sequence cam 6—05 once during each revolution of the sequence cam 6—05. The momentary contact closure of the sequence switch 6—5 energizes the tape driving motor 1—03 and starts operation of the tape recording mechanism 1—00.

As explained hereinbefore, the tape is always automatically stopped at a point in which its silence-pause synchronizing signal is aligned with the pole pieces of the magnetic head. Since the silence signal portion of the tape which is interlinked with the magnetic head pole pieces at the moment the tape starts its motion is only very short, being less than ten seconds, it will require only a very short instant before the initial portion of the signal recorded on the tape following the silence signal portion thereof will induce in transducing head 15 a signal voltage which will be impressed on the amplifier output lead 3—84 and will impress an ignition potential on the tube grid 6—22, thereby actuating the reproducer cycle starting relay 6—04 to energize the reproducing control motor 3—07 and thereby starting the rotation of the reproducer control cam 6—01 and a reproducing operation.

In order to assure that the initial period of motion imparted to the tape by the energization of the tape motor following the momentary closure of the sequence control switch 6—5 shall be sufficient to impress on the transducing pole pieces a signal voltage required to produce the ignition of the control tube 6—02 and the actuation of reproducing starting relay 6—4, the depression of the sequence control cam 6—05 is designed to have sufficient peripheral length so as to make it possible for the signal voltage to ignite the control tube 6—02 and actuate the control relay 6—4 to energize the reproducing control driving motor and actuate reproducing control switch 6—1 to the flexed position in which it establishes at its contacts 6—12 the locking circuit through which the tape driving motor remains energized after the sequence control switch 6—5 opens when it reaches the end of the cam depression of the rotating sequence control cam 6—05.

The depression of the sequence control cam 6—05 is made long enough to assure that the contact switch 6—5 will keep the tape driving motor energized until the initial part of the signal following the pause has brought about the ignition of the control tube 6—02 and started the rotation of the reproducing control cam 6—01 thereby completing at its closed contact 6—12 a locking circuit which keeps the tape driving motor 1—03 energized after the sequence control switch 6—5 has returned to its open position.

As a result the reproducing operation will continue until it is stopped at the end of one cycle of the play-back control cam 6—01 its switch 6—1 is returned to the position shown, in which it restores the condition shown in Fig. 3 in which the silence signal of the tape is aligned with the magnetic head.

In the arrangement of the type described above, a signal magnetically impressed on the magnetic carrier tape is utilized to assure that each time the endless tape magnetic recording apparatus is set in operation to reproduce a recording, the reproducing operation or the reproducing cycle starts at the same point of the carrier and that the reproduction is started, reproduced and ended in the same sequence in which the recording was originally made.

This is assured because the initial portion of the recording immediately following the silence signal impressed on the tape is utilized to set in operation the recording control mechanism which, in turn, automatically assures that the track driving mechanism is stopped at the moment when the silence signal of the tape reaches its position of alignment with the magnetic head.

In other words, this arrangement automatically assures that the operation of the reproducing control mechanism, which determines the period during which the reproducing is carried on, automatically attaches itself to the synchronizing signal magnetically impressed on the tape.

If an arrangement of the type described above in connection with Fig. 3 is deliberately brought out of synchronization, for instance, by momentarily energizing the tape driving motor 1—03 while the amplifier is de-energized, so as to bring the silence signal out of alignment with the magnetic head, the apparatus will pull itself into synchronism after the reproducing mechanism is started several times, for instance, by repeated closure of the sequence control switch 6—5.

This automatic pulling in synchronism of the apparatus is brought about by the fact that the tape cycle is greater than the play-back control cycle. As a result, each time the play-back control mechanism is started by the closure of switch 6—5, it will stop at a point of the tape nearer the synchronizing signal of the tape, until it is finally brought back into alignment with the magnetic head at the end of a reproducing cycle.

The principles underlying the various features of the arrangements described in connection with Fig. 3 will suggest various other applications and modifications of such arrangements based on the same principles. For instance, instead of using a separate synchronizing motor for the recording control mechanism 3—03, for the reproducing control mechanism 6—00 and for the sequence control mechanism 6—50, the several control mechanisms may be driven by a common shaft 6—61 through suitable speed reducing worm gear drives 3—71, in the way shown in Fig. 4. The cam shaft 6—61 is shown continuously driven, for instance, by a synchronizing timing motor 3—07 for continuously driving the sequence control mechanism 6—50 as in the arrangement of Fig. 3.

The recording control mechanism 3—03 and the reproducing control mechanism 6—00 are shown releasably coupled to their driving gear connections 3—71 with the cam shaft 6—61 by means of friction clutch members 3—72 normally biased to the uncoupled position and actuable to the coupled position upon the energization of their operating solenoids 3—75. The coupling solenoids 3—75 of the two control mechanisms 3—03, 6—00, are arranged to be selectively energized by the contacts 3—11, and 6—11 of the cam switches 3—5, 6—1, respectively, to selectively start and stop the operation of the respective control mechanisms in a way analogous to the operation of the two control mechanisms 3—03, 6—00, described in connection with Fig. 3.

The arrangements of Figs. 3 and 4 may be also combined with means for automatically setting in operation a pictorial exhibit to which the message that is reproduced from the magnetic carrier is related. Thus, as shown in Fig. 3, the reproducing control cam switch 6—1 may be provided with an additional set of contacts 6—16 actuated to complete the control circuit to a pictorial exhibit device PE each time the magnetic recording mechanism 1—00 is set in operation, the pictorial device being, for instance, an automatic picture changing mechanism or an automatic motion picture exhibit machine which is automatically maintained in operation as long as the recorded message is reproduced from the carrier.

Figures 5, 6, 7, 8:
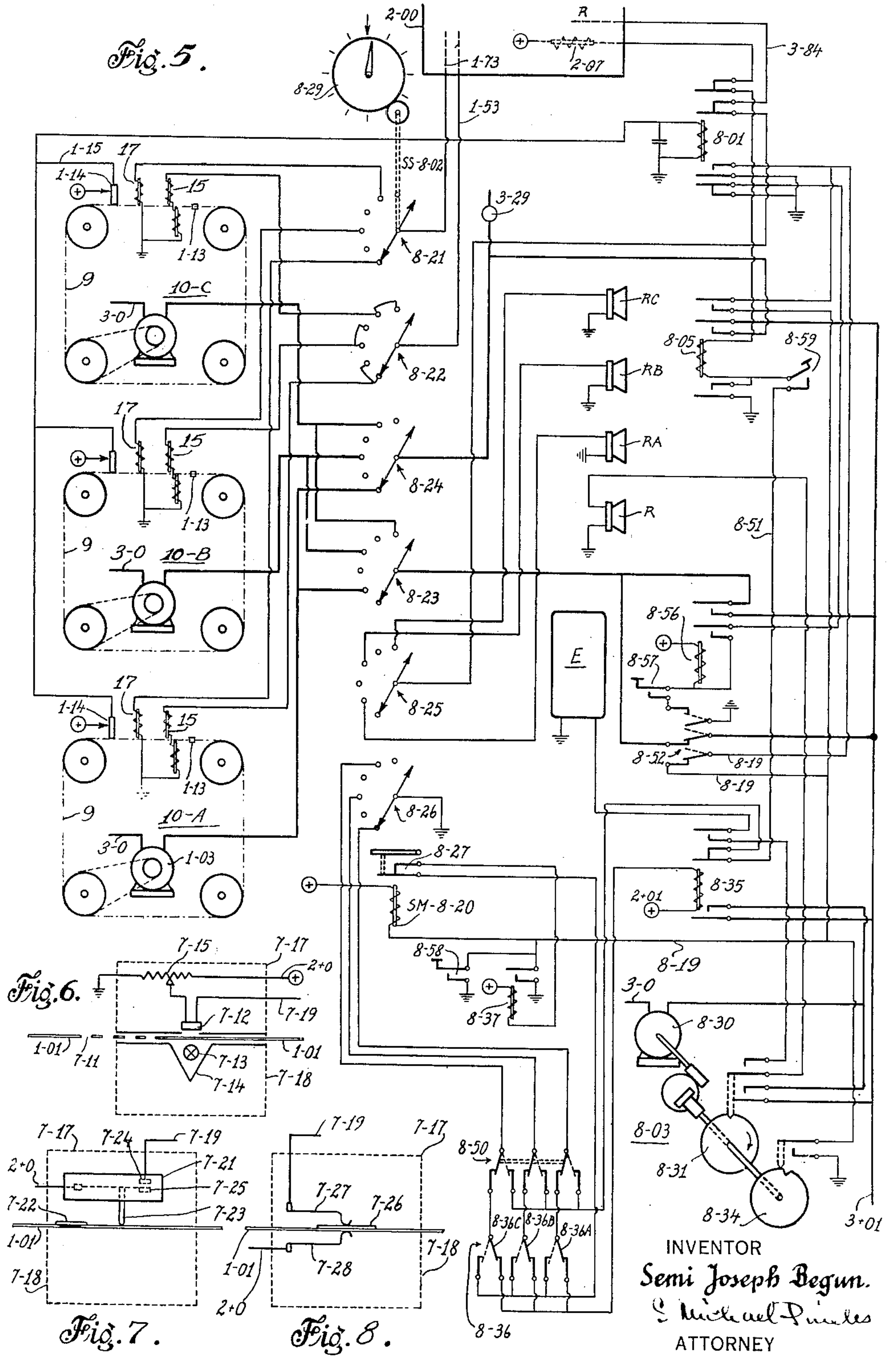
Fig. 5 is a diagram similar to Fig. 1 of another magnetic record transducing system of the invention.
Figs. 6, 7 and 8 are diagrammatic views illustrating synchronizing signal control arrangements for systems of the type shown in Figs. 1 to 5.

Fig. 5 illustrates another form of an arrangement for automatically synchronizing recordings made on a magnetic carrier with entertainment program sequences supplied by an entertainment program device, such as a radio broadcast receiver or an automatic phonograph. It comprises a plurality of magnetic recording mechanisms shown, for the sake of simplicity, in the form of three endless magnetic tape recording mechanisms 10—A, 10—B, 10—C, an entertainment device E, and the associated elements, such as an amplifier 2—00, including the recording relay 2—07 and reproducers R, RA, RB, RC, power supply leads 3—0, 3+01 providing the operating energy as in Fig. 3. Each of the magnetic recording devices has an endless magnetic record track 9 arranged to be driven at a uniform speed, in clockwise direction, for instance, when its driving motor 1—03 is energized for recording or reproducing by means of a magnetic head 15, as in Fig. 3.

A portion of each magnetic record track 9 has formed thereon a synchronizing element 1—13 for actuating a synchronizing signal transmitter 1—14, and assures that at the end of each recording or reproducing cycle, the endless tape 9 is stopped when its synchronizing element 1—13 has about just left the region of the pole pieces of the magnetic head 15.

As shown in Fig. 6, the synchronizing element may be formed of a series of small perforations 7—11, such as slits extending lengthwise along a portion of the tape. A cooperating signal transmitter element 1—14 is formed of a photocell 7—12 mounted on one side of the tape 9 and a light source 7—13 combined with a reflector 7—14 and mounted opposite the photocell 7—12 on the other side of the tape, so that when the perforated portion of the tape passes between the light source and the photocell, the photocell will generate a signal voltage. One terminal of the photocell 7—12 may be connected to a tap of a resistor 7—15, having a grounded side and connected to a point of suitable positive potential, for instance, to the positive supply lead 2+0 from the rectifier filter network of the amplifier power supply.

The other terminal of the photocell 7—12 delivers the signal voltage through lead 7—19 to the synchronizing means utilized to synchronize the operation of the associated recording mechanism. For convenience in handling, the photocell 7—12 and the light source 7—13 with its reflector 7—14 are suitably held in two small blocks 7—17, 7—18 hingedly mounted on the opposite sides of the tape adjacent the hingedly mounted halves of the magnetic head 15.

The synchronizing signal transmitter 1—14 is actuated to send out a synchronizing signal the moment the synchronizing element 1—13 of the tape has moved past by it.

A magnetic recording mechanism of the type shown in Fig. 5 having a magnetic carrier provided with a synchronizing element 1—13 and a signal transmitting element 1—14 of the type described above may be used for synchronizing the reproductiton of the recording with entertainment sequences and the like in the way analogous to that described in connection with Fig. 3.

Such recording mechanism may be combined with an entertainment program device for periodically playing back the message recorded on the magnetic carrier and for following up each play-back period with an interposed entertainment period at the end of which the recording is played back again, and so on.

A set of such record carrier tracks may be combined with one or several entertainment devices so as to interpose between play-back periods from successive tape tracks, an entertainment period from an entertainment device, and to continuously repeat such operating sequences.

A set of a plurality of such magnetic carrier tracks may be combined to play back consecutively the recordings made on the several carrier tracks in sequence, and to follow it up by an entertainment sequence at the end of which the recordings of the several carrier tracks are again reproduced in sequence, and so on.

An independent sequence control arrangement may be combined with one or a plurality of record carrier tracks for interposing a reproduction of a record from a different carrier track after each entertainment period or to successively reproduce the recordings from a series of the carrier tracks after each entertainment period and to continuously repeat such operations.

In the form shown in Fig. 5, the signaling impulse transmitted by the signal transmitter 1—14 through the lead 1—15 is utilized to actuate control arrangements by means of which the operation of the recording mechanism as well as the entertainment sequence and other operations of the elements associated therewith are synchronized to operate in the required sequence.

The control arrangements are so designed as to assure that the motion of the carrier is automatically stopped a short period after the signal element 1—13 of the carrier has moved past the synchronizing signal transmitter 1—14 and has reached a point slightly beyond the pole pieces of the magnetic head 15.

The form of control arrangement shown in Fig. 5 includes a synchronizing signal relay 8—01, of the slow release type, a step switch 8—02, of the type used in automatic telephones, having semi-circular switch units 8—21, 8—22, 8—23, 8—24, 8—25 and 8—26, each composed of a row of contacts and a wiper arranged to be operated by a stepping magnet 8—20 to engage successive contacts of each row, an entertainment timer switch mechanism 8—03, and an associated timer relay 8—35, a set of sequence control switches 8—36, and an entertainment by-pass relay 8—37.

The synchronizing relay 8—01 is arranged to be actuated by the synchronizing signal of any one of the three magnetic tapes 9 of the three recording units 10—A, 10—B, 10—C. The stepping magnet 8—20 of the step switch 8—02 is actuated by the synchronizing relay to successively establish in every second step the operating circuits for the different recording mechanisms 10A, 10B, 10—C, and to establish in its intermediate contact positions the circuits for an entertainment sequence.

When the sequence control switches 8—36 are in the position shown in Fig. 5, the entertainment timer mechanism 8—03 and its associated relay 8—35 will operate in conjunction with the step switch 8—02 and the associated elements of the arrangement to supply after each completion of a play-back period from one of the record track mechanisms 10—A, 10—B, 10—C, a timed entertainment period, and upon completion of the entertainment period, the next tape mechanism will operate to play back its recording, this sequence repeating itself in succession.

The timer mechanism 8—03 has two disc cams 8—31, 8—34 driven, in clockwise direction, for instance, through a variable speed drive by a timer motor 8—30 to operate cam switches movable from their flexed position to their released position when they engage the notch-like cam depressions. The depression of cam disc 8—34 is slightly displaced relatively to the depression of cam 8—31 so that on approaching the end of one rotation cycle, the switch of cam 8—34 will be released from its flexed position slightly before the switch of the other cam 8—31 is released from its flexed position.

Although a single loud-speaking reproducer R could be used, four reproducers are shown in Fig.

5, reproducer R serving, for instance, to reproduce entertainment sequences from the entertainment device E, and the reproducers RA, RB, RC being selectively connected by one of the wipers of the step switch 8—02 to reproduce from the different tapes. This arrangement makes it possible to place the different reproducers in different locations of an establishment, such as a department store, for making appropriate announcements.

Further details of the control arrangement of the invention, in the form shown in Fig. 5, will be clear from the further description of its operation. It is assumed that the desired messages have been previously recorded on the different tapes of the recording units 10—A, 10—B, 10—C, that the power supply lead 3—0, 3+01 are energized, and that, in the course of operation, the operating condition shown in Fig. 5 has just been established by the operation of the step switch 8—02.

In this operating condition, the entertainment timer relay 8—35 has just been actuated by completing a circuit from its winding, one end of which is connected to positive supply lead 2+01, and the other end connected through the closed right-hand sequence selector switch 8—36—A, a closed contact of switch 8—50, and step switch unit 8—26 to ground. The lower contacts of the actuated entertainment timer relay 8—35 energize the associated timer motor 8—30 from the supply line 3+01, thereby starting the rotation of the timer cams 8—31, 8—34. As soon as the timer cam 8—31 starts to rotate, it flexes its cam switch contacts establishing at its closed lower contacts an energizing circuit from supply lead 3+01 to its motor 8—30 which circuit remains closed for a full rotation of the timer disc, and establishing at its upper contacts a circuit from the entertaiment device E to the reproducer R to supply entertainment, the outer upper contacts of the timer relay 8—35 included in this circuit having been previously closed.

This entertainment period continues until, shortly before the end of one revolution of the timer cam 8—31, its associated timer cam 8—34 releases its cam switch to the biased closed position in which it completes a circuit from ground to the stepping magnet coil 8—20, the other end of which is connected to the positive voltage supply 2+01, thereby advancing the step switch wipers to the next step. In this next step of the step switch 8—02, its switch unit 8—22 connects again the transducing head 15 of the tape mechanism 10—A to the amplifier input lead 1—53, its switch unit 8—23 connects the motor 1—03 which drives the track of record unit 10—A to the power supply lead 3+01, and its switch unit 8—25 connects the reproducer RA to the output lead 3—84 from the amplifier, thereby setting in operation the play-back from record unit 10—A through reproducer RA, while the wipers of the switch units 8—21 and 8—26 engage dead contacts, the latter keeping de-energized the entertainment timer relay 8—35.

The play-back from the record unit 10—A will continue until, at the end of the tape cycle, the tape signal element 1—13 actuates the signal transmitter 1—14 of record unit 10—A to transmit a signal voltage impulse which actuates the synchronizing relay 8—01. Thereupon, the actuated synchronizing relay 8—01 breaks at its inner upper contacts the circuit from reproducer output lead 3—84 to the switch unit 8—25; and it completes at its inner lower contacts a circuit from ground over lead 8—19 to the stepping magnet 8—20, thereby advancing step switch 8—02 to the second next step.

In this second next step of the stepping switch 8—02, switch unit 8—26 again completes a circuit from ground through the intermediate contact blade of switch 8—50 and sequence control switch 8—36—B to the entertainment timer relay 8—35, thereby actuating it to start its timer mechanism 8—30 to deliver another entertainment period from the entertainment device E through the reproducer R as in the step shown in Fig. 5. The above-described sequence of operations repeats itself, the wipers and the contact banks of the selector switch 8—02 being so arranged that in each two steps of the stepping switch 8—02 another of the several tape mechanisms is actuated to play back a message recorded thereon, and that in the intermediate switch steps, after each play back, the switch unit 8—26 energizes the timer relay 8—35 to set into operation the timer mechanism 8—03 and supply entertainment from device E during one cycle of the timer mechanism.

The control arrangement of Fig. 5 may be actuated to eliminate one or more entertainment periods interposed between play-back periods from successive tape record units 10—A, 10—B, etc., by throwing one or more of the sequence control switches 8—36 to the other side. For instance, in order to eliminate the entertainment period after the play-back periods supplied by tapes 10—A, 10—B, and interpose an entertainment period only before repeating the play back from tape of record unit 10—A, the leads from the contacts of the step switch unit 8—26 connected to selector control switches 8—36—B, 8—36—C are connected to the winding of the by-pass relay 8—37 instead of the entertainment timer relay 8—35, for instance, by throwing sequence control switches 8—36—B, 8—36—C to the left, dotted-line, positions.

In the dotted-line position of the sequence selector switches 8—36—B, 8—36—C, the step switch 8—02 upon being advanced, in the way described above, at the end of the play-back period from tape of record unit 10—A to the second next step, will complete at switch unit 8—26 an energizing circuit from its grounded wiper by way of sequence control switch 8—36—B, to the by-pass relay 8—37, whereupon its actuated contacts complete a circuit to the stepping magnet 8—20, and actuate the stepping switch 8—02 to the third next position, in which its switch unit 8—22, 8—23, 8—25 establish the circuits for playing back from record unit 10—B.

After the completion of the play-back from record unit 10—B, its synchronizing signal element 1—13 will again bring about, in conjunction with the sequence control switch 8—36—C, in its dotted-line position, and the by-pass relay 8—37, a similar operation sequence, which advances the step switch 8—02 two steps to the position in which its switch units 8—22, 8—23, 8—25 establish the circuits for a play-back period from record unit 10—C, without interposing an entertainment period from entertainment device E. Since sequence control switch 8—36—A remains in the full line position shown in Fig. 5, the actuation of the step switch 8—02, brought about by the synchronizing signal of record unit 10—C, at the completion of its play-back period, will complete through switch 8—36—A an energizing circuit for entertainment timer relay 8—35 to interpose an entertainment period from E between the play backs from record unit 10—C and 10—A.

Such sequence control switch arrangement makes it thus possible to selectively interpose entertainment periods from an entertainment device either between each play-back period or between sequences of play-back periods from two or more tapes.

When a step switch 8—02 is in a position in which its switch units 8—22, 8—23, 8—25 disestablish the play-back circuits, it prepares at its switch units 8—21, 8—22, 8—24, 8—26 the circuits required for making a recording in the way described hereinafter; and when the step switch 8—02 is in a position in which it prepares the recording circuits, its switch unit 8—25 prepares the circuits required for supplying an entertainment sequence from the entertainment device E.

The arrangement described above in connection with Fig. 5 embodies certain special features. The synchronizing relay 8—01, which is actuated by the tape synchronizing signal at the end of a tape cycle, is provided with a set of normally closed contacts included in the circuit from the reproducer output lead 3—84 leading from the amplifier to the step switching unit 8—25, so as to open the circuit to the reproducers RA, RB and RC connected to the switching unit 8—25 each time the selector switch 8—02 is advanced to the next step, thereby assuring that the switching operation of the stepping switch 8—02 will not result in noise from any of the reproducers.

Furthermore, as shown in Fig. 5, the stepping magnet 8—20 of the stepping switch 8—02 is provided, in addition to the armature for advancing its wipers, with a set of normally closed contacts 8—27 serially included in the circuit through which by-pass relay 8—37 is energized, in order to assure that as long as the stepping magnet is actuated, it is impossible to actuate the by-pass relay 8—37. Otherwise, the slow-release synchronizing relay 8—01, which is actuated to complete an energizing circuit for the stepping magnet 8—20 at the end of each tape cycle, might keep the stepping magnet 8—20 energized when, upon reaching the next step, the switch unit 8—26 establishes an energizing circuit for by-pass 8—37 and thereby actuate it to establish a circuit which would keep the stepping magnet locked in the energized condition after the synchronizing relay 8—01 is released.

To make new recordings on the magnetic tapes, there is provided a recording control relay 8—05, a multi-pol recording change-over switch 8—50 and a recording starting switch 8—59, of the button type, for instance. In its normal full-line reproducing position, the blades of the recording control switch 8—50 complete the circuits from the contacts of the selector switch unit 8—26 to the contacts of the multi-pole switch 8—36 and therethrough either to the reproducer timer relay 8—35 or the entertainment by-pass relay 8—37.

When the change-over switch 8—50 is thrown to the opposite dotted-line recording position, it connects the contacts of the step switch unit 8—26 to lead 8—51, through which the energizing circuit to the winding of the recording control relay 8—05 and the serially connected winding of the recording switch 2—07 are energized when the recording starting switch 8—59 is momentarily closed.

If the change-over to recording is made during an entertainment period, corresponding to an entertainment-cycle step of the step switch 8—02, such as shown in Fig. 5, the recording may be started at any time by momentary closure of the recording starting switch 8—59, since the step switch 8—02 prepares at its switch units 8—21, 8—22, 8—24 circuits required for making a recording on one of the tapes, and the change-over switch blades keep the entertainment timer relay 8—35 and the by-pass relay 8—37 deenergized.

Under such conditions, the momentary closure of the recording starting switch 8—59 energizes the recording control relay 8—05 and the serially connected recording switch 2—07. The recording switch 2—07 establishes the recording circuits, and the momentarily actuated control relay 8—05 actuates its lower contacts to establish a locking circuit for itself so as to remain actuated. At its inner upper contacts, the recording control relay 8—05 now completes an energizing circuit from power supply lead 3+01 through selector switch unit 8—24 to one of the tape driving motors, such as the driving motor of record unit 10—A. Since the step switch 8—02 is in a position in which its switch units 8—21 and 8—22 complete the circuits from the obliterating head 17 and the transducing head 15 of the magnetic head of the record unit 10—A which is driven by its energized motor 1—03, a recording can now be made on the record unit 10—A, a signal lamp 3—29, energized by the lead to the switch unit 8—24, indicating that recording is going on.

If the change-over switch 8—50 is thrown to the recording, dotted-line, position, and the recording starting switch 8—59 is closed during a tape play-back cycle, the recording will be started only after, at the end of the play-back cycle, the operation of the synchronizing relay 8—01 advances the step switch 8—02 to the next step in which it establishes the circuits required for recording.

In other words, with the arrangement shown, a recording can be started only if the selector switch is in an intermediate position between two steps in which it establishes the play-back circuits for record units 10—A, 10—B, 10—C, thereby assuring that the recording is started at the proper starting position of each tape, as determined by its synchronizing signal element 1—13. After closure of the recording starting switch 8—59 the party desiring to make a record has merely to wait until the signal lamp 3—29 indicates that a recording can be made, whereupon the starting switch may be released. Alternatively, a suitable holding relay actuated by momentary closure of the recording starting switch 8—59 may be used to start a recording under all operating conditions, the holding relay being released after it started the recording operation.

Each recording, so started at the initial part of the tape cycle, will continue until at the end of the tape cycle the tape signal element 1—13 actuates the signal transmitter 1—14 to transmit a signal voltage, which actuates the synchronizing relay 8—01. Upon being actuated, the synchronizing relay 8—01 will operate in the way described above to advance the step switch 8—02 to its next position in which its switch unit 8—22, 8—24, 8—25 establishes the play-back circuits for the record unit 10—A, the actuated slow-release synchronizing relay 8—01 opening at its outer upper contacts the holding circuit of the recording control relay 8—05, thereby releasing it and the recording switch 2—07 to the normal reproducing positions. As a result, the recording which has just been completed on record unit 10—A is now played back.

At the end of the play-back period, the synchronizing signal of record unit 10—A again sets into operation the synchronizing relay 8—01 which in turn actuates the stepping magnet 8—20 to advance the selector switch 8—02 to the next position in which it establishes a similar recording circuit for the next tape 1—01—B for first making thereon a new record and following it up with a play back of the new recording, in the way described in connection with record unit 10—A, similar operation sequences being repeated in conjunction with each successive record unit.

However, the play-back period at the end of the recording cycle on record unit 10—A, or on any of the other tapes, may be eliminated by the momentary closure of an auxiliary advancing switch 8—58, which completes an actuating circuit for the stepping magnet 8—20 so as to advance the step switch 8—02 to the second next position in which it establishes the recording circuit for record unit 10—A. In other words, the advancing switch 8—58 makes it possible to advance the selector switch 8—02 an additional step after it has been advanced one step by the synchronizing relay 8—01 at the end of a tape cycle. The auxiliary advancing switch 8—58 makes it thus possible to advance the step switch 8—02 to any desired position, in which it establishes the circuits required for making a recording on a selected tape, or on successive record units, with or without play-back after each completed recording.

In order to make it possible to listen repeatedly to a new recording made on one of the tapes, an arrangement, such as shown in Fig. 5, may be provided with a multi-pole recording play-back switch 8—52 and a recording play-back relay 8—56 and an associated starting switch 8—57 arranged in the way shown. When the recording play-back switch 8—52 is thrown from its normal full-line position in which two of its blades complete circuits to the reproducing switch unit 8—23 and the stepping magnet 8—20 of the selector switch 8—02, these circuits are opened and its third blade prepares an operating circuit for the recording play-back relay 8—56.

After the recording play-back switch 8—52 has been thrown to the dotted-line position, a recording made on the tape may be played-back at any time, by momentarily closing the associated starting switch 8—57, thereby actuating the recording play-back relay 8—56 to complete at its outer contacts a motor energizing circuit to the selector switch unit 8—23 and at its inner contacts a holding circuit for itself so as to remain actuated. The step switch 8—02 is now in a position in which its switch units 8—22, 8—23, 8—25 complete the play-back circuits, and play back from the selected tape will take place until at the end of the tape cycle the synchronizing signal actuates the synchronizing relay 8—01, to open at its lower outer contacts the holding circuit for the recording play-back relay 8—56. The step switch 8—02 will remain in the play-back position since the circuit to the stepping switch is held open by one of the two lower contacts of the recording play-back switch 8—52. Accordingly, momentary closure of the play-back starting switch 8—57 will enable repeated play-back from the selected tape.

It will be noted that the outer contact of the recording control relay 8—05 is connected parallel to the lower contact of the change-over switch 8—52 in the circuit between the lower inner contact of the synchronizing relay 8—01 to the stepping magnet.

This assures that when the recording play-back switch 8—52 is thrown to its dotted-line play-back position while a recording is going on, the upper contacts of the recording control relay 8—05 will prepare a circuit from the lower inner contacts of the synchronizing relay 8—01 to the stepping magnet 8—20 through which the stepping magnet 8—20 is actuated at the end of the recording cycle to advance the stepping switch to the next play-back step position.

To indicate the progress of a recording, or a recording play-back action carried on during the actuation of either the recording control relay 8—05 or the recording play-back relay 8—56, each of these relays may be provided with an additional contact operated upon the actuation of the respective relays to start the rotation of an indicator such as indicator 3—31 of Fig. 1 driven in synchronized relation to the selected tape as long as the tape is driven.

The recording play-back arrangement may be utilized to play back the recordings from any other selected tape, while the recording play-back switch 8—52 is in the play-back position, and the step switch may be readily advanced to the desired step position by repeated closure of the switch 8—58 connected in an energizing circuit of the step magnet 8—20.

The step switch 8—02 may be provided with a dial 8—29 and an associated pointer actuated to move in synchronism with the wipers for indicating the different operating positions to which the step switch 8—02 is advanced.

Although, for the sake of simplicity, the step switch 8—02 is shown arranged for operation with only three tapes, selector switches of standard design having a much larger number of contacts in each bank may be used, successive groups of contacts of each row being connected in multiple, as required. Similarly, other types of switching means may be used in lieu of the step switches shown, and any number of tapes may be combined into such system.

Various modifications of magnetic recording arrangements of the type described in connection with Fig. 5 will suggest themselves to those skilled in the art. Thus, for instance, instead of using the synchronizing signal arrangement of Fig. 6, an arrangement of the type shown in Fig. 7 may be used. It comprises an abruptly operating switch unit 7—21 which is actuated from one position to the other by an extremely small motion of the order of one-thousandth of an inch, for sending out a synchronizing signal to operate the synchronizing relay 8—01 in the way described in connection with Fig. 5.

To this end, the tape 9 is provided with a synchronizing element 1—13 formed, for instance, by a thin layer of solder 7—22 fused to one side of the tape and arranged to actuate a pin 7—23 extending from the switch unit 7—21 to operate the switch from one position to another when the raised synchronizing signal portion 7—22 of the tape moves past the pin 7—23.

Commercially available abruptly operating switches of the type shown, for instance, in U. S. Patent 1,780,758, may be used as such signal transmitting switch 7—21. Such switch unit usually comprises a stationary contact 7—24 cooperating with a movable contact member 7—25 carried at the end of a slitted leaf spring having its other end clamped to a supporting block so as to be normally constrained to one position and to be actuated by a slight motion of the pin 7—23 to the other position whenever the raised synchronizing signal portion 7—22 of the tape actuates the switch pin 7—23 in moving past it.

In utilizing such switch unit 7—21 for transmitting the synchronizing impulse to the synchronizing relay 8—01 of an arrangement shown in Fig. 5, the contacts of the switch unit are connected in the circuit between a source of operating potential such as positive supply lead 2+0 and the lead 7—19 to the synchronizing relay 8—01. The switch unit 7—21 is preferably mounted in one of two hingedly joined guide blocks 7—17, 7—18, arranged on opposite sides of the tape as in Fig. 6.

A still other way for producing the synchronizing signal is shown in Fig. 8. The synchronizing element is formed of a layer of insulating material 7—26, suitably secured, as by cementing, to one side of the tape 9. Two contact springs 7—27, 7—28 connected between the lead 7—19 from the synchronizing relay 8—01 and a source of operating potential, such as the positive supply line 2+0 are held in engagement with the opposite sides of the moving tape 9, so that each time the insulating synchronizing element of the tape moves past the contact springs 7—27, 7—28, the circuit completed by the conducting material of the tape is broken, thereby transmitting a synchronizing signal to the synchronizing relay 8—01.

Cementitious insulating material of the type used in making abrasive compounds may be used for the layer 7—26. As in the arrangement of Figs. 6 and 7, the two switch contactors 7—27, 7—28 are mounted in two hingedly joined blocks 7—17, 7—18 mounted on oppostie sides of the tape.

The various control arrangements and methods described above in connection with endless magnetic recording media are also applicable to magnetic recording media, such as wires, or tapes, that are moved back and forth between spools on which they are wound and stored.

Figures 9, 10:
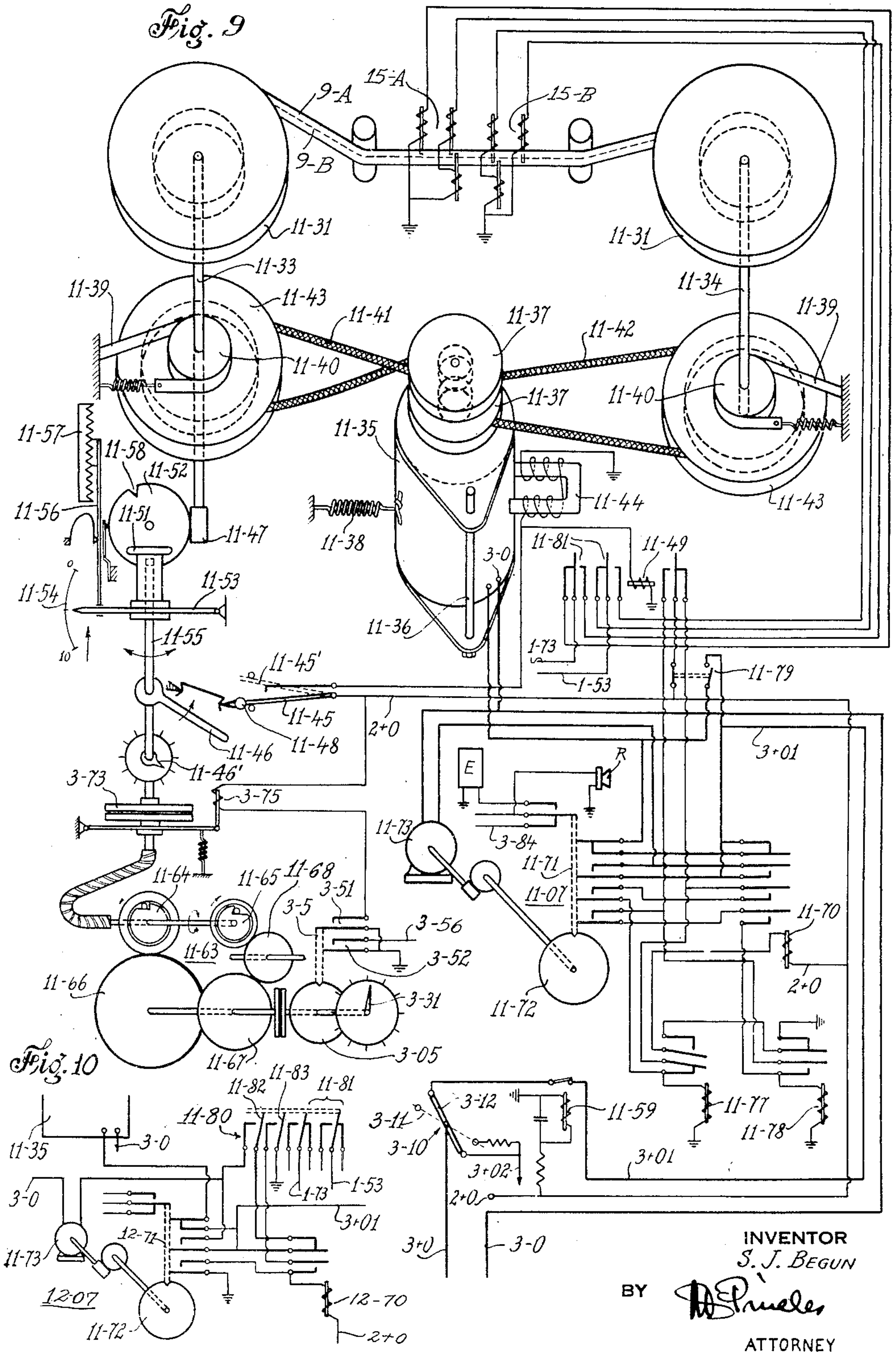
Fig. 9 is a diagrammatic view of another type of magnetic record transducing system exemplifying the invention.
Fig. 10 is a diagram similar to Fig. 9 of a control arrangement for a transducing system shown in Fig. 9.

Fig. 9 shows diagrammatically a reel-type magnetic recording apparatus utilizing one or more pairs of magnetic record carrier tracks which are arranged to be moved back and forth through transducing pole pieces associated with each of the magnetic tracks for consecutively recording first on one of a pair of magnetic tracks, while they are impelled in one direction, and then on the other track while they are impelled in opposite direction, and to consecutively reproduce the recording made on each magnetic track as they are consecutively impelled in opposite directions.

In other words, a pair of magnetic recording tracks arranged to continuously reproduce as they are moved back and forth, operate in the same way as an endless magnetic recording track, and the operating cycle consisting of such back and forth movement or transporting of a pair of magnetic tracks is effectively equivalent to the operating cycle of a complete length of an endless magnetic tape of the type shown in Fig. 1, for instance.

As shown in Fig. 9, two magnetic recording tracks 9—A, 9—B, either in the form of separate magnetic tapes, or, as shown, forming parts of a single magnetic tape, are wound in the form of coils on two spools or reels 11—31, mounted on suitably journaled spool shafts 11—33, 11—34.

The two spool shafts are driven by a driving mechanism which is so arranged that during one-half of each operating cycle, the record tracks are wound on one spool shaft, and that during the other half of each operating cycle, the record tracks are wound on the other spool shaft.

Driving mechanisms of the type shown in Fig. 9, for transporting a magnetic record track, such as a tape or wire, from one spool to another, must be so designed and arranged that the magnetic record track is at all times maintained under tension.

Assuming that after substantially the entire length of the tape has been wound on one of the spool shafts, the drive has been reversed to rewind the tape on the relatively empty spool, the fully-wound spool shaft will have a greater inertia than the empty spool shaft. If under such condition the empty spool shaft, which is driven to rewind thereon the tape, is momentarily stopped, the other relatively fully-wound spool shaft will be kept rotating by the momentum of its mass, and the tape will become unloosened, and ensnarled. Accordingly, the driving mechanism for such magnetic tape transporting and storing arrangement must be designed so as to assure that the complete tape transporting mechanism is stopped for an instant whenever the direction of the tape motion is changed, or one of the elements of the mechanism, such as the driven spool shaft, is stopped. To meet these requirements, the spool driving mechanism of the invention is designed to assure that when one of the spool shafts is driven, the other spool shaft is at all times subjected to a braking action sufficient to maintain the magnetic recording track under tension.

In such spool driving mechanism, provision must be made for coupling the spool shaft on which the tape is wound to a driving shaft. On reversing the direction of the tape motion, the driving shaft must be first uncoupled from one spool shaft and then coupled to the other spool shaft. A satisfactory driving arrangement must assure that the driven spool shaft shall not release its coupling connection to the driving shaft until the other spool shaft from which the magnetic track is unreeled, and which may have larger inertia, is stopped.

The two spool shafts 11—33, 11—34 are arranged to be driven by a motor 11—35 which is pivotally carried in its operating position on a suitably mounted pivot shaft 11—36. On the motor shaft are mounted two belt pulleys 11—37 having grooved peripheries for selectively driving through two rope belts 11—41, 11—42, either belt pulley 11—43, mounted on spool shaft 11—33, or a similar pulley 11—43 mounted on the other spool shaft 11—34. The belts 11—41, 11—42 serve as selective coupling connections between the motor 11—35 with either one or the other of the two spool shafts 11—33, 11—34. The motor 11—35 is shown tilted by a biasing spring 11—38 for tensioning the belt 11—42 to establish the driving connection to spool shaft 11—34 and a solenoid or magnet 11—44 overcomes the spring tension and tilts the motor in opposite direction so that the solenoid winding is energized to break the driving connection to spool shaft 11—34 and establish the driving connection from the motor to the other spool shaft 11—33. One of the belts is crossed, so that with the motor rotating clockwise, for instance, spool shaft 11—34 is driven in clockwise direction, and spool shaft 11—33 in counter-clockwise direction, so as to wind the tape either on spool shaft 11—34 in clockwise direction, or on spool shaft 11—33 in counter-clockwise direction.

In addition, each of the spool shafts is also provided with braking means designed to stop its motion the instant its coupling connection to the motor is broken. The brake means are shown in the form of brake bands 11—39 engaging brake drums 11—40 secured to the two spool shafts, and held under tension, as by springs, to exert a one-way braking action opposing the rotation of the respective spools against rotation in the direction in which the tape is unreeled therefrom.

The driving arrangement of Fig. 9 thus assures that when the motor is de-energized, the two spool shafts 11—33, 11—34 are subjected to a braking action holding the tape under tension and opposing unreeling of the tape. When the motor 11—35 is energized, while the motor solenoid 11—44 is de-energized, the motor will remain in the position shown and drive spool shaft 11—34 through belt 11—42 to wind thereon the tape in clockwise direction, the other spool shaft 11—33 being uncoupled from the motor and being subjected to the braking action of its brake 11—39 which keeps the tape under tension as it is being unreeled therefrom in clockwise direction; and upon energization of the motor solenoid 11—44, the motor will be tilted to the opposite position, in which it loosens its belt coupling connection to spool shaft 11—34 and drives through cross-belt 11—41, in a similar way, spool shaft 11—33 to wind thereon the tape in counter-clockwise direction, while the braking action to which the other spool shaft 11—34 is subjected keeps the tape tight and opposes its being unreeled therefrom in counter-clockwise direction.

In the form shown in Fig. 9, the tape tracks 9—A, 9—B are associated with two magnetic heads 15—A, 15—B, respectively, so as to record on, or play back from, tape track 9—A when the two tape tracks are wound on spool shaft 11—34, and to record on, or play back from, tape track 9—B when the two tape tracks move in reversed direction, as they are wound on spool shaft 11—33.

There is also provided a synchronizing arrangement for automatically controlling the motor drive to periodically reverse its driving connection to the spool shafts at the end of each half operating cycle, that is, after the desired length of the tape track on which a recording is made has been fully wound on one or on the other spool shaft.

In the form shown in Fig. 9, the synchronizing arrangement comprises a switch 11—45 which at the end of each half operating cycle is actuated by a synchronizing mechanism 11—46 from one position to the other, for instance, from the position shown, in which its contacts are open, to the opposite position in which its contacts complete an energizing circuit from the relay supply lead 2+0 to the winding of the motor magnet 11—44, and thereby periodically reverse the direction in which the motor 11—35 drives the tape tracks.

For the sake of simplicity, the synchronizing mechanism 11—46 is shown formed of an oscillating arm mounted on a shaft 11—55 which is driven through a speed reducing worm gear drive 11—47 by spool shaft 11—33, so that during one half cycle, for instance, while the motor drives the spool shaft 11—34 to wind thereon the full operating length of the tape, the oscillating arm 11—46 is moved from the position in which it actuates the synchronizing switch 11—45 from one position to the opposite position, and thereby reverse, at the end of each half operating cycle, the direction in which the tape is driven.

Since the motion of the oscillating arm 11—46 is very slow, the synchronizing switch is designed to operate abruptly. Any abrupt acting switch in which the switch contacts are actuated from one position to the other by a spring constrained so that by imparting a slight motion to a portion thereof, another portion thereof will move abruptly and actuate the circuit opening contacts from the closed position to the open position and vice versa, of the type described in U. S. Patent 1,780,758, for instance, may be used.

For the sake of simplicity, the switch 11—45 is shown in the form of a switch blade having one end pivoted on a suitable support and having at its other end a knife edge against which is pressed one arm of a constrained U-shaped spring, the other arm of which is pivotally held on a fixed support, such as an adjusting screw so that by moving the switch blade past the neutral, unstable-equilibrium position, it will snap either to the full-line position or to the dotted line position 11—45′. The switch blade has a projecting pin 11—48 that is engaged by the oscillating arm 11—46 at the end of its oscillatory path, so as to tilt the switch blade 11—45 just past its neutral position at the end of each half operating cycle.

Various ways may be employed for utilizing a synchronizing mechanism, such as shown at 11—46, 11—47, for controlling the motor drive to drive the tape in opposite directions. In the form shown in the drawing, the synchronizing switch 11—45 is utilized for controlling, at the end of each half cycle, the tilt imparted to the driving motor, which rotates at all times in the same direction, and thereby reverse the direction of the driving motion imparted to the tape.

In the form shown, the several elements of the synchronizing arrangement are so designed that at the end of its clockwise oscillation, the oscillating arm 11—46 shall actuate the toggle switch 11—45 from the closed to the open position, and thereby actuate the driving motor to wind the tape on spool shaft 11—34, and that at the end of its counterclockwise oscillation, the oscillating arm 11—46 shall actuate the toggle switch 11—45 from the open to the closed position and thereby actuate the drive motor 11—35 to wind the tape on spool shaft 11—33.

The magnetic tape tracks 9—A, 9—B are arranged to cooperate with an amplifier arrangement and a recording control arrangement of the type described in connection with Fig. 1 for recording or reproducing in conjunction with the magnetic head of tape track 9—A when it is being wound in one direction on spool shaft 11—34 and in conjunction with the magnetic head associated with tape track 9—B when it is wound in opposite direction on spool shaft 11—33.

In the form shown, the periodical operation of synchronizing switch 11—45 at the end of each half cycle is utilized to operate a signal circuit relay 11—49 to control the interconnections between the amplifier circuits and the windings of the two magnetic heads 15—A, 15—B.

In the open position of the synchronizing switch 11—45, during one half of the operating cycle, the left hand contacts of the relay 11—49 complete circuits from the transducer windings and obliterating windings of magnetic head 15—A to the leads 1—53, 1—73, respectively, through which the recording switch 2—07, as shown in Figs. 1 and 5, establishes the circuits for recording or reproducing in conjunction with tape track 9—A while the tape is wound on spool shaft 11—34; and during its other half cycle, the closed synchronizing switch 11—45 energizes relay 11—49 and flexes its left hand contacts to break the circuits from magnetic head 15—A and establishes similar circuits to magnetic head 15—B for recording or reproducing in conjunction with tape track 9—B while the tape is wound on spool shaft 11—33.

In such recording apparatus, it is very desirable to know the portion of the tape track on which a recording is being made or from which a recording is being reproduced. In the form shown in Fig. 9, such indication may be supplied by an index arm 11—46′ which is actuated by the shaft of the oscillating arm 11—46 to indicate on a dial the progress of the reproducing or recording process as it proceeds on the two tape tracks.

In many applications requiring repeated playback of a message, it is very often important to provide facilities for increasing or decreasing the length of the play-back or recording cycle, or, in general, the operating cycle. A magnetic recording apparatus using reversibly driven magnetic tape tracks for playing back the recording on both tracks may be combined with a cycle control mechanism for enabling selective control of the length of the operating cycle. In Fig. 9, the synchronizing mechanism 11—46, 11—47 is shown utilized as a part of such cycle control arrangement. Any arrangement for varying the speed at which the synchronizing mechanism 11—46, 11—47 is moved to its different operating positions in relation to the speed imparted by the tape tracks may be used for such cycle control arrangements.

For the sake of simplicity, such cycle control arrangement is shown formed of a friction pulley 11—51 slidably keyed on the shaft 11—55 of the synchronizing arm 11—46 and arranged transversely to the radial direction of the face of a driving disc 11—52 forming part of the speed reduction gearing 11—47 so as to impart to the synchronizing arm 11—46 an oscillatory motion having a time period determined by the position of engagement between the transverse pulley 11—51 with the driving disc 11—52. The position of the driving engagement may be varied by shifting the pulley 11—51 along its shaft, for instance, by a pivotally mounted lever 11—53 engaging a collar groove formed on the pulley 11—51.

By shifting the transverse pulley 11—51 nearer or farther away from the center of the driving disc 11—52, the oscillatory movement imparted to the oscillator arm 11—46 may be decreased or increased. Such simple cycle control arrangement makes it possible to control the length of the recording or reproducing cycle on one or more of reversely driven magnetic recording tape tracks.

In such recording arrangement, it is also desirable to know the effective length of the operating cycle either in terms of the time or the operating length of the tape tracks that is being used.

In the form shown in Fig. 9, such indication is obtained by utilizing the lever 11—53 of the cycle control mechanism for indicating on a suitably calibrated scale 11—54 the length or duration of the operating cycle. For proper operation of such indicating arrangement, it is important to provide a locking arrangement which makes it impossible to change the effective operating length of the tape tracks during the progress of a recording or play-back operation, and permits the making of such change only at a predetermined point of the operating cycle.

In the form shown, the locking arrangement is designed to assure that the change of the length of the operating cycle can be made only when the entire available length of the tape tracks is wound on the spool shaft 11—33. Such locking arrangement may be formed, for instance, by providing the operating lever 11—53 with a locking arm 11—56 having locking teeth which are pressed by its cam follower into locking engagement with a toothed locking bar 11—57 as long as its cam follower engages the outer cam periphery of the driving disc 11—52, so as to keep the lever 11—53 and its pulley 11—51 locked against transverse movement.

The cam periphery of the driving disc 11—52 has a cam depression 11—58 into which the suitably biased locking arm 11—56 is released to unlock the lever 11—53 and permit adjustment of the speed ratio of the mechanism 11—51, 11—52 only when the lever is in the position when the full available length of the tape tracks has been wound on spool shaft 11—33.

In the form shown, the locking arm 11—56 has a certain amount of resiliency and all the elements of the locking mechanism are so designed and proportioned as to permit its biasing spring to press the locking arm out of its locking engagement into the released cam depression position only when the full length of the tape tracks that can normally be unreeled from spool shaft 11—34 on spool shaft 11—33 is wound thereon, and to assure that the locking arm will be actuated into its locking engagement with the locking bar promptly after a portion of the tape has been unreeled from spool shaft 11—33 and wound on spool shaft 11—34 during the next following operating cycle, and that it shall remain locked during the full length of an operating cycle and until the full effective length of the tape tracks has been wound on the spool shaft 11—33.

A locking arrangement of the foregoing type assures that the length of the tape cycle can be adjusted only in a predetermined operating condition of the tape driving mechanism. It eliminates the difficulties that might otherwise arise if, for instance, the length of the operating cycle is increased to the full length of the tape tracks while half of the tape tracks is wound on one spool and the other half on the other spool, since under such conditions, all the tape from one spool would be wound on the other spool before the end of the operating cycle and breakage of the tape or the driving mechanism might occur.

In order to render the operation of such apparatus foolproof, there are also provided means for preventing the energization of the motor unless there is available operating energy for the various control circuits associated with the motor drive.

In the form shown in Fig. 9, the motor 11—35 is shown arranged to be energized from power supply leads 3+0, 3—0, through an energizing switch 3—10, which, as in Fig. 3, establishes in the "on" position 3—12 the energizing circuits through lead 3+02 to the filter rectifier system of the amplifier as shown in Fig. 1—A. In order to prevent energization of the motor before the filter rectifier, which supplies D. C. energy for the control circuits, is fully energized through lead 3+02, there is included in the motor supply lead 3+01 normally open contacts of a time action relay 11—59 which is energized from the filter rectifier output supply terminal 2+0 the location of which is more completely illustrated in Fig. 1A, to close its contacts after a time delay, and complete the energizing circuit to the motor 11—35 only when the rectifier-filter circuit is ready for operation. With this arrangement, the motor energizing circuit is completed only after the filter rectifier circuit is energized and energizes from its positive filter supply lead 2+0 the motor cut-off relay 11—59.

In Fig. 9 is also shown how to combine a reversely driven magnetic track recording arrangement with a recording control mechanism of the type described in connection with Fig. 1. A recording synchronizing cam 3—05 with its cam switch 3—5 and a dial knob 3—31 are shown driven by the tape drive mechanism through a coupling clutch 3—73 connected to the synchronizing mechanism 11—46. In order to translate the oscillatory movement of the syncronizing mechanism into a unidirectional movement imparted to the recording control mechanism, a unidirectional driving mechanism is interposed between the coupling clutch 3—73 and the recording synchronizing cam 3—05.

For the sake of simplicity, the unidirectional driving mechanism 11—63 is shown formed of a shaft which is driven by the coupling clutch 3—73 and is arranged to drive through oppositely acting one-way clutches 11—64, 11—65 two gears 11—66, 11—67, respectively, which are affixed to the shaft of the synchronizing cam 3—05, an additional reversing gear 11—68 being interposed in the drive to one of the gears 11—66 and 11—67 so that the oscillatory motion imparted to the one-way clutches 11—64, 11—65 is translated into a uni-directional rotary movement of the gears 11—66, 11—67 and the recording synchronizing cam 3—05.

The clutches and the gears of the unidirectional driving mechanism 11—63 are so designed and proportioned that the oscillatory movement imparted to the synchronizing mechanism 11—46, during one complete operating cycle of the tape driving mechanism, will impart one complete rotation to the recording synchronizing cam 3—05.

Arrangements of the foregoing type assure that the recording synchronizing mechanism will perform one complete rotating cycle during one complete operating cycle of the tape tracks, and that the period of this operating cycle will be automatically increased or decreased by the operation of the variable speed mechanism interposed between the synchronizing mechanism and the tape driving mechanism.

The cam switch 3—5 of the recording control mechanism 11—63 is normally biased to the cam depression and is actuated by the periphery of the rotating cam to the flexed position in which its contacts 3—52 complete the energizing circuit which actuates the recording switch 2—07 to the recording position, and its contacts 3—51 energize the clutch solenoid 3—75 to couple the cam mechanism to the tape drive and keep the cam rotating until at the end of one revolution the cam switch is released to the cam depression position, thereby stopping the rotation of the cam and releasing the recording switch 2—07 to its play-back position, as in the arrangement of Fig. 1. A recording may be started by giving the cam 3—05 a slight initial turn sufficient to actuate its switch to the flexed cam periphery position, and the recording may be confined to any selected portion of the tape tracks as indicated by the pointer 3—31 as in the arrangement of Fig. 1.

A magnetic recording apparatus arranged and equipped in accordance with the principles underlying the arrangements shown in Fig. 10 makes it possible to use one or more pairs of tape tracks, for making a continuous recording extending over a selected length of both tracks of each pair while they are moved back and forth through the magnetic heads associated with each track, and to repeat a recording any desired number of times in a manner similar to an endless recording arrangement of the type described in connection with Fig. 1. Its recording control arrangement 11—63 makes it possible to start a recording on any selected portion of the tape tracks and to confine a recording to any selected portion of the tape tracks, in a way analogous to the operation of such recording control arrangement described in connection with Fig. 3. The variable speed mechanism 11—51, 11—52 interposed between the tape driving mechanism and the cycle control mechanism 11—46 makes it possible to vary the effective length of the recording and play-back cycle.

The moment of inertia of the motor 11—35, which, as pointed out above, rotates at all times in the same direction, is so chosen and designed as to have sufficient inertia in relation to the moment of inertia of the reversely driven tape transporting mechanism and the tape tracks carried thereby, and all the elements of the mechanism are so designed and proportioned as to assure that the motion of the tape tracks will be substantially instantaneously reversed with only a negligibly short interval in the recording or reproducing operation.

Reversely driven magnetic track recording arrangements of the type shown in Fig. 9 may be combined with radio, phonograph and similar equipments which supply entertainment or other programs so as to automatically interpose a play-back period from one or more magnetic recording tracks between successive program sequences. Any of the sequence control arrangements for combining such equipments with magnetic recording devices described in connection with Figs. 3 to 5 may be used for this purpose.

In addition, the synchronizing means used for continuously recording or reproducing with reversely driven magnetic recording tracks, may be utilized as sequence control means for controlling the sequence of the play-back periods and the successive entertainment or similar program periods. Fig. 9 illustrates one form of an arrangement utilizing the reverse drive synchronizing means of a reversely driven magnetic track recording device for controlling the sequence in which play-back periods from such recording tracks are alternated with programs supplied by other equipment, such as a radio broadcast receiver or similar entertainment device E.

There is shown in Fig. 9 an entertainment timer switch mechanism 11—07, an associated timer relay 11—70, and two holding relays 11—77, 11—78, arranged to be operated under the control of the track-drive synchronizing means 11—45, 11—46, and its associated relay 11—49. As in Fig. 5, the timer mechanism 11—07 has a cam switch 11—71 operated by a disc cam 11—72 arranged to be driven by a timer motor 11—73 so as to actuate its switch 11—71 from the released cam depression position to the flexed position when the cam 11—72 starts to rotate.

When the various elements are in the operating condition shown in Fig. 9, and the power switch 3—10 is in the "on" position 3—12, the previously energized holding relay 11—77 will remain energized through the holding circuit from the ungrounded side of its winding to the closed right-hand front contacts of the deenergized synchronizing relay 11—49 to the positive supply lead 2+0. At its open outer contacts, the actuated holding relay 11—77 keeps de-energized the timer relay 11—70. The released outer contacts of timer relay 11—70 and the serially connected closed outer contacts of the timer cam switch 11—71 complete an energizing circuit from the power lead 3+01 to the tape driving motor 11—35 keeping it running. In the position shown, the tape will be wound on spool shaft 11—34, playing back from tape track 9—A.

The play-back period will continue until the counter-clockwise-driven synchronizing arm 11—46 actuates its switch 11—45 to the closed position, thereby energizing the synchronizing relay 11—49 and the motor magnet 11—44. Thereupon, the actuated synchronizing relay 11—49 will break at its right-hand outer contacts the holding circuit to holding relay 11—77 and prepare at its now closed right-hand inner contacts a holding circuit for the other holding relay 11—78, which, as yet, remains released and completes with the just released upper contacts of holding relay 11—77 an energizing circuit for the timing relay 11—70. Thereupon, the timing relay 11—70 opens at its upper contacts the energizing circuit to the tape driving motor 11—35, and completes at its upper middle contacts an energizing circuit for the entertainment timer motor 11—73, thereby starting the rotation of the timer cam 11—72 and actuating its cam switch 11—71 to the upper flexed position.

The motor magnet 11—44 which has been energized simultaneously with the synchronizing relay 11—49 actuates the tape driving motor 11—35 to break its driving connection to spool shaft 11—34 and establish its driving connection to spool shaft 11—33 for winding thereon the tape, and play back the recording on its tape track 9—B as soon as its motor energizing circuit which was opened by the actuation of the timer relay 11—70 is reestablished when the timer cam switch 11—71 and the timer relay 11—70 have been released. The timer cam switch 11—71, which has been actuated by the rotation of its cam 11—72 to its flexed position, establishes at its flexed upper contacts another break in the motor energizing circuit while its upper middle contacts establish a parallel energizing circuit to its timer motor 11—73.

At the same time, the flexed lower contacts of the timer relay 11—70 and the timer cam switch 11—71 complete an energizing circuit for the holding relay 11—78, previously prepared at the flexed right-hand inner contacts of the energized synchronizing relay 11—49. In addition, the flexed lower middle contacts of the timer relay 11—70 and the timer cam switch 11—71 prepare a holding circuit for the holding relay 11—77 from its ungrounded side, to the now open right-hand outer back contacts of the synchronizing relay 11—49 which are closed only after it is de-energized when, at the end of the play-back half cycle on tape track 9—B, the clockwise-driven synchronizing arm 11—46 actuates the synchronizing switch 11—45 to its open position shown in Fig. 9.

The timer cam switch 11—71 is also shown utilized to operate its left-hand contacts, which complete in the released lower position a circuit from a reproducer R to the amplifier output lead 3—84 for playing back from the tape tracks, and which connect in the flexed upper position the reproducer R to the entertainment device E.

Accordingly, the tape driving motor remains de-energized and the entertainment device E supplies entertainment through the reproducer R for the duration of one revolution of the timer cam 11—72 as long as its cam switch 11—71 remains in its flexed raised position.

The holding relay 11—78, which was energized by the completion of its energizing circuit following the actuation of the timer relay 11—70 and the timer cam switch 11—71 to their flexed positions, breaks at its upper contacts the holding circuit for the timer relay 11—70, thereby preparing at its upper contacts the energizing circuit for the tape driving motor 11—35, and opening the other contacts. When, at the end of the entertainment period, the timer cam switch 11—71 is released by its timer cam 11—72, its closed upper contacts again complete the energizing circuit for the tape driving motor, thereby starting the play-back from tape track 9—B as it is being wound on spool shaft 11—33.

The holding relay 11—78 remains energized through the holding circuit leading through the flexed right-hand inner contacts of the synchronizing relay 11—49 which remains energized until, at the end of the play-back half cycle from tape track 9—B, the clockwise-driven synchronizing arm 11—46 actuates its switch 11—45 to de-energize the synchronizing relay 11—49, as well as the motor magnet 11—44. When this occurs, a sequence of operations similar to that which followed the energization of the synchronizing relay 11—49 and the motor magnet, will repeat itself, holding relay 11—78 being de-energized, and the timer relay being again energized, starting another program period timed by the timing motor, followed up by another play-back half cycle from tape track 9—A, as described above. Similar operating sequences repeat themselves as long as the main energizing switch 3—10 is in the "on" position 3—12.

The entertainment sequences may be eliminated, if desired, by providing, for instance, a switch 11—79 having one contact which completes a bridging circuit from the power supply lead 3+01 to the tape driving motor 11—35 so as to continuously drive the motor when it is actuated to the closed position, while at the same time its other contact set opens the circuit through which the relays 11—77, 11—78 of the entertainment mechanism are shown actuated by the operation of the synchronizing relay 11—49.

The principles underlying the features of the invention described in connection with Fig. 9 will suggest various modifications thereof. Thus, instead of interposing a play-back from one of the two tape tracks between two entertainment sequences, a play-back cycle from both tape tracks may be interposed by modifying the sequence control arrangement shown in Fig. 9 in the way shown in Fig. 10.

In the latter, the tilting motion of the tape driving motor 11—35 is utilized to operate a switch 11—80 having a group of two double-throw contact sets 11—81 through which the leads 1—53, 1—73, which establish the play-back circuits, are selectively connected to one or the other of the two magnetic heads 15—A, 15—B, during each successive half of a full play-back cycle on tape tracks 9—A, 9—B. In addition, the switch 11—80 is provided with a group of contacts 11—82, 11—83 for controlling in conjunction with a timer mechanism 12—07 and a timer relay 12—70 the entertainment and play-back sequences.

Let it be assumed that the arrangement of Fig. 9 is designed to supply a program sequence from device E at the end of a full play-back cycle starting at the right end of the tape track 9—A and ending at the right end of tape track 9—B after the tape has been fully rewound on spool shaft 11—33, and that in the operating position shown the tape has approached the end of the cycle and the tape driving motor 11—35 is held by its magnet 11—44 in the right-hand position in which it drives spool shaft 11—33, while playing back from tape track 9—B.

In this position, the tape motor 11—35 holds the synchronizing switch 11—80 in its flexed right-hand position in which its contacts 11—81 complete the circuits for playing back from tape track 9—B, while its contacts 11—82, 11—83 are in their open positions. In this operating condition, the tape driving motor 11—35 is energized from the power supply lead 3+01 through the closed upper contacts of the released timer cam switch 12—71. When, at the end of the play-back cycle on tape track 9—B, the clockwise-driven synchronizing arm 11—46 actuates the synchronizing switch 11—45 to the open position, thereby de-energizing the motor magnet 11—44 and releasing the motor 11—35 to the left-hand position, the motor releases its synchronizing switch 11—80 to its unflexed position in which its contacts 11—81 complete the play-back circuits from tape track 9—A and its contacts 11—82 complete an energizing circuit to the timer motor 11—73, and its contacts 11—83 prepare a holding circuit for the timer relay 12—70. The energized timer motor 11—73 actuates its cam to flex its cam switch 12—71 to the upper position in which its upper contacts open the energizing circuit to the tape driving motor while its middle contact completes a parallel energizing circuit to its timer motor 11—73. In addition, the upwardly flexed lower contacts of the timer cam switch 12—71 energize the timer relay 12—70, which thereupon completes at its lower contacts a holding circuit for itself, while its upper contacts which are parallel to the middle contacts of the timer switch 12—71 open its circuit connection to the timer motor 11—73. As in Fig. 9, the left-hand contacts of the timer cam switch 12—71 serve to change the interconnections to the reproducer R.

The program supplied by the program device E continues until, at the end of one rotation of the timer cam 11—72, its cam switch 12—71 is released, thereby breaking at its middle contacts the energizing circuit to the timer motor 11—73, while re-establishing at its upper contacts the energizing circuit to the tape driving motor to start a new play-back cycle on tape tracks 9—A, 9—B.

The timer relay 11—70 remains closed by the holding circuit completing at the synchronizing switch 11—80, being energized only at the end of the play-back half cycle on tape track 9—A when the tape driving motor 11—35 and the synchronizing switch 11—80 are tilted back to the right-hand position, thereby re-establishing the condition of the operating circuits shown in Fig. 10. This cycle repeats itself at the end of each full play-back cycle when the full operating length of the tape has been wound on spool shaft 11—33.

The principles of the invention underlying the automatic control arrangements of the magnetic record transducing arrangements described above in connection with Figs. 1 to 10 may also be utilized for providing automatically controlled magnetic recording systems which make it possible to secure, in response to a selective starting operation, the automatic playback of one, two or more magnetically recorded signal sequences, such as musical recordings in response to a selection operation; the automatic playback of one, two, or more sequences arbitrarily selected in a selected order from a larger number of such sequences; the automatic magnetic recording of different selected signal sequences, such as selected radio broadcast programs, supplied at a predetermined different pre-set time during pre-set periods; and various other analogous applications.

Figure 11:
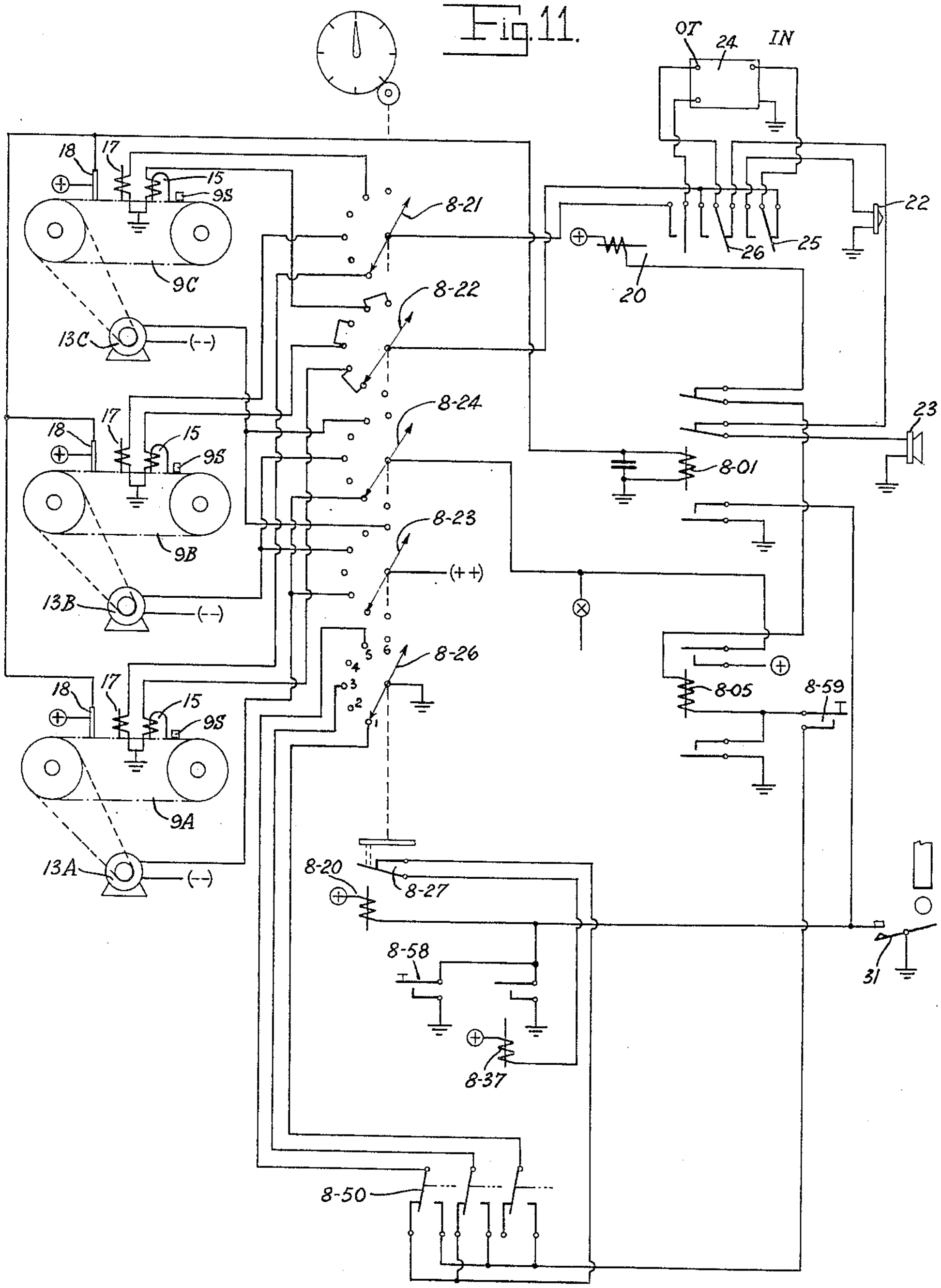

In Fig. 11 is shown an arrangement of the invention which makes it possible to secure automatic playback of one or more magnetically recorded sequences, such as musical recordings, in response to a selected starting operation, such as the dropping of a coin. It comprises a plurality of magnetic recording tracks 9A, 9B, 9C which are shown as of the endless type. Although several recording tracks may form part of a single magnetic tape, they are shown as being individually mounted on suitable guide and impelling means and they are shown arranged to be individually driven, as by motors 13A to 13C which transmit their rotary driving force as through belts to guiding and impelling rollers the periphery of which is engaged by a portion of the moving magnetic signal carrier track.

Each of the magnetic recording tracks 9A to 9C is shown associated with signal transducing elements 15 and obliterating elements 17, an amplifier 2—00 being provided to reproduce the recorded signals through a sound reproducing loudspeaker 23 when the recording relay 2—07 has its switch elements in the reproducing position shown, provided the other control circuits described hereinafter are completed. When the recording relay 2—07 is operated by energizing the winding, the individual transducing head will be connected for recording signals impressed on the amplifier either by a microphone 22 or by a suitable signal supply circuit, such as an output tap of a broadcasting receiver.

Each of the magnetic signal tracks 9A, 9B, 9C is also provided with a synchronizing element 9S arranged for cooperation with a synchronizing signal transmitter 18 which may be a switch, such as described in connection with Figs. 2 or 7. Furthermore, the arrangement shown is also provided with automatic sequence control means shown in the form of a step switch 8—20 having sets of contacts engaged in successive steps by the respective rotary contact arms 8—21, 8—22, 8—23, 8—24, 8—26 when the winding of the stepping switch 8—20 is energized by current impulses transmitted thereto.

This system also has auxiliary relays 8—01, 8—05, 8—37 and control switches 8—58, 8—59 arranged to perform functions analogous to those explained in connection with the corresponding elements of Fig. 5. The entire operation of the system is selectively started by the momentary actuation of a starting switch 31 which may, for instance, be operated by a coin. Although the several recording tracks are shown as being driven by separate motors, they may be arranged to be driven by a common motor, and they may form part of a single magnetic record carrier, such as a magnetic tape, in which case the same motor or the same driving connection to the common carrier will be established when, as described hereinafter, a recording is to be played back from any of the individual recording tracks.

The various elements of the system shown in Fig. 11 are so arranged and correlated that momentary actuation of the starting switch 31 from the non-operated position shown to the operated closed position brings about first a reproduction or playback of the recording from the recording track 9A, followed by a reproduction of the recording from the recording track 9B, followed by a reproduction of the recording from track 9C, the playback process being stopped on completion of the succession of playbacks from the several recording tracks.

The signal transmitter relay 8—01 is arranged to be operated by a signal transmitted from the signal transmitter 10 upon the passage of the synchronizing element 33 of any one of the signal tracks past the associated signal transmitter unit 18. The recording control relay 8—05 performs the same function with a similar relay as performed in the arrangement of Fig. 5. When the multi-blade switch 8—50 is in its left-hand position, it connects the several circuits for reproducing, and in its right-hand position it connects them for recording.

Further details of the system as shown in Fig. 11 will be explained from the following description of its operation:

Momentary actuation of the starting switch 31 to the closed operated position sends an impulse through the coil of the stepping switch 8—20, thereby advancing its contact arms from the position 1 to position 2 of contact arm 8—23.

In position 2 of the stepping switch, contact arm 8—23 energizes the drive motor 13A of the signal track 9A for playing back the signal sequence recorded thereon. The recorded signal will be picked up by the transducer element 15 of signal track 9A and impressed through contact arm 8—22 of the stepping switch and contact arm 8—25 on the input terminal IN of the amplifier, by way of the contact blade 25 of the recording relay switch 2—07. Output terminal OT of the amplifier impresses its output on the reproducer 23 by way of a circuit including the contacts 26 of the recording relay 20 and the inner upper contacts of the relay 8—01 and the reproducer will play back the signals from the recording track 9A.

As soon as the signal track 9A has completed one cycle, its transmitter 13 will send an impulse to the transmitter relay 8—01 and bring about its operation. In its operated position, relay 8—01 momentarily opens the circuit to the sound reproducer 23 so as to eliminate any click or similar disturbances, such as might be caused by the synchronizing signal moving past the transducer elements 15, and the operated lower contacts of relay 8—01 send a stepping impulse to the stepping switch 8—20, thereby advancing its wiper contact arms to the next position 3.

In the third position of the stepping switch, its contact arm 8—26 completes a circuit through a lead by way of one of the contacts of the multi-blade switch 8—50 and a back contact 8—27 of the stepping switch to the coil of relay 8—37, and causes it to send an impulse through the coil of the stepping switch, thereby bringing its wiper arms to the next position 4.

In the next position 4 of the stepping switch 8—20, its wiper arm 8—23 energizes the driving motor 13B, thereby starting playback action from magnetic recording track 9B, its transducer elements 15 being connected through wiper arm 8—22 to the input terminal IN of the amplifier in the manner described before in connection with the operation of the recording track 9A. If the playback operation from the recording track 9B has been completed, its synchronizing signal 9S will bring about repetition of a similar process and set in operation a playback cycle from recording track 9C.

Upon completion of the playback operation from recording track 9C, synchronizing signal 9S will bring about a series of operations analogous to those described above as a result of which the wiper arms of the stepping switch are restored to the position shown in the drawing, thereby stopping further playback operations. With the arrangement shown, a new recording for replacing a previous recording may be made on any of the selected recording tracks 9A, 9B, 9C.

To initiate the recording operation, the recording switch 8—50 is actuated to the opposite position and switch 8—59 is momentarily closed so as to actuate relay 8—05 to the operated position in which it closes at its lower contacts a holding circuit for itself, while its upper operated contacts complete a circuit from the power supply terminals (++) to the wiper contact blade 8—24 of the stepping switch through which, in its positions 2, 4 and 6, it completes circuits to the driving motors 13A, 13B, 13C, respectively, in a manner analogous to the operation of the wiper switch 8—23 during the reproducing process.

The operation of relay 8—05 also actuates the recording relay 20 to its recording position. This may be done either by providing the relay 8—05 with an additional set of contacts, the operation of which completes an energizing circuit for the recording relay 2—07, or, as shown, relay 2—07 may be arranged to become operative simultaneously with relay 8—05 by connecting the two coils in series.

The principles underlying the control arrangements described in connection with Figs. 4 to 10 are obviously applicable also for use in connection with the control arrangements described in connection with Figs. 1 to 3 and vice versa. The step switch of the arrangement of Fig. 4 may be provided with one or more additional switch units arranged so as to make it possible to utilize only one of the tapes for consecutive play-back cycles, provision being made for disconnecting the operating circuits of the selected tape from the other switch unit while breaking its operating circuits to the switch unit shown. Various other modifications will suggest themselves to those skilled in the art.

Instead of using a plurality of magnetic tape recording mechanisms provided with their own tape driving motors, in the way shown in Fig. 5, the several tapes may be arranged to be driven by a single motor in the way described, for instance, in connection with Fig. 17 of my copending Patent 2,224,854, for cooperation with any one of the control arrangements embodying the principles of the invention, as described hereinbefore in connection with various exemplifications thereof.

Figure 12:
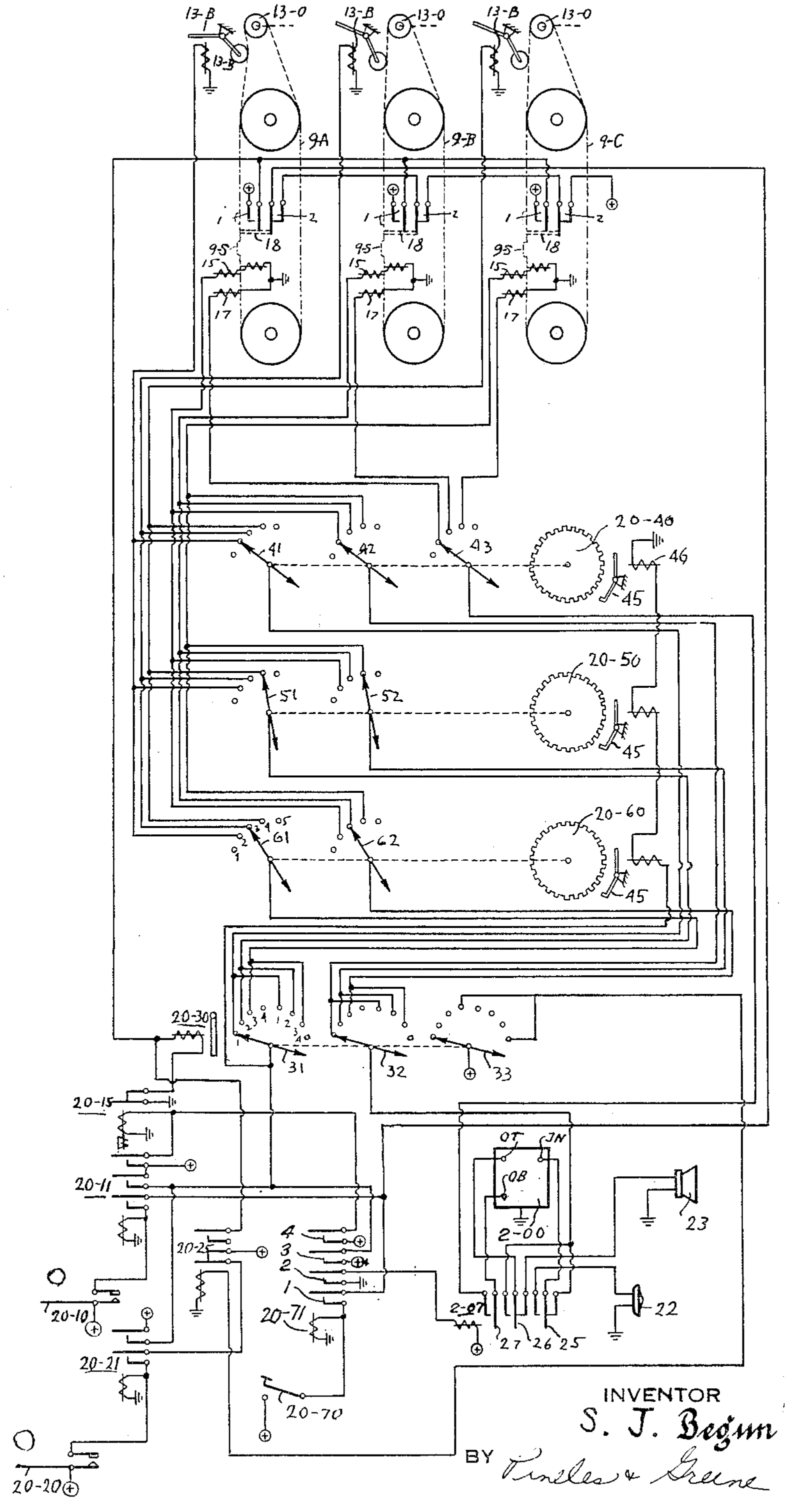

In Fig. 12 is shown how the principles underlying the automatic control arrangements and magnetic record transducing arrangements described above may be embodied in automatically controlled magnetic recording arrangements which make it possible to selectively play back one, two or more recorded signal sequences selected at random from a large number of such sequences and to permit successive playback of the several selected sequences in accordance with any arbitrary order of selection.

The system shown comprises a plurality of magnetic recording tracks 9A, 9B, 9C and their associated signal transducing and obliterating elements 15, 17, arranged to be selectively driven, as by coupling connections indicated in dotted lines as belts, which connect a guide roller of each carrier track to driving pulleys 13—0 which are mounted on a common motor-driven shaft, not shown. The individual belt-coupling connections from the driving pulleys 13—0 to the several carrier tracks 9A to 9C may be established or broken by energizing or de-energizing the actuating coil 13—B of a magnetically-actuated belt tensioning roller. Obviously, any conventionally-used drive coupling connections may be used, the drawing indicating, for the sake of simplicity, the general principle of an electrically-controlled drive coupling connection.

There is also shown a sound reproducing loudspeaker 23 and an amplifier 2—00 similar to those described in connection with Fig. 1 for reproducing signals recorded on the individual tracks under the control of a control relay switch 2—07 or for making a new record on a selected track from a signal supply source indicated in the form of a microphone 22. Each of the record carrier tracks 9A, 9B, 9C is also provided with a synchronizing element 9S cooperating with a signal transmitter switch 18, similar to those described before.

The particular form of system shown is intended to make possible either a selective playback from any particular record track selected from a large number of tracks, or for playing back successively selected recordings from three selected tracks in any desired selected sequence. For this reason there are only three recording tracks shown and it is assumed that, in addition, the equipment has a large number of generally similar recording tracks from which a selection may be made.

Starting switch 20—10 and the associated relays 20—11 and 20—15 perform the operations which bring about playback from a single selected track. Starting switch 20—20 and the associated relays 20—21, 20—25 perform the operations which bring about successive playback from a plurality of selected tracks in a desired sequence. Step-by-step switch 20—30 serves to control the succession of playbacks from several tracks. Three selector switches 20—40, 20—50, 20—60, which are shown as manually-operated multi-arm contact switches are provided for making it possible to select the sequence in which the recordings of several successive tracks are to be played back.

In the arrangement shown, each of the arms of the selector switches 20—40 to 20—60 may be manually brought into engagement with any one of a large number of contacts, each connected to the elements associated with the operation of a different record track, the number of contact points of each contact arm corresponding to the number of different record tracks. In the arrangement shown, the selector switches 20—40 to 20—60 are set so that when starting switch 20—10 is operated, the recording of track 9A is played back, whereupon the playback operation stops. Selector switch 20—40 controls the selection of the track from which a single playback operation is to be performed.

In the position shown, selector switch 20—40 prepares the following circuits: Through its contact arm 41 from the coil of the drive coupling relay 13—B, by way of the contact arm 31 of the sequence step switch 20—30 in contact position 1, to the operating contacts of the relays 20—11 as well as the relays 20—21, 20—71 so that when any one of the rollers is operated, the track 9A is set into motion to start a record transducing operation. Contact arm 42 of selector switch 20—40 prepares a circuit from the transducing element 15 of signal carrier 9A, one end of which is shown grounded, by way of contact arm 42 of the selector switch to the contact blade 32 of the sequence control switch 20—30, in position 1, which is connected through the recording relay switch 2—07 to the input side of the amplifier 2—00, the output of which is in turn impressed on the reproducer 23 for playing back the recording.

In a similar manner, contact arm 43 of the selector switch 20—40 prepares a circuit for supplying obliterating current to the obliterating elements 17 of the recording track 9A, one side of which is shown grounded, the other side of which is connected through contact arm 43 to contact 27 of the recording relay 2—07 for supplying the obliterating current when the recording relay 2—07 is operated. By manually turning the selector switch 20—40 to different contact positions, it will establish playback or recording connections for the different recording tracks, the corresponding elements of the different recording tracks being connected to consecutive contact points of each bank of contacts of the selector switch 20—40.

Selector switches 20—50, 20—60 have only two arms, namely, 51, 52 and 61, 62, respectively, cooperating with banks of contacts in a manner analogous to the contacts 41, 42 of the selector switch 20—40 and serve to select the particular track which is to be played back first when starting switch 20—20 is actuated. The contact banks of the selector switches 20—50, 20—60 are connected to the elements of the several recording tracks 9A to 9C, in the same manner as the corresponding elements of selector switch 20—40. The position of the selector switch 20—50 selects which recording track is to be played back in succession after the recording from the track selected by selector 20—40 has been completed. The position of the selector switch 20—60 selects the track which is to be played back in succession after the playback from the track selected by the selector switch 20—50 has been completed.

In the positions of the selector switches 20—40 to 20—60 shown, momentary actuation of the starting switch 20—20 will bring about successive playback first from track 9A, as determined by the selected position of selector switch 20—40, followed by the playback from track 9C, as selectively determined by the position of selector switch 20—50, and followed by playback from track 9B, as determined by the position of the selector switch 20—60. Inasmuch as each of the contact arms of the selector switches 20—40 to 20—60 has banks of contacts to which the operating elements of a large number of recording tracks may be connected, a large number of selections for successive playback may thus be provided. The arrangement shown makes it also possible to playback successively from the same track several times, for instance, by placing all selector switches 20—40 to 20—60 in a position corresponding to the same recording track, for instance, track 9A.

Other features of the system shown in Fig. 12 will be explained by the following description of its operation: Momentary actuation of the starting switch 20—10, as by a coin dropping from a coin chute, will operate relay 20—11. In its operated closed position, relay 20—11 establishes the following circuit connections: At its first inner contact, it locks itself in the operated position through a series connection, by way of the closed upper contacts 2 of each of the several synchronizing signal transmitting relays 18 associated with the several recording tracks 9A, 9B, 9C. At its operated second contact, relay 20—11 completes a connection by way of arm 31 of sequence relay 20—30 and arm 41 of selector switch 20—40 to the drive coupling relay 13—B of recording track 9A, thereby starting a transducing operation in the manner described above. At the third upper contact, relay 20—11 energizes the time action relay 20—15 which opens the operating circuit through the step magnet of the sequence control step switch 20—30, thereby preventing any operation of the sequence control switch as long as relay 20—11 remains energized and a short while thereafter due to the time delay action of relay 20—15.

At the end of a playback cycle from the carrier track 9A, its synchronizing element will momentarily operate the associated synchronizing signal transmitting switch 18. In its momentarily operated position, the synchronizing switch 18 will, at its upper open contacts 2, break the holding circuit of relay 20—11, causing it to release its contacts to their open non-operated position. In addition, the operated synchronizing switch 18 of track 9A will establish at its inner contacts a circuit for energizing the stepping magnet of the sequence control stepping switch 20—30. The stepping magnet circuit remains open, however, because the time delay action of the relay 20—15 has kept open its contacts during the short interval while the synchronizing signal 9S of track 9A moves past its operative position opposite the synchronizing switch 18. The whole system has thus been restored to the original position in which it was before the starting switch 20—10 for a single playback operation has been actuated.

When starting switch 20—20 is momentarily actuated, as by a suitably larger coin dropped through a coin chute, it will energize the associated relay 20—21 which will lock itself in its closed operating position through a circuit completed at the inner contacts of the relay 20—25 which are normally biased to the closed position. In the operated position, relay 20—21 will, at its upper closed contacts, establish a circuit through the contact arm 31 of the sequence control stepping switch 20—30 and therefrom by way of the contact arm 41 of the selector switch 20—40 to the drive coupling relay 13—B of track 9A, thereby starting a playback operation therefrom, the other circuits for securing a playback operation from track 9A being completed by the contacts 42 and 32 of the selector switch 20—40 and sequence switch 20—30, respectively, in the manner described above.

In its momentary operated position, synchronizing switch 18 of track 9A completes at its inner contact an energizing circuit for the stepping magnet of the sequence switch 20—30, thereby advancing its contact blades to position 2, the stepping magnet circuits being now closed since the relay 20—15 is not energized.

The sequence switch 20—30 will, in its second position, establish the following circuits: At its contact blade 31, it will complete an energizing circuit for the drive coupling 13—B of track 9C, by way of contact arm 51 of selector switch 20—50. The contact arm 32 of sequency switch 20—30, in position 2, will complete, by way of arm 52 of selector switch 20—50, an input circuit from the transducer 15 to the amplifier 24 and therefrom to the reproducer for playing back the recording of track 9C, which will now proceed until the entire recording has been played back. At the end of a playback cycle from tape track 9C, its synchronizing signal 9S will momentarily actuate its synchronizing relay 18.

On being brought to position 3, the sequence switch 20—30 completes at its contacts 31, 32 analogous playback circuits for bringing about, in an analogous way, playback from recording track 9B, until, at the end of the playback cycle, the synchronizing switch 18 of the track 9B is momentarily operated. The momentary operation of synchronizing switch 18 of track 9B completes at its inner contacts 1 an energizing circuit for the stepping magnet of the sequence relay 20—30, thereby advancing it to position 4.

In position 4, the sequence control switch 20—30 energizes through its contact arm 33 the relay 20—25 which, by opening its lower inner contacts, breaks the holding circuit for relay 20—21, and by operating its upper contacts, closes a circuit for the stepping magnet of the sequence control relay 20—30, thereby advancing it to the next step corresponding to its original position 1 in which the circuit for relay 20—25 is again broken. The system is thus again restored to its original condition in which it was before the starting switch 20—20 has been operated.

Depending on the positions of the selector switches 20—40 to 20—60, the sequence in which the different tracks interconnected with the array of contacts of each bank of selector switches, may be selected in any random order and three selected tracks will be played back in the desired selected order. By adding one or more additional selector switches and corresponding other related components of the switches, provision may be made to play back in succession from any number of tracks selected from a larger number of tracks in any desired selected sequence.

Means also may be provided to make it impossible to change the settings of any of the selector switches 20—40 to 20—60 after the system has been set in operation by actuation of the starting switch 20—20. In the drawings, the locking arrangement is indicated diagrammatically by providing each selector switch 20—40 to 20—60 with a notched locking disc the teeth of which may be interlocked by latch arms 45 which are normally biased to an unlocked position and may be interconnected either mechanically or electrically and actuated to the locking position as by completing the energization of locking windings 46 through the same circuit through which the driving connections are established.

Automatic control systems of the type described above may be also utilized for selectively bringing about recording of signals supplied, for instance, from a broadcast receiver at different selected periods and from different selected stations on successive synchronized recording tracks, for instance, one recording track being used for recording a fifteen minute broadcast at a selected time from one station and the next recording track being automatically actuated to record a broadcast from another selected station at another selected time, and so forth.

If a system such as shown in Fig. 12 is used for commercial entertainment, such as juke box applications, it is desirable to provide facilities for making it possible to replace a previous recording on any selected track with a new recording. To make a new recording with the elements of the system arranged in the position shown, it is merely necessary to close temporarily the push button switch 20—70, which immediately energizes the associated relay 20—71.

In its operated closed position, relay 20—71 establishes the following circuits: At its inner contacts 1, it completes a holding circuit by way of the contacts 2 of the synchronizing switches 18 of the several recording tracks 9A, 9B, 9C. The second contact 2 of relay 20—71 energizes the recording relay 2—07 and actuates its contacts to the recording position in which a signal is supplied either from the microphone 22 or from a broadcast receiver circuit and is recorded on the track selected by selector switches 20—30 and 20—40, namely, in the position shown, track 9A. The operated contact 3 of relay 20—71 energizes the circuit which establishes the driving connection to the selected track in the manner explained above, through the contacts 31 of the sequence switch 20—30 and contact 41 of selector switch 20—40. The operated contact 4 of relay 20—71 operates the time delay relay 20—15 so as to make the stepping magnet inoperative in the same manner as described above in connection with the operation of the relay 20—21 to prevent the stepping magnet from operating and keep it in its position shown when, at the end of a track cycle, the associated synchronizing switch is momentarily actuated by the synchronizing signal 9S of the associated track.

At the end of a recording cycle, the synchronizing signal 9S of the track will momentarily operate the synchronizing switch 18 to open at its contacts 2 the locking circuit for relay 20—71 thereby releasing it to the non-operated position shown. Another recording may be made on any other selected track by turning the selector switch 20—40 to the appropriate selected contact corresponding to the track.

It will be noted that selector switch 20—40 has, in addition to the contact arms through which the driving and transducer head connections of the different tracks are operated, also an additional contact arm 43 through which the obliterating circuit is operated. With this recording arrangement, a new recording may be made of any selected track by momentarily pushing the recording starting button 20—30, the recording operation being automatically terminated at the end of a track cycle, as determined by the synchronizing signal 9S thereof.

The automatic control arrangement described above in connection with magnetic recording systems utilizing endless magnetic recording carriers is also applicable in combination with magnetic recording systems operating with magnetic recording carrier tracks of limited length, such as magnetic tape tracks or magnetic filament or wire tracks, a length of which is transported from one reel to the other.

In many applications, it is desirable to have recording equipment utilizing a magnetic recording medium of the non-endless type which operates in a manner equivalent to one using an endless recording medium, because of the greater flexibility of the recording equipment using non-endless recording media. For example, in an endless magnetic recording system, the recording and reproducing time is determined by the length and the speed with which the endless carrier moves relatively to the magnetic transducing head. The length of an endless magnetic carrier is, in general, not variable, and the speed of its motion relatively to the transducing head can be changed only within relatively narrow limits. Thus, if the speed of a magnetic signal carrier becomes too slow, the frequency response is not satisfactory, and if the speed with which the recording medium is moved is made too high, a great many difficulties arise in connection with the mechanical features of the system. In addition, special equalization units must be provided to compensate for the different variations in the frequency response of the recording and reproducing process at the different speeds of the recording medium.

According to one phase of the invention, these difficulties are overcome and a system having practically all the advantages obtainable with a system using an endless recording medium, but free from its limitations, is obtained by combining two record carrier tracks, each cooperating with a signal transducing element, in such manner as to reproduce the same recorded signal sequence from each track by a relative motion back and forth between the carrier tracks and the transducing means.

As applied the system of the invention uses two magnetic signal tracks moving back and forth past their associated transducing means, the same signal sequence being recorded on each track in such manner that the recorded sequence is first reproduced from one track while it moves in one direction, followed by the reproduction of the same sequence from the other track, while moving in opposite direction and so forth. In other words, in this form, the same signal sequence is first reproduced from one signal track and then from the other signal track, while the position of the first signal track relatively to the associated transducing means is restored.

Figure 13:
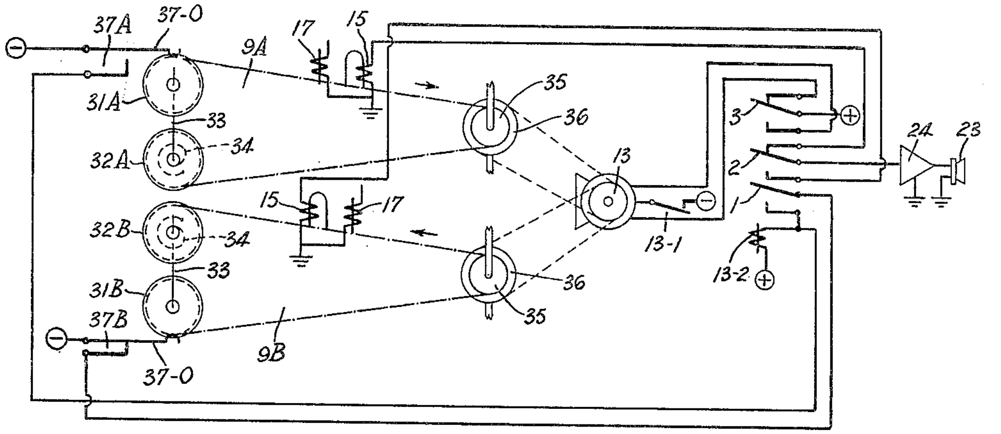

In Fig. 13 is shown diagrammatically one form of a magnetic recording system utilizing two signal carrier tracks 9A, 9B for operating in a manner equivalent to an endless recording medium. The two signal carriers 9A, 9B are indicated as being in the form of wires or filaments of permanently magnetizable material, each signal carrier 9A being stored in coiled form on two reels 31—A, 32—A, and signal carrier 9B being stored in coiled form on reels 31—B, 32—B.

Each pair of reels 31—A, 32—A and 31—B, 32—B may be arranged to rotate in unison so that when the two pairs of reels are rotated in clockwise direction, the signal carrier 9A will be wound from reel 31—A on reel 32—A, while an interconnecting loop portion of the signal carrier is guided over a guide roller 35 past associated carrier obliterating elements 17 and signal transducing elements 15 for making a new record or reproducing from signal carrier 9A, while at the same time the signal carrier 9B is wound back from reel 32B on reel 31B, and that upon the reversal of the rotation of the two pairs of reels, the recorded signals are reproduced from signal carrier 9B as its interconnecting loop is guided in the same manner over a similar guide roller 35, past its associated carrier obliterating elements 17 and signal transducing elements 15 as it is being wound in counterclockwise direction on reel 32—B.

The pair of reels 31—A, 32—A on which signal carrier 9A is stored, is shown revolvably mounted on a common shaft element 33, reel 31—A being keyed to the shaft and reel 32—A being connected to the shaft through an energy-storing spirally-wound biasing spring 34.

Since the signal carrier 9A must at all times be maintained under tension and at any instant all parts of the carrier must move at the same linear speed, the two reels will revolve with the same angular speed only during the short interval while the diameter of the two signal carrier coils stored thereon is the same, the two reels 31—A, 32—A moving at different angular speeds under all other operating conditions. To secure satisfactory operation of the recording system under such conditions, the two reels 31—A, 32—A are mechanically interconnected in the manner shown by affixing reel 31—A to the associated shaft element 33, as by a key, and by connecting the associated reel 32—A to the shaft element 33 through an energy-storing spring 34 designed so as to maintain the signal carrier under tension at all times and to permit one reel to move at differential angular speeds relatively to the other reel in order to compensate for the difference of the coil diameters formed by the signal carrier on the two reels when it is transported from one to the other, the principles of this arrangement being more fully explained in my copending application Serial No. 524,479, filed February 29, 1944, now abandoned, in connection with Figs. 8, 10 and 11 thereof, which also describes the principles underlying the construction of the reel mechanism and of the transducer head 15 suitable for efficiently recording and reproducing with a filamentary signal carrier.

The other pair of reels 31—B, 32—B are interconnected in an analogous manner to a similar associated shaft element 33. Each of the two shaft elements may be hollow and arranged so as to rotate freely on a common shaft. Alternatively, each shaft element and the associated pair of reels which are utilized to store a given signal carrier may be designed to form a self-contained revolvably mounted unit designed for mounting in its proper operative position in relation to the transducing head and the guide roller 35.

In the arrangement shown in Fig. 13, the guide roller 35 over which the cross loop of each signal carrier is guided is also utilized for imparting the reeling motion to the associated signal carrier for reeling on from one reel on the other, and vice versa. This is indicated by showing each guide roller 35 interconnected with a driving pulley 36 which, in turn, is shown suitably coupled, as by a belt, indicated in dotted lines, to a pulley of a driving motor 13 which is indicated as being of the reversible type.

In the arrangement shown in Fig. 13, each track impelling roller 35 and its associated driving pulley 36 are shown mounted for independent revolving motion and as being connected to separate belt coupling connection to the driving pulley of the motor. However, the two impelling rollers 35 may be mounted on a common shaft in the manner indicated in Fig. 14.

A motor control switch 13—1 and a control relay 13—2 serve to control the reproducing operation which is indicated as carried on in conjunction with an amplifier 2—00 and a reproducer 23. Each pair of reels is also associated with synchronizing signal means in the form of a switch 37—A, 37—B which is operated from the non-operated position to the operated flexed position when the reels 31—A, 31—B from which the signal carrier is reeled off during the recording or reproducing processes, become practically empty or reach the region of their innermost coil layer. Each of the switches 37—A, 37—B is indicated as being combined with an arm which may be formed of a flat bar having a finger extending over substantially the entire height of the reel and resting on the outer convolution of the coil, the arm 37—0 being biased to remain at all times in engagement with the outer coil layer and to operate the associated switch only in the pre-set position when further reeling motion is to be stopped. Such synchronizing switches may be arranged for adjustable mounting so as to make it possible to selectively adjust the degree to which the signal carrier may be moved from one reel to the other.

Since in the arrangement shown, the two pairs of reels move in unison, only one synchronizing switch is provided for one pair of reels. If only a single pair of reels associated with a single signal carrier only is used for carrying on recording and reproducing, a single synchronizing switch with two sets of contacts may be used, one set of contacts serving to stop the carrier track impelling operation when a given reel is emptied to the desired degree and the other set of contacts being arranged to stop the impelling motion when the reel has been filled to the desired degree. Alternatively, each of the two reels, such as 31—A, 32—A may be provided with its synchronizing switch actuated to stop the impelling motion when the respective reels have been emptied to the desired degree.

Fig. 13 illustrates one form of arrangement for utilizing two record tracks 9A, 9B to operate for any desired continuous period as an endless recording medium, the same signal sequence being recorded on each track in such manner, for instance, that the signal is being reproduced from track 9A as it is being reeled in clockwise direction on reels 31—A, 32—A, synchronizing switch 37—A stopping the motor 13 when reel 31—A has emptied and bringing about a reversal of the motor connection and a reversal of the reproducing playback circuit connections to the amplifier, as a result of which, immediately upon termination of the playback cycle from carrier track 9A, the playback cycle from carrier track 9B is started and continued until, at the end of the playback cycle, reel 31—B reaches the condition at which it has been emptied, thereby causing the synchronizing switch 37—B to operate for effecting reversal of the driving and playback connections to again bring about reproduction of the same signal sequence from the signal carrier 9A.

Assuming that the system of Fig. 13 has its elements connected and set in the position shown, it may be set in operation by closing the motor energizing switch 13—1. Closure of the motor switch 13—1 connects the center tap of the motor to one source of power supply indicated by (−), the motor being connected to the (+) side of the power supply through the upwardly biased contact blade 3 of the control switch 13—2. It is understood that although the motor is shown supplied from a power source, indicated by (+) and (−) signs, this is done only for the sake of simplicity as a standard, reversible, alternating-current motor would normally be used.

It is assumed that this motor connection causes the track 9A to be impelled in clockwise direction for impressing a picked up signal on the associated transducer elements 15, the winding of which is shown connected through the normally upwardly-biased blade 2 of the control switch 13—2 to the amplifier therefor, so that the reproducer 23 may play back the recorded signal sequence. The synchronizing switch 37—A associated with reel 31—A is so adjusted that at the end of the recorded signal sequence when reel 31—A has been sufficiently unwound, its synchronizing switch 37—A will operate to complete a circuit which momentarily energizes the control relay 13—2, thereby energizing control relay 13—2 to its operated position.

In its operated position, relay 13—2 establishes at its blade 1 a holding circuit which is completed through the closed contacts of the synchronizing switch 37—B associated with the now filled reel 31—B of signal carrier 9B. In addition, the operated control relay 13—2 reverses as its downwardly operated contact 3 the motor connection, so as to cause the motor to rotate in opposite direction and impel track 9B in counterclockwise direction past the associated transducing elements 15 which are now connected by the operated position of contact 2 of the control relay 13—2 to the amplifier for reproducing its signal sequence.

At the end of the playback cycle from signal carrier 9B, its sufficiently emptied reel 31—B will actuate the associated synchronizing switch 37—B to open at its contacts the holding circuit of relay 13—2, thereby releasing its contact arms from their operated position and restoring the circuit connections shown for playing back the signal sequence from signal carrier 9A, while it is being impelled in clockwise direction at the same time that signal carrier 9B is being rewound on reel 31—B.

In Fig. 14 is shown one way in which control arrangements of the type described in connection with Figs. 1, 3, 5 and 11 may be utilized for combining a plurality of double-track recorders of the general type shown in Fig. 13 for enabling selective playback or, in general, selective transducing operations from any arbitrarily selected signal track units, generally indicated by X and Y. Each playback unit of Fig. 14 has a pair of signal tracks 9A, 9B of a recording mechanism, such as shown in Fig. 13. For the sake of simplicity, Fig. 14 shows the cross-over loop portion of each of the signal carrier tracks 9A, 9B with the associated transducing elements 15 and impelling rollers 35, the two impelling rollers being shown mounted on a common shaft which is driven by a motor 13 shown coupled through a belt to a pulley.

Although a single control relay 13—2 may be used for controlling the operation of each recording unit of Fig. 14, it is shown provided with two sets of control relays 13—2—A, 13—2—B. Relay 13—2—A, when energized to its operated position, completes at its inner contact 1 a circuit which connects the transducer elements 15 of track 9A to the amplifier 2—80 for playing back a sequence recorded thereon, while its second operating contact 2 energizes the motor 13 to impel track 9A in clockwise direction, in which it reproduces the signal recorded thereon.

When relay 13—2—B is energized, its operated contact establishes analogous connections which reverse the direction of rotation of the motor and bring about playback from track 9B while it is being impelled past its transducing head 15 in counterclockwise direction. A sequence control switch 30—2 of the stepping switch type has a wiper contact arranged so that in successive positions, it completes an energizing circuit for alternately operating either control relay 13—2—A or control relay 13—2—B.

Each playback unit X, Y is also shown provided with a selector switch 30—13 and a selector relay 30—15 operated thereby. As in an arrangement previously described, there is also provided a starting switch 20—10 momentary actuation of which starts a playback cycle in accordance with the selection made by first operating a selector switch 30—13 of any selected playback unit X, Y, a starting relay 30—10 being associated with the starting switch 20—10.

Instead of using synchronizing switches for stopping the operation of the system at the end of a playback cycle, the arrangement of Fig. 14 depends on the utilization of a synchronizing signal impressed on the magnetic signal carrier for controlling the stopping and starting operations.

According to the invention, the signal carrier on which a new signal sequence is recorded has also recorded thereon at the end of the recorded signal sequence a synchronizing signal of a substantially non-audible high frequency, such as twenty thousand cycles. In the reproducing process, the recorded twenty thousand cycle synchronizing signal, after amplification, is impressed through a low frequency cutoff filter 13—19, on a relay 13—18, so that whenever the twenty thousand cycle synchronizing signal moves past the transducing head 15, the reproduced amplified synchronizing signal will be impressed through the filter 13—19 on the relay 13—18 and cause it to momentarily operate.

The operation of the system shown in Fig. 14 will now be described, assuming that the various elements are arranged and connected in the manner indicated. Any number of playback units, such as X, Y, may form part of the system, and in order to select any one of these units, it is merely necessary to operate the associated selector switch, such as selector switch 30—13 associated with the playback unit X, after first operating the starting switch 20—10 momentary actuation of which, as by a dropped coin, will flex its contacts to energize the associated relay 30—10. On being energized to its operated condition, relay 30—10 establishes at its inner contacts 1 a holding circuit which holds relay 30—10 in its operated position, the holding circuit being completed through the serially connected normally closed contacts 2 of the selector relay 30—15 of each playback unit. The upper operated contacts 2 of the starting relay 30—10 simultaneously prepares an operating circuit for the selector relays 30—15.

Momentary actuation of any of the selector switches 30—13 to the operated position, for instance, for operating playback unit X, will energize the associated selector relay 30—15 to its operated position. In its operated position, selector switch 30—15 establishes at its inner contacts 1 a holding circuit for itself which is completed through the locking relay 13—18. At its second operated contacts 2, selector relay 30—15 opens the holding relay of starting relay 30—10 and releases it to the non-operated position, and the operated contact 3 of selector relay 30—15 completes a circuit through the arm of the sequence control switch 30—2, thereby sending an impulse through the stepping magnet of the sequence switch 30—2 as well as energizing coil 13—2—A.

It is assumed that in previous operation, the signal from the recording track has been played back and that recording track 9B is now ready for playing back the signal sequence recorded thereon. Accordingly, when the wiper contact of sequence step switch 30—2 is actuated to advance to the next position, relay 13—2—A is at once de-energized and an energizing circuit is establihed for operating control relay 13—2—B. In its operated position, control relay 13—2—B will now energize the motor 13 and establish the playback connection for playing back the sequence recorded on control track 9B, while it is being impelled in counterclockwise direction.

At the end of the playback cycle, the twenty thousand cycle synchronizing signal will be impressed through the amplifier and the filter 13—19 on the locking relay 13—18, causing it to operate and break the holding circuit of relay 30—15 of playback unit X, thereby restoring conditions analogous to the original conditions, except that if another playback operation is performed from the same playback unit X, a similar sequence of operations will restore the sequence step switch 30—2 to the position shown and bring about playback from the track 9A while it is impelled in clockwise direction.

According to one phase of the invention, a double carrier track transducing unit of the type described in connection with Fig. 13 is combined with recording control means arranged so as to record the desired signal sequence simultaneously on both tracks, while both tracks are in motion. In Fig. 15 is shown, in a simplified diagrammatic manner, one form of a recording control means exemplifying the principles underlying the invention. It has recording tracks 9A, 9B and associated reels, transducing and obliterating elements as well as a reversible drive, as the arrangement of Fig. 13. To simplify the explanation, the impelling roller 35 of track 9B is shown driven through a belt coupling by motor shaft 13—3. The impeller roller 35 of track 9A is similarly driven, either in the same direction as the other roller 35 by a driving roller 13—4—A, or in opposite reversed direction by another driving roller 13—4—B which are shown arranged to be selectively coupled to the motor shaft by the coupling 13—5 when either one of the two associated coupling magnets 13—5—A or 13—5—B are actuated, the coupling 13—5 being biased to a neutral uncoupled position, as indicated.

The controls include a cycle control relay 30—11 and sequence control means, in the form of a step switch 30—20, the wiper contacts of which may be actuated to the different contact positions 1 to 5 shown by sending a stepping impulse through the winding of the associated stepping magnet. A recording control switch 30—T is manually actuable to the operated position when the recording process is to be carried on and a similar switch 30—W is operated from the position shown for a rewinding operation.

The other features of the system shown in Fig. 15 will be explained by the following description of its operation: The sequence control switch 30—20 is normally in the first position 1 as shown, in which its contact arms establish the following circuit connections: Contact arm 30—20A connects one power supply terminal (++) to the upper contact blade of cycle relay 30—11 through which the motor is reversibly energized. Contact arm 30—20—B energizes coupling magnet 13—5—A so that the driving pulley 13—4—A is coupled to motor shaft 13—3 causing both tracks 9A, 9B to be driven in the same direction for alternately reproducing the same signal sequence first from one track then from the other track.

Fig. 15 shows the operating conditions at the end of a reproducing cycle from track 9B when the reel 31—A is just about to become emptied and actuate its synchronizing switch 36—A to the operated position. The operated synchronizing switch 36—A will open at its first inner contacts 1 the circuit through the lower locking contacts of the cycle control relay 30—11 which was previously in flexed closed position.

As a result of the just described momentary actuation of the synchronizing relay 36—A to the operated position, the cycle control relay 30—11 is restored to the non-operated position in which it energizes the motor 13 to impel both tracks in clockwise direction bringing about a signal reproducing cycle from track 9A. At the end of the recorded sequence played back from track 9A, the reel 31—B will be emptied to a position at which its synchronizing switch 36—B will be actuated to the operated position.

In the operated position of synchronizing switch 36—B, its first contact closes, thereby energizing the cycle control relay 13—10 to the operated position in which it establishes a holding circuit at its lower contacts and energizes at its operated upper contacts the motor to impel the two tracks in counterclockwise direction during which the signal sequence is reproduced from track 9B. An additional set of contacts on the cycle control switch 30—11 not shown, similar to the corresponding contacts of the motor energizing switch of Fig. 14, serves to alternately connect the transducer windings 15 of one track or another track to the reproducing amplifier. The alternate reproducing cycles from the two tracks will continue until it is desired to make a new record.

Whenever, at any moment, during a reproducing cycle, it is desired to make a new record, the sequence control switch 30—20 is advanced to position 2, for instance, by sending a stepping impulse through the associated stepping magnet, as by momentary closure of the push button switch 30—21 which is normally biased to an open position.

In position 2, the contact arm 30—20—A of the sequence switch 30—20 opens its direct connection to the motor energizing circuit and establishes instead a connection to the third contact arm 30—20—C of the sequence switch, the second contact of which is connected in series with the second contact of the synchronizing switch 36—A to the motor energizing circuit leading to the upper contact set of the cycle control relay 30—11, so that the motor remains in operation until reel 31—A has been emptied. In other words, with the sequence switch 30—20 in the second position, the reproducing process continues until, at the end of the reproducing cycle from tracks 9A, 9B, the reel 13—A has reached its empty position in which it operated its synchronizing switch 36—A to open at its second contacts the motor energizing circuit leading to the upper contacts of the cycle control relay 30—11.

During the reproducing cycle, the two tracks 9A, 9B operated out of phase. In order to make a new record simultaneously on both tracks, they must be brought into phase. This is done by actuating the sequence control switch 30—20 to the third position by sending another stepping impulse through its stepping magnet. With the sequence switch 30—20 in the third position, its second contact arm 30—20—B de-energizes the coupling actuating magnet 13—5—A, breaking the drive connection of the motor to track 9A. However, in this condition, since reel 31—B is filled, its synchronizing switch which is in the non-operated position, establishes at its non-operated contact 2 a motor-energizing circuit leading from the contact arm 30—20—A of sequence switch 30—20 to one of the motor energizing leads which causes the motor to impel the track 9B in clockwise direction. The motor is de-energized, and track 9B is stopped by the opening of the operated contacts 2 of the synchronizing switch 36—B when it becomes empty.

At this point, with sequence switch 36—20 in position 3, both reels 31—A, 31—B are empty and both carrier tracks 9A, 9B are in condition where a new recording can be simultaneously made on both tracks while track 9A is impelled in clockwise direction and track 9B in counterclockwise direction. By advancing sequence switch 30—20 to the position 4, there are prepared the operating circuits with which the two tracks 9A, 9B are impelled in such manner for making a new recording while they move in phase.

With the sequence switch 30—20 in the fourth position, it establishes the following circuit connections: Its contact arm 30—20—B energizes the coupling magnet 13—5—B, thereby establishing a reverse driving connection between the motor shaft 13—3 and the impelling roller 35 of track 9A so that whenever the motor is energized to rotate one way or the other, one track will be impelled clockwise while the other track will be impelled counterclockwise. In this fourth position, contact arm 30—20—B also energizes the recording control relay 30—25, thereby establishing a circuit through which the two sets of transducing elements 15 and obliterating eleelements 15 and 17 of the two tracks 9A, 9B respectively, are connected to the output side of the recording amplifier and to the source of obliterating current, respectively. Although the windings of the tranducing and obliterating elements 15 and 17 of the two tracks 9A, 9B are shown connected in parallel, they may be operated during the recording operation with series connections. The recording control switch 30—T makes it possible to selectively start or stop a recording at any time while the selector switch 30—20 is in position 4. By operating the switch 30—T, to the record position in which its blades are tilted upwardly one of its contacts energizes the motor to impel track 9A in clockwise direction and track 9B in counterclockwise direction, while its other contacts complete the circuits to the transducing elements and obliterating elements of the two tracks for carrying on the recording operation.

At the end of the recording process, it is merely necessary to permit the switch 30—T to return to the downwardly tilted position to stop the recording operation and the movement of the tracks. The new recording may be of any desired length, and upon completion of the recording, the same length of signal track 9A wound on empty reel 31—A in clockwise direction and the same length of signal track 9B wound on empty reel 31—B in counterclockwise direction will constitute the same new recorded signal sequence which will be reproduced in the manner described above while the two tracks are impelled in opposite directions.

The recording may be stopped at any time by opening recording switch 30—T to the position shown. If it is now desired to rewind the two tracks, the rewinding switch 30—W is actuated to the operated position in which its blades are tilted upwardly and it opens the circuits to the transducing and obliterating elements 15, 17 of the two tracks while one of its contacts energizes the motor 13 to rewind the two tracks until reels 31—A and 31—B become empty, whereupon the operated synchronizing switch 36—A automatically opens at its third contact the motor energizing circuit which was established by the operated rewinding switch 30—W. The recording just made on the two tracks 9A, 9B may now be checked up by actuating play back switch 30—P to its operated closed position whereupon its lower contact establishes a motor energizing circuit while its upper contacts establish reproducing circuit connections from the two transducing elements 15 of the two tracks 9—A, 9—B to reproducing amplifiers, not shown through connectors 15A and 15B.

The two tracks 9—A, 9—B may now be restored to their out-of-phase initial condition in which they operate as an endless playback medium. Before doing so, a check is made to assure that the entire recorded length of the two tracks 9—A, 9—B is stored on reels 31—A, 31—B and they have been stopped simultaneously at the desired end point of the recording which is to be reproduced. This can be checked by playing back the two recordings simultaneously, with the play back switch 30—P in the operated position, and opening it at the desired end of the played back recording. Thereupon the sequence switch 30—20 is advanced to its next position 5. With the sequence switch 30—20 in position 5 its contact 30—20—B releases the coupling magnet 13—5—B while motor 13 is energized through contact 3 of the synchronizing switch 36—B and position 5 of sequence switch arm 30—20—A to impel track 9—B until reel 31—B is empty whereupon the motor is automatically stopped by the operation of synchronizing switch 36—B. Thereupon an impulse through the stepping magnet of sequence switch 30—20 advances it another step to its original position in which the two tracks 9—A, 9—B operate as an endless playback unit.

The double track unit is now operating in the same manner as the similar unit shown in Figure 13. The great advantage of such playback recorders is the fact that the length of the playback period may be readily varied over a very wide range in accordance with varying requirements.

According to the invention, the sequence control switch is arranged to be automatically advanced from step 1 to the recording position of step 4 by providing the synchronizing switches or other switching elements of the systems with additional switch contacts which send a step impulse following the completion of each operation performed in the previous position.

According to another phase of the invention, sequence control means and selector control means are combined with magnetic recording arrangements of the type described in connection with Figs. 1 to 15 for automatically setting into operation a magnetic transducer track and making thereon a series of records of a desired number of selected signal sequences which become available on different selected channels at different selected times.

Figs. 16 and 17 indicate diagrammatically an automatic timer and selector control arrangement which may be combined with various parts of Figs. 1 to 15 for automatically making such selected records of selected programs at selected times. A timing selector 40—20 is shown for selecting one of several signal channels and the time at which its signals are to be recorded. The signals are shown supplied by a broadcast receiver 40—30, for instance, of the type provided with an automatic selectively-operated timing mechanism, which may be timed by actuating a push button, for instance, in the manner described in Barrett Patent 2,149,570. It is assumed that, in a known manner, the timing buttons of the receiver are actuated to their timing positions by electric control circuits, and the receiver 40—30 is shown provided, by way of illustration, with eight timing control leads 40—31, similar to the one fully shown, through which the individual timing buttons, corresponding to the different broadcast stations, are selectively actuated to their timing positions.

There is further indicated a supplemental selector unit 40—40 provided for instance with a plurality of selector switches, such as selector switches 20—40, 20—50 and 20—60 of Fig. 12, for making it possible to selectively interconnect any one of the larger number of tuning leads 40—31 of the broadcast receiver 40—30 to a smaller number of control leads 40—41 from the timing selector 40—20, only one control lead 40—41 being fully shown. Thus, the three control leads 40—41 may be individually connected to three rotary contact arms of three selector switches 20—40, 20—50, 20—60, while each of the larger number of tuning leads 40—31 is individually connected to a different contact of each of the three banks of contacts cooperating with the rotary contact arms of the three selector switches.

The timing selector 40—20 is indicated as having a clock mechanism 40—21 which rotates a timing contact arm 40—22, representing a clock hand, along a timing contact dial plate 40—23, for instance, at the rate of one revolution in 12 hours, as a standard clock. As shown in the elevational view in Fig. 17 of the 12 o'clock portion, the contact dial plate 40—23 is provided with several concentric sets of contact guide slits 40—25, one set or row of slits corresponding to each of the control leads 40—41 leading from the timing selector 40—20 to the supplemental selector 40—40. As indicated in Fig. 17, the guide slits 40—25 are narrow and distributed in each row as aligned slightly spaced pairs on opposite sides of each quarter-hour mark on the dial plate 40—23.

In each guide slit 40—25 is slidably mounted the front part of contact 40—26 which is held in retracted position by one end of a spring arm 40—27, the other end of which is suitably affixed to the back side of the dial plate 40—23. Each spring arm 40—27 is arranged to be pushed forwardly in the path of the rotary timing arm 40—22 by an associated pivotally mounted selector handle 40—28 which has a grip end projecting through a suitable hole of a dial so that by tilting the selector handle one way or the other, the contact 40—26 may be actuated either to its outward or to its retracted position shown. The rotary clock contact arm 40—22 has a plurality of wiper contacts 40—24 arranged to complete an electric actuating circuit with any selected contact 40—26 of the several rows of contacts which have been selectively actuated to the outwardly projecting position by tipping the associated operating handle 40—28 to the operated position.

The other features of the automatic recording system described above in connection with Figs. 16 and 17 will now be explained in connection with the description of its operation. Assuming that it is desired to record broadcasts made from three selected stations at three selected periods. In order to secure the automatic recording of these broadcasts, the supplemental selector 40—40 is first checked to see that the three selected tuning leads 40—31 are connected to the three control leads 40—41 leading from the three rows of contact strips 40—26 of the timing selector 40—20, each row of contact strips being electrically interconnected with one of the several control leads 40—41.

With this arrangement, each row of contacts 40—26 will bring about a recording of a broadcast from the station, the tuning lead of which is interconnected through the selector to the particular row of contacts. Thus, for instance, if it is desired that the broadcast from the station, the tuning lead 40—31 of which is connected to the upper contact row shown in Fig. 16, is to be recorded during the period between 12 and 12:15, the two contact setting handles 40—28 for the contact 40—26 located just after the 12 o'clock hour mark, and the contact in the same contact row just preceding the 12:15 hour mark, are actuated to their operated set positions. When, in the course of its operation, the clock rotated contact arm 40—22 makes contact with the set contact 40—26 just after passing the 12 o'clock hour mark, a circuit is completed from a positive supply terminal shown connected to the clock arm 40—22 to the stepping magnet of the stepping switch 40—2, thereby advancing it to the next position in which its energizes the recording relay 40—1, while at the same time the circuit completed by the clock hand also completes an actuating circuit for the tuning lead 40—31 of the broadcast receiver for tuning the particular selected station.

In its operated condition, the recording relay 40—1 completes through one of its operated contacts an input circuit from the broadcast receiver through a recording amplifier, while two other of its operated contacts connect the output of the recording amplifier and the obliterating supply to leads indicated by numerals 15—10 and 17—10, to which the transducing elements 15 and obliterating elements 17 of the recording amplifier are connected for carrying on a recording operation. One of the switch contacts of the recording switch is also utilized to energize the motor which impels the record track during a record transducing operation.

The recording relay is shown provided with additional contacts through which the motor circuits serve to control the selective energization of the motor circuit which impels the recording track during the recording operation. The recording proceeds until shortly before 12:15 the wiper contact 40—24 of the rotated clock arm 40—22 completes a circuit with the projecting contact immediately before the quarter-hour mark. There is again completed a circuit which sends an operating impulse through the stepping magnet of control switch 40—2, restoring it to the previous position in which the recording relay is restored to the non-recording position.

At the same time, an impulse is also sent to the tuning lead 40—31 which may be controlled through an instrumentality similar to the stepping switch 40—2 so that the first received impulse actuates it to the tuning position and the subsequent impulse releases it from the tuning position. However, with an ordinary broadcast receiver, it is not necessary to make provisions for re-tuning the receiver at the end of a recorded broadcast, a tuning operation being required only when a recording is to be made.

The principles of the invention described above in connection with a specific exemplification thereof, indicated in Figs. 16 and 17, will suggest various modifications thereof. Thus, instead of providing two contacts one immediately in front and one immediately after each hour mark for actuating a control switch 39—2 to selectively start a recording operation, the timing contact dial 40—22 may be provided with only one contact element at each appropriate timing hour mark, such as at each quarter-hour mark. The circuit established by the clock rotated contact arm with the appropriately set contact tip 40—26 will then always operate only to start a new recording, a separate control circuit controlled by an independent clock work or by a separate contact of the same clock mechanism 40—21 being provided to send after slightly less than a quarter of an hour of operation, a termination impulse through the stepping magnet of the stepping switch 40—2 for advancing it from the previously actuated position, in which it established an operating circuit to the recording relay 40—1, to the position shown in which the energizing circuit to the recording relay 40—1 is again broken. With such contact arrangement, it is necessary to set the contact tips 40—26 located at the beginning of each quarter hour during which a recording is to be made from the selected station, the recording operation being automatically terminated at the end of the quarter hour and only started again if the corresponding contact tip 40—26 of the next quarter of an hour or a subsequently selected quarter of an hour is set to the forward operating position.

In the automatic telephone art, it is well known to use alternatively either automatically actuated step switches of the type described herein, or automatically operating relay chains for performing the same kind of automatic control circuit, and it is contemplated that such relay chains and other analogous automatic control circuits may be used for performing the various control operations underlying the automatic control systems of the invention described herein.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In a magnetic record transducing arrangement for magnetically transducing record signals, a cyclically operative magnetic record track of predetermined length for magnetically retaining and reproducing records; magnetic transducing means located along a portion of said record track for magnetically transducing signals by magnetic flux interlinkage with moving elements of said record track; guide means including impelling means for guiding and impelling said record track past said transducing means; control means including a control element actuable to set into operation a signal transducing operation with said moving record track; said control means comprising synchronizing means including a synchronizing element moving in a predetermined synchronized relation to the motion of the record track, and sequence control means operating under the control of said synchronizing element for continuing transducing operations during a predetermined sequence of a plurality of transducing cycles in each of which said track completes a passage past said transducing means.

2. In a magnetic record transducing arrangement for magnetically transducing record signals: a plurality of magnetic signal carrier tracks of predetermined length for magnetically retaining and reproducing records; magnetic transducing means associated with said tracks for magnetically transducing signals by magnetic flux interlinkage with moving elements of said carrier tracks; guide means including impelling means for guiding and impelling said record tracks past said transducing means; control means actuable to set into operation a signal transducing operation with one of said record tracks; said control means comprising synchronizing means including a synchronizing element associated with each of at least two of said tracks and moving in predetermined synchronized relation to the motion of the associated record track for defining a predetermined transducing cycle of the associated track; and sequence control means selectably operable in predetermined relation to the operation of the synchronizing means and connected for automatically continuing a transducing operation during at least two transducing cycles from at least two different tracks.

3. A magnetic record transducing arrangement as defined in claim 2, characterized by the fact that said sequence control means are operable in predetermined relation to the operation of the synchronizing means for continuing a transducing operation during at least two transducing cycles from at least two different record tracks in a selectable order.

4. A magnetic record transducing arrangement as defined in claim 2, characterized by the fact that said sequence control means are operable in predetermined relation to the operation of the synchronizing means for continuing a transducing operation during at least two transducing cycles from at least two different record tracks selectably predetermined from a larger number of tracks.

5. A magnetic record transducing arrangement as defined in claim 2, characterized by the fact that said sequence control means are operable in predetermined relation to the operation of the synchronizing means for continuing a transducing operation during at least two transducing cycles from at least two different record tracks selectably predetermined from a larger number of tracks in a selectable order.

6. A magnetic record transducing arrangement as defined in claim 2, characterized by the fact that said sequence control means are operable in predetermined relation to the operation of the synchronizing means for selectively continuing a transducing operation during at least two transducing cycles from at least two different record tracks selectably predetermined from a larger number of tracks in a selectable order.

7. A magnetic record transducing arrangement as defined by claim 2, characterized by the fact that said sequence control means include selector means selectably settable for automatically effecting in selected order a series of selected transducing operations with a predetermined series of tracks selected from said tracks.

8. A magnetic record transducing arrangement as defined by claim 2, characterized by the fact that said sequence control means include selector means selectably settable for automatically effecting in selected order a series of selected transducing operations with a predetermined series of tracks selected from a larger number of said tracks.

9. In a magnetic record transducing arrangement for magnetically transducing record signals: a magnetic record track of predetermined length for magnetically retaining and reproducing records; magnetic transducing means located along a portion of said record track for magnetically transducing signals by magnetic flux interlinkage with moving elements of said record track; guide means including impelling means for guiding and impelling said record track past said transducing means during a transducing cycle; control means including a control element actuable to set into operation a signal transducing operation with said moving record track; and sequence control means including selectably operative sequence signal means for supplying selected sequence signals which actuate the control means to set into operation a predetermined transducing cycle.

10. In a magnetic record transducing arrangement as claimed in claim 9, said sequence control means including selectably settable channel selector elements for selectively connecting said transducing means to different signal channels and setting into operation a selected series of transducing cycles with different selected signal channels in accordance with the settings of said sequence signal means and of said channel selector means.

11. In a magnetic record transducing arrangement for repeatedly reproducing a signal sequence: two magnetic record tracks; record transducing means associated with said tracks; means for producing operating cycles of relative motion between said transducing means and said two tracks so that a cycle of relative motion of said two tracks in one direction with respect to said transducing means is followed by a cycle of corresponding motion in opposite direction; each of said record tracks having recorded thereon the same signal sequence; said signal sequences being so recorded on said track as to cause said transducing means to reproduce the recorded sequence from one track while the relative motion between said transducing means and said tracks is in one direction, and to cause the reproduction of the same signal sequence from the other track when said relative motion is in the opposite direction; at least one signal element moving in synchronized relation to the motion of said tracks, and automatic control means operative in response to the operation of said control element to cause repeated reproduction of said signal sequence from said two tracks during each successive operating cycle of said tracks.

12. In an electromagnetic sound recording and reproducing machine, an endless magnetizable and demagnetizable recording medium, driving means operable during functioning of said machine and disposed to cause motion of said medium, and terminating means arranged to terminate operation of said driving means after substantially a predetermined integral number of complete passages of said medium through said machine, said terminating means including means for changing from recording to reproducing operation.

13. In a recording and reproducing machine having an endless flexible magnetic recording medium, manual starting means, and automatic electrically controlled means responsive to each passage of said medium through said machine, whereby the completion of the first passage of said medium will condition said machine for reproducing and the completion of the second such passage will automatically stop said machine.

14. In a continuous magnetic tape recording and reproducing machine, means operable to initiate the running of said tape, switching means operative during said running and adapted to condition said machine for recording during the first passage through said machine of said tape, further switching means adapted to condition said machine for reproducing after said first passage of said tape, and automatic means disposed to stop said running at or about the completion of the second passage of said tape through said machine.

15. In a recording and reproducing device, an endless magnetizable recording medium, driving means for passing said medium through said device at substantially constant speed, and automatic means including limiting means operative simultaneously with said driving means and disposed to terminate operation of said driving means after substantially two complete passages of said medium through said device.

16. In a recording and reproducing machine having an endless flexible magnetic recording medium, starting means, and electrically controlled means responsive to each passage of said medium through said machine, whereby the completion of the first passage of said medium will condition said machine for reproducing and the completion of the second such passage will stop said machine.

17. In a continuous magnetic tape recording and reproducing machine, means operable to initiate the running of said tape, switching means operative during said running and adapted to condition said machine for recording during the first passage through said machine of said tape, further switching means adapted to condition said machine for reproducing after said first passage of said tape, and means responsive to the substantial completion of the second passage of said tape through said machine and disposed to terminate said running of said tape.

18. In a device having operating parts controlled by an electrical circuit including a vacuum tube, a drive motor, a switch member for controlling the energization of said motor, means tending to hold said switch member in inoperative position, and a relay lock in said circuit directly responsive to current flow through said tube to hold said switch in circuit closing position against the action of said means.

19. In a magnetic recording device, a pair of spaced reels, a recording medium on said reels, means including an electrical circuit embodying an element which must first become heated before operating efficiently for magnetizing said medium, drive means for said reels, a control member to cause actuation of said driving means, means tending to hold said control member at all times in inoperative position, and an electrical holding device responsive to said element when heated for efficient operation to lock said control member in operative position against the action of the second said means.

20. In a magnetic recording device, a pair of spaced reels carrying an elongated recording medium which may travel from one reel to the other in either direction, drive means to actuate said reels in either direction, a movable control for governing the operation of said drive means, restraining means tending to hold said control in inoperative position, means to effect a recording on said medium including an electrical circuit, a vacuum tube in said circuit, and holding means responsive to current flow through said vacuum tube to lock said control in operative position against the action of said restraining means.

21. In a magnetic record transducing arrangement for magnetically transducing record signals: a magnetic record track of predetermined length for magnetically retaining and reproducing records; magnetic transducing means located along a portion of said record track for magnetically transducing signals by magnetic flux interlinkage with moving elements of said record track; guide means including impelling means for guiding and impelling said record track past said transducing means; control means actuable to set into operation a signal transducing operation with said moving record track; said control means comprising synchronizing means including a synchronizing element moving in synchronized relation to the track and operable in predetermined synchronized relation to the motion of the record track for defining a predetermined transducing cycle; and sequence control means operable in predetermined relation to the operation of the synchronizing means and connected for automatically repeating the predetermined transducing cycle.

22. A magnetic record transducing apparatus as defined by claim 21 in which the control means also includes control-locking means and is connected to respond to a momentary impulse for operation of the control-locking means to hold the control means in actuated condition during the said cycles.

23. In a magnetic record transducing arrangement for magnetically transducing record signals: a magnetic record track of predetermined length for magnetically retaining and reproducing records; magnetic transducing means located along a portion of said record track for magnetically transducing signals by magnetic flux interlinkage with moving elements of said record track; guide means including impelling means for guiding and impelling said record track past said transducing means; control means actuable to set into operation a signal transducing operation with said moving record track; said control means comprising a synchronizing element moving in predetermined synchronized relation to the motion of the record track for defining a predetermined transducing cycle; and sequence control means operable in predetermined relation to the operation of the synchronizing means and connected for automatically repeating the predetermined transducing cycle and automatically deactivating the control means for stopping the transducing after a predetermined substantially integral number of transducing cycles are completed.

24. A magnetic record transducing apparatus as defined by claim 21 in which the synchronizing means includes a timing mechanism arranged to indicate the position of the record track with respect to the transducing means.

25. A magnetic record transducing apparatus as defined by claim 21 in which the record track contains a non-uniformity at one portion thereof and the synchronizing means is responsive to the passage of said record track non-uniformity during the record track movement past the transducing means.

26. A magnetic record transducing apparatus as defined by claim 25 in which the said record track non-uniformity is a region free from a recording.

27. A magnetic record transducing apparatus as defined by claim 26 in which the record track is endless, the impelling means is arranged to move the record track in only one direction and the transducing means is arranged for preventing the making of a recording along a portion of the record track.

28. A magnetic record transducing apparatus as defined by claim 2 in which there are two record tracks each of which is elongated and is defined by two ends; the two ends of a record track are held on different reels; the impelling means is connected to simultaneously reel each of said record tracks first in one direction from one reel to the other and then simultaneously reel each of said record tracks in opposite direction from the said other reel back to the said one reel; and the control means is connected to effect a transducing operation on one of said record tracks during the reeling in one direction and on the other of said two record tracks during the reeling in opposite direction for effecting rewinding of one record track while transducing the other and obtaining an endlessly operable transducing without stopping to rewind.

29. A magnetic record transducing apparatus as defined by claim 28 in which said two record tracks are held on separate pairs of reels and the control means includes coupling means establishing the driving connection between the record tracks, the coupling means being disengageable and reversible for simultaneously recording a signals sequence on both record tracks in such relation that with reversed coupling connection the recorded signal sequence may be endlessly played back without stopping to rewind.

30. A magnetic record transducing apparatus as defined by claim 2 in which two record tracks are contained in a single elongated record member defined by two ends held on different reels; the impelling means is connected to simultaneously reel each of said record tracks first in one direction from one reel to the other, and then simultaneously reel each of said record tracks in opposite direction from the said other reel back to the said one reel; and the control means is connected to effect a transducing operation on one of said record tracks during the reeling in one direction and on the other of said two record tracks during the reeling in opposite direction for effecting rewinding of one record track while transducing the other and obtaining an endlessly operable transducing without stopping to rewind.

31. In a recording and reproducing apparatus for magnetically transducing record signals, such as recording magnetic signals or reproducing the magnetically recorded signals, a record structure providing a cyclically operative magnetizable recording medium of predetermined record length, record transducing means for carrying on record transducing operations while said recording medium moves past said transducing means, guide means including impelling means for guiding and impelling said recording medium past said transducing means during a passage cycle of the recording medium past said transducing means, and in combination therewith control means comprising a synchronizing element moving in predetermined synchronized relation to the motion of the recording medium and operative under the control of said synchronizing element for causing said apparatus to perform with said recording medium record transducing operations during a predetermined number of passage cycles of said recording medium, said control means including means for causing said apparatus to perform at least one signal recording operation during one passage cycle of said recording medium.

32. In a recording and reproducing apparatus for magnetically transducing record signals, such as recording magnetic signals or reproducing the magnetically recorded signals, a record structure providing a cyclically operative magnetizable recording medium of predetermined record length, record transducing means for carrying on record transducing operations while said recording medium moves past said transducing means, guide means including impelling means for guiding and impelling said recording medium past said transducing means during a passage cycle of the recording medium past said transducing means, and in combination therewith at least one synchronizing element moving in predetermined synchronized relation to the motion of the recording medium, and selectively settable sequence control means operable under the control of a synchronizing element for causing the recording apparatus to perform a plurality of record transducing cycles during a plurality of passage cycles of the recording medium in accordance with the setting of said sequence control means.

33. In a recording and reproducing apparatus for magnetically transducing record signals, such as recording magnetic signals or reproducing the magnetically recorded signals, a magnetizable recording medium, transducing means for carrying on record transducing operations while said recording medium moves past said transducing means, guide means including power-energizable impelling means for guiding and impelling said recording medium past said transducing means during a predetermined record transducing cycle, said apparatus including a power-energizable amplifier forming part of the record transducing circuits, a movable control element actuable to start the operation of said apparatus, said amplifier requiring initial conditioning before it is rendered operative, and a restraining means tending to restrain said control element from starting said operation and preventing actuation of said impelling means before substantial completion of said conditioning operation; said restraining means operating in response to predetermined operating conditions of said amplifier to remove its restraining action and cause actuation of said impelling means.

34. In a recording and reproducing apparatus for magnetically transducing record signals, such as recording magnetic signals or reproducing the magnetically recorded signals, a magnetizable recording medium, record transducing means for carrying on record transducing operations while said recording medium moves past said transducing means, guide means including power-energizable impelling means for guiding and impelling said recording medium past said transducing means during a predetermined record transducing cycle, said apparatus including a power-energizable amplifier forming part of the record transducing circuits, a movable control element actuable to start the operation of the recording apparatus, said amplifier having amplifier tubes the cathodes of which have to be heated to a predetermined temperature before the amplifier is rendered operative; and restraining means tending to restrain said control element from starting said operation and prevent impelling means from being rendered operative before substantial completion of said conditioning operation; said restraining means being responsive to predetermined operating conditions of said amplifier to remove its restraining action and cause actuation of said impelling means.

SEMI JOSEPH BEGUN.

REFERENCES CITED

The following references are of record in the file of this patent:

UNITED STATES PATENTS

| Number | Name | Date |
|---|---|---|
| 2,213,631 | Heller | Sept. 3, 1940 |
| 2,275,961 | Heller | Mar. 10, 1942 |